United States Patent
Henderson

(10) Patent No.: US 8,826,407 B2
(45) Date of Patent: Sep. 2, 2014

(54) SYSTEM AND METHOD FOR ACCESS CONTROL AND IDENTITY MANAGEMENT

(75) Inventor: Charles E. Henderson, Lexington, VA (US)

(73) Assignee: Skai, Inc., Arlington, VA (US)

(*) Notice: Subject to any disclaimer, the term of this patent is extended or adjusted under 35 U.S.C. 154(b) by 0 days.

(21) Appl. No.: 13/304,161

(22) Filed: Nov. 23, 2011

(65) Prior Publication Data

US 2012/0137360 A1    May 31, 2012

Related U.S. Application Data

(60) Provisional application No. 61/416,881, filed on Nov. 24, 2010.

(51) Int. Cl.
*G06F 15/173* (2006.01)
*G06F 21/62* (2013.01)

(52) U.S. Cl.
CPC .................... *G06F 21/6218* (2013.01)
USPC ........ 726/8; 707/E17.005; 707/758; 707/781; 707/791; 709/225; 709/226; 709/229; 726/1; 726/2; 726/4; 726/6; 726/17; 713/166; 713/185; 713/193; 718/100; 718/102

(58) Field of Classification Search
CPC ............... G06F 21/6218; G06F 21/41; G06F 2221/2141; H04W 4/08; G06Q 10/10
See application file for complete search history.

(56) References Cited

U.S. PATENT DOCUMENTS

| | | | |
|---|---|---|---|
| 7,349,912 B2* | 3/2008 | Delany et al. | 707/694 |
| 7,363,339 B2* | 4/2008 | Delany et al. | 709/202 |
| 7,613,794 B2* | 11/2009 | Delaney et al. | 709/219 |
| 7,673,047 B2* | 3/2010 | Delany et al. | 709/225 |
| 7,698,346 B2 | 4/2010 | Henderson | |
| 8,195,215 B2* | 6/2012 | Marocchi et al. | 455/521 |
| 2002/0129135 A1* | 9/2002 | Delany et al. | 709/223 |
| 2002/0138543 A1* | 9/2002 | Teng et al. | 709/102 |
| 2002/0138572 A1* | 9/2002 | Delany et al. | 709/204 |
| 2002/0138763 A1* | 9/2002 | Delany et al. | 713/201 |
| 2002/0147746 A1* | 10/2002 | Lee | 707/513 |
| 2002/0152254 A1* | 10/2002 | Teng | 709/100 |

(Continued)

OTHER PUBLICATIONS

Notification of Transmittal of the International Search Report and the Written Opinion of the International Searching Authority, or the Declaration issued Apr. 6, 2012 in the corresponding PCT Application No. PCT/US2011/62118.

*Primary Examiner* — Morshed Mehedi
*Assistant Examiner* — Sharon Lynch
(74) *Attorney, Agent, or Firm* — McGuireWoods, LLP; Charles J. Gross

(57) ABSTRACT

A mechanism for the flow of access by derivation is provided. An access point may be any object, such as files or functions, to which the access recipient is granted access rights by the access provider. Access is typically represented by a relationship object referencing the access provider function, the access recipient function, and the access point object, and a set of access rights. This membership access relationship object is typically represented as a subtype of the access relationship. When a membership access relationship is created, typically a new associated persona function is generated, representing the new identity created for the access recipient function while serving as a member of the access point function. When a persona function is invited to be a member in another function, that in turn generates a membership and a second persona that is derived from the first persona, resulting in identity derivation.

11 Claims, 39 Drawing Sheets

Membership Overview

(56) References Cited

U.S. PATENT DOCUMENTS

| | | | |
|---|---|---|---|
| 2002/0156879 A1* | 10/2002 | Delany et al. | 709/223 |
| 2003/0037044 A1* | 2/2003 | Boreham et al. | 707/3 |
| 2003/0078937 A1* | 4/2003 | Boreham et al. | 707/102 |
| 2004/0010591 A1* | 1/2004 | Sinn et al. | 709/225 |
| 2004/0010606 A1* | 1/2004 | Delaney et al. | 709/229 |
| 2004/0181578 A1* | 9/2004 | Elms | 709/205 |
| 2005/0021498 A1* | 1/2005 | Boreham et al. | 707/1 |
| 2005/0044396 A1* | 2/2005 | Vogel et al. | 713/200 |
| 2005/0091655 A1* | 4/2005 | Probert et al. | 718/100 |
| 2005/0097166 A1* | 5/2005 | Patrick et al. | 709/203 |
| 2005/0102510 A1* | 5/2005 | Patrick et al. | 713/166 |
| 2005/0251852 A1* | 11/2005 | Patrick et al. | 726/1 |
| 2005/0257245 A1* | 11/2005 | Patrick et al. | 726/1 |
| 2005/0262362 A1* | 11/2005 | Patrick et al. | 713/193 |
| 2005/0278294 A1* | 12/2005 | Beartusk et al. | 707/1 |
| 2006/0036548 A1* | 2/2006 | Roever et al. | 705/51 |
| 2006/0195575 A1* | 8/2006 | Delany et al. | 709/225 |
| 2007/0168530 A1* | 7/2007 | Delaney et al. | 709/229 |
| 2007/0180493 A1 | 8/2007 | Croft et al. | |
| 2008/0016546 A1* | 1/2008 | Li et al. | 726/1 |
| 2009/0089413 A1 | 4/2009 | Kamei et al. | |
| 2009/0254392 A1* | 10/2009 | Zander | 705/7 |
| 2010/0205193 A1* | 8/2010 | Krishna | 707/758 |
| 2011/0196977 A1* | 8/2011 | Lynch et al. | 709/229 |

* cited by examiner

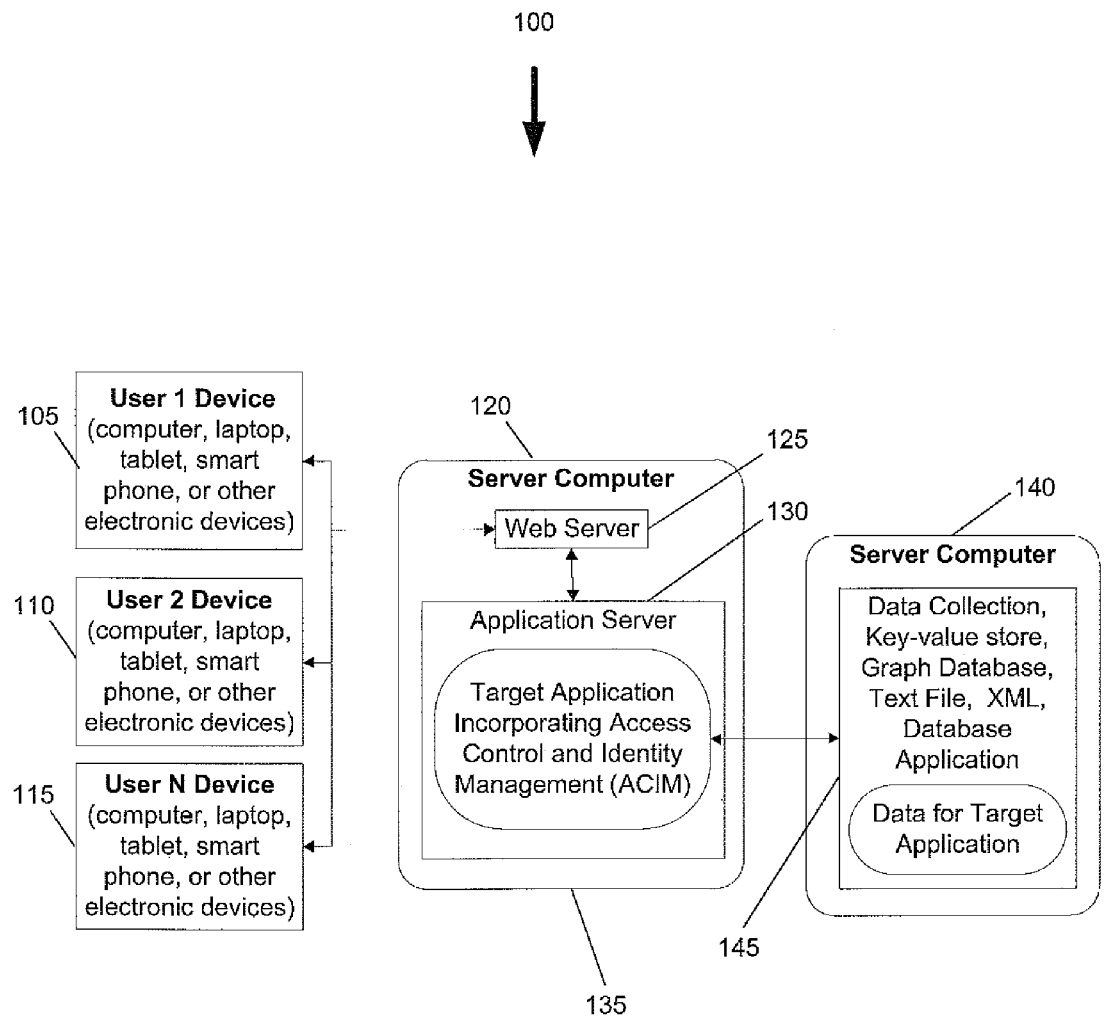
Figure 1. Architecture of an Example System Incorporating Access Control and Identity Management Configured According to the Principles of the Disclosure

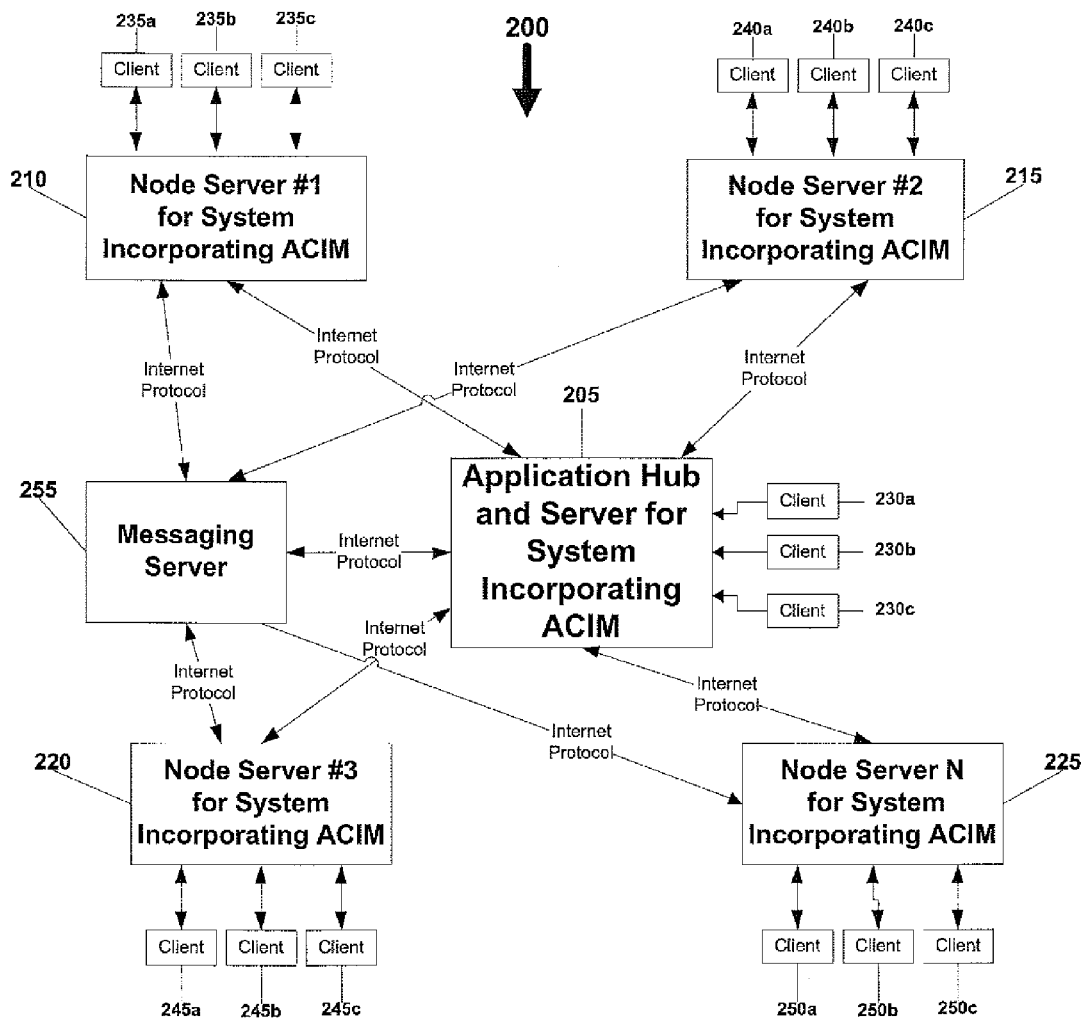
Figure 2. Architecture of an Example Web-Based Distributed System Incorporating Access Control and Identity Management Configured According to the Principles of the Disclosure

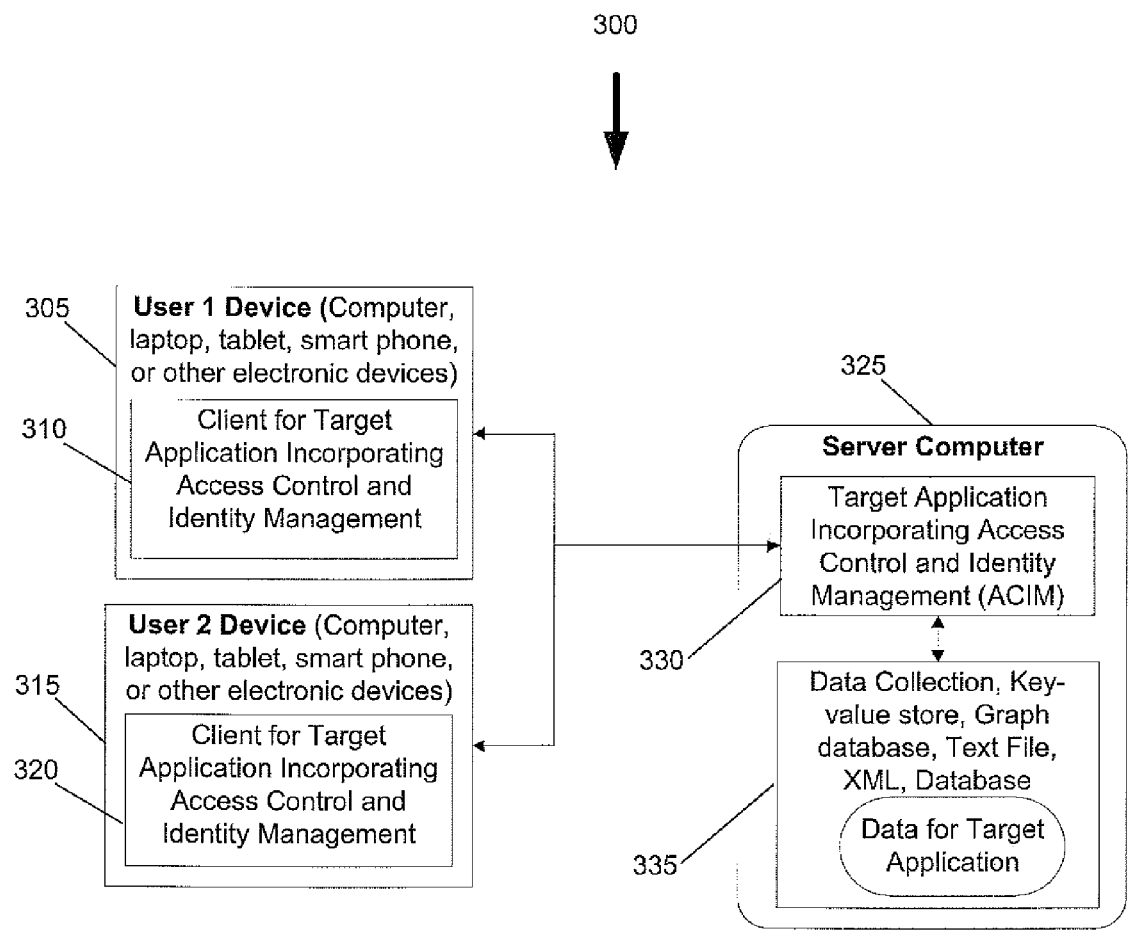
Figure 3. Architecture of an Example Client-Server System Incorporating Access Control and Identity Management Configured According to the Principles of the Disclosure

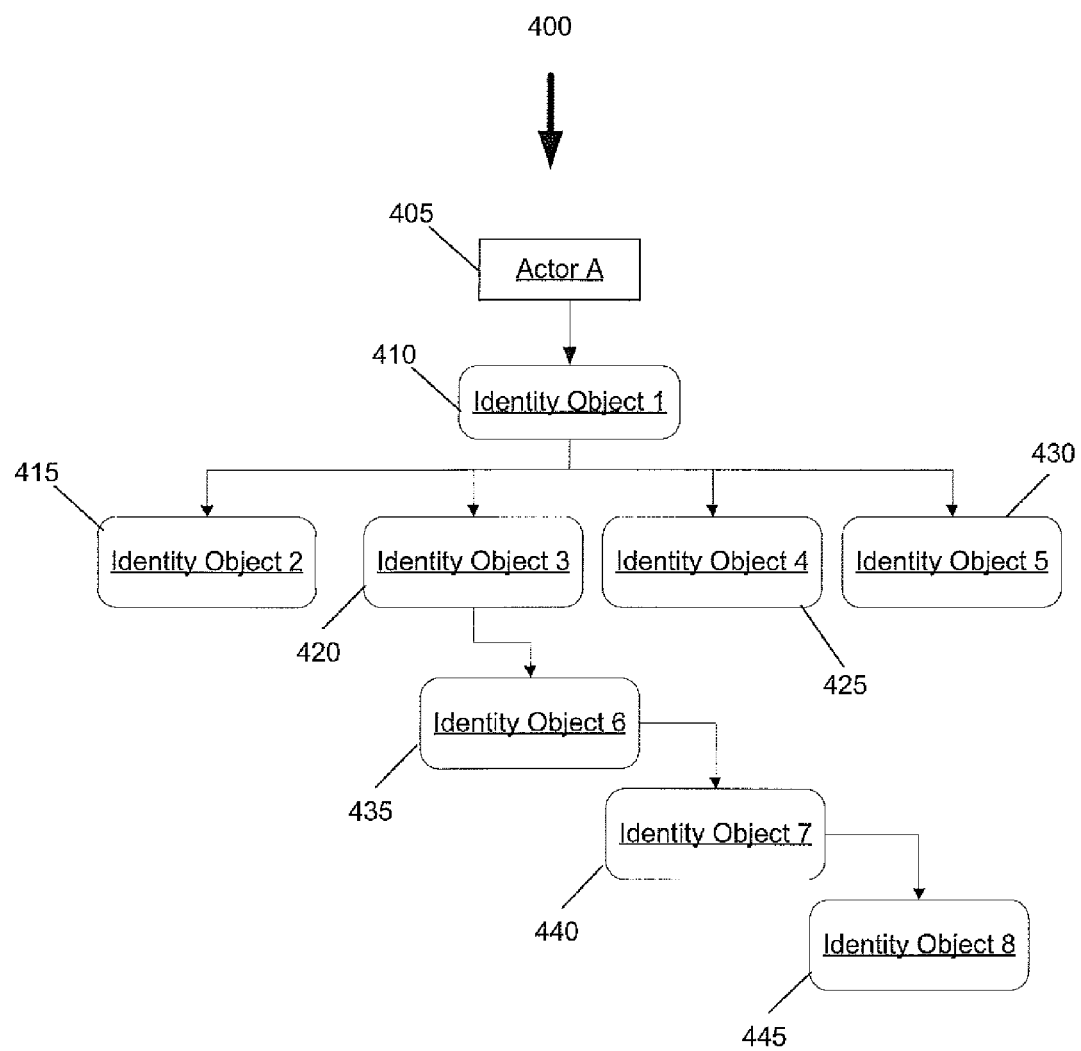
Figure 4. Example Identity Object Derivation

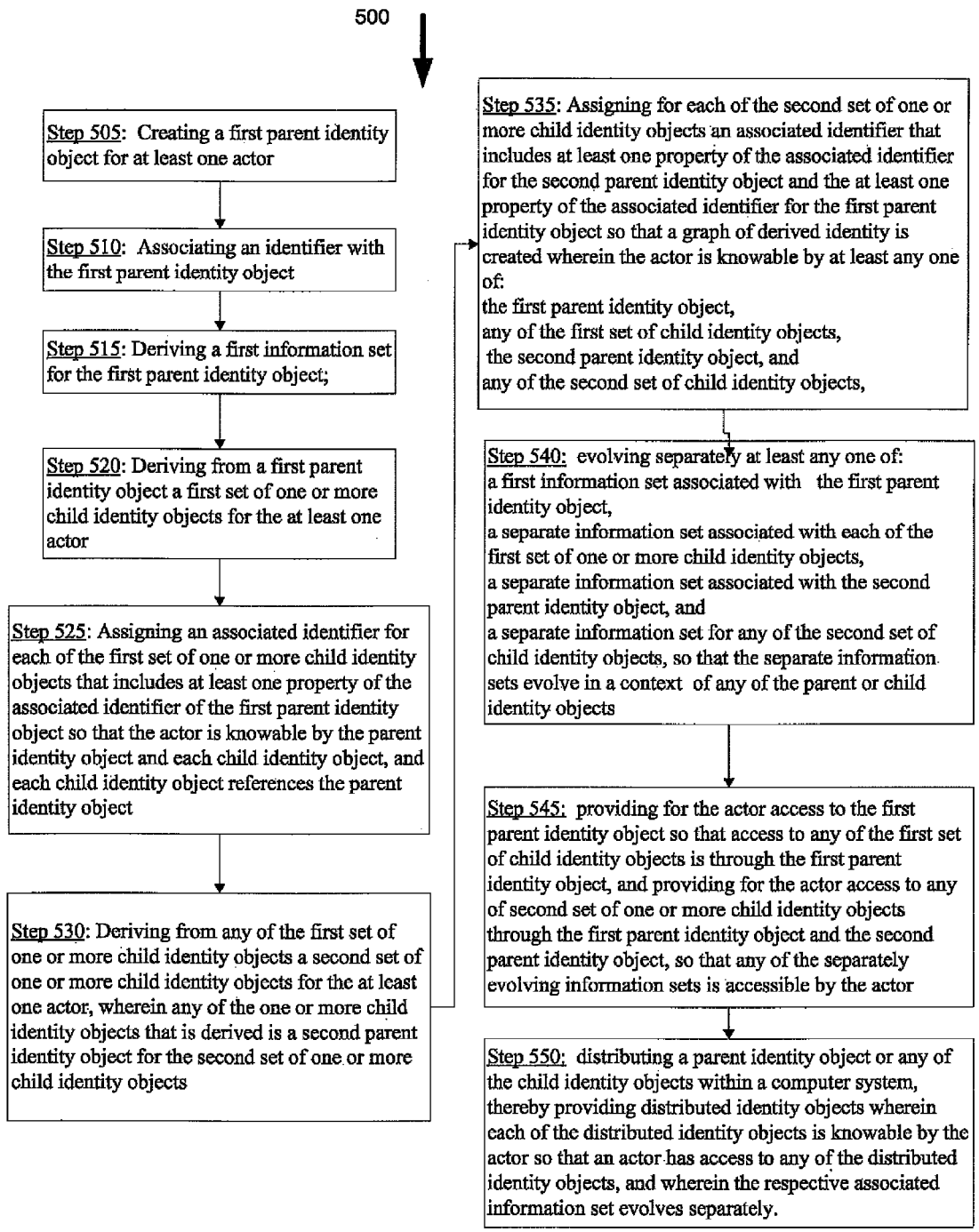
Figure 5. Exemplary Process Flow for Deriving Identity Objects

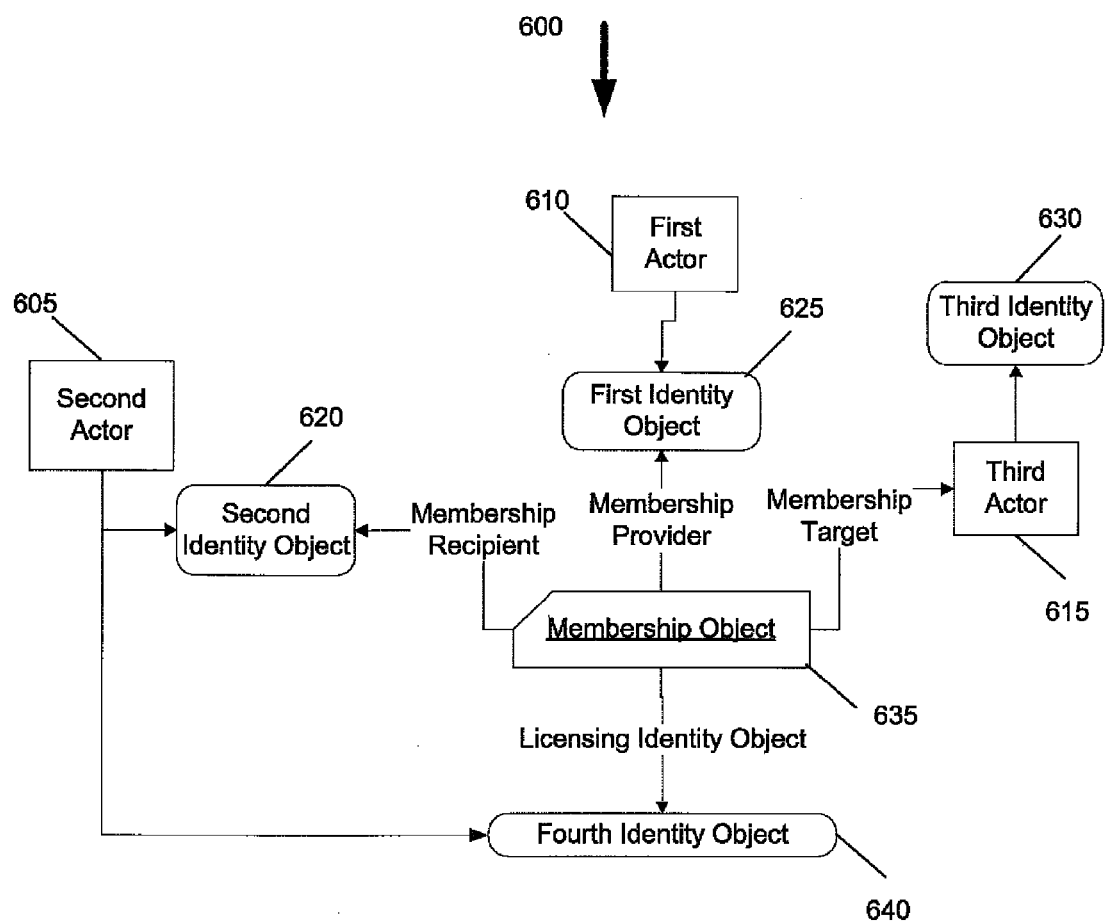
Figure 6. Membership Overview

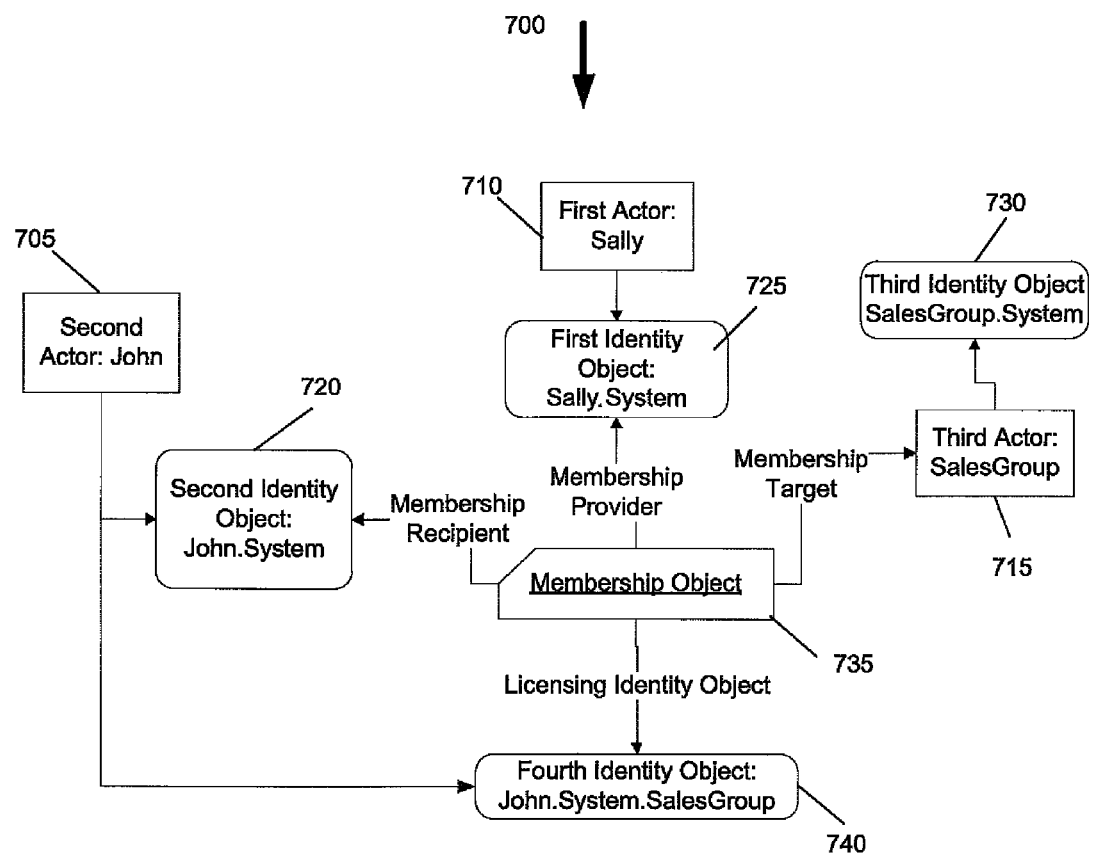
Figure 7. Membership Example – User and Group

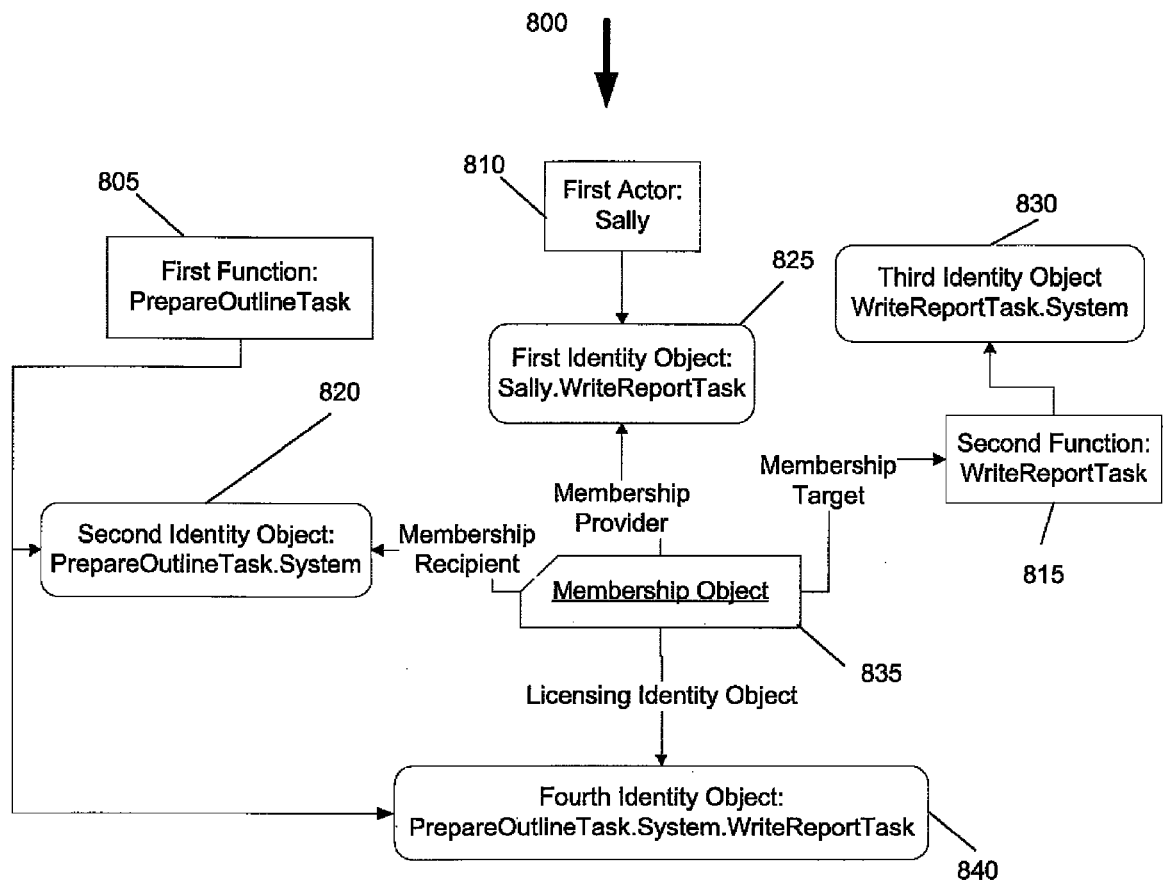
Figure 8. Membership Example – Functions as Tasks

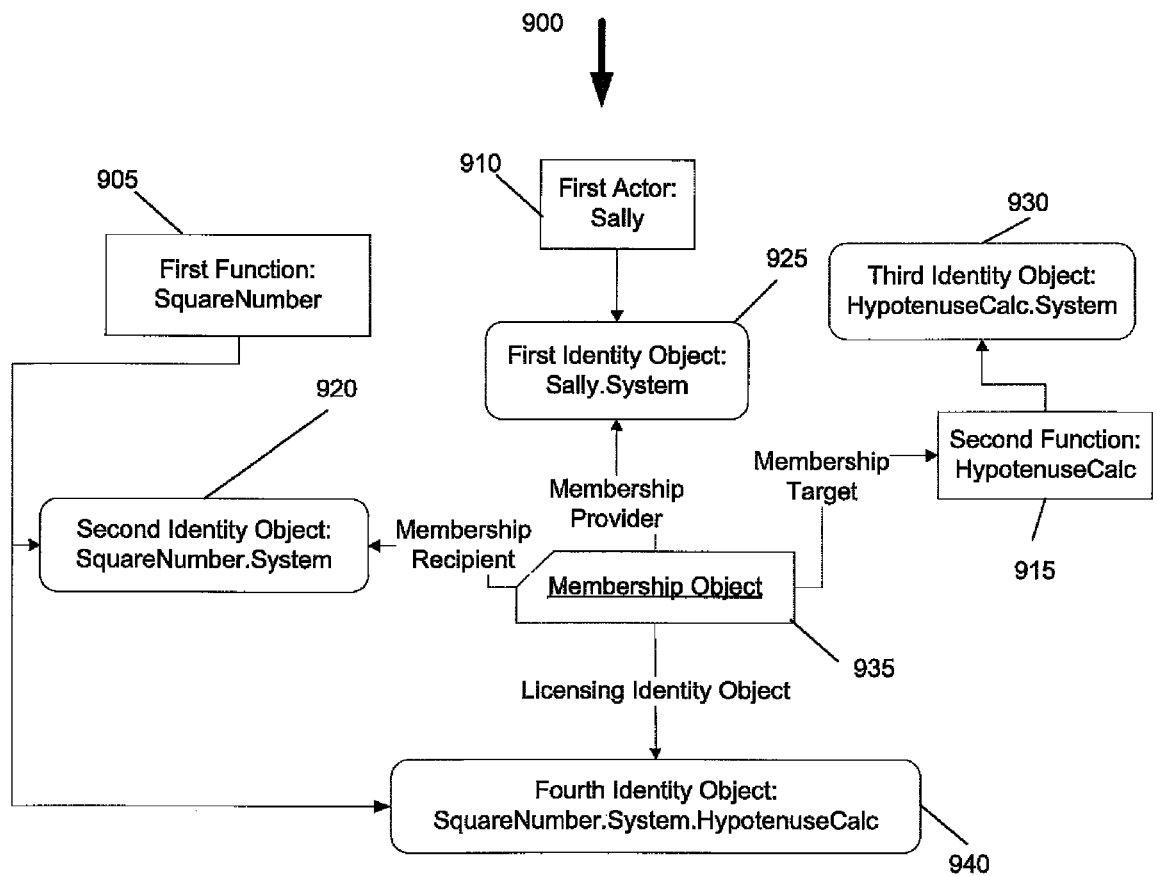
Figure 9. Membership Example – Functions as Computations

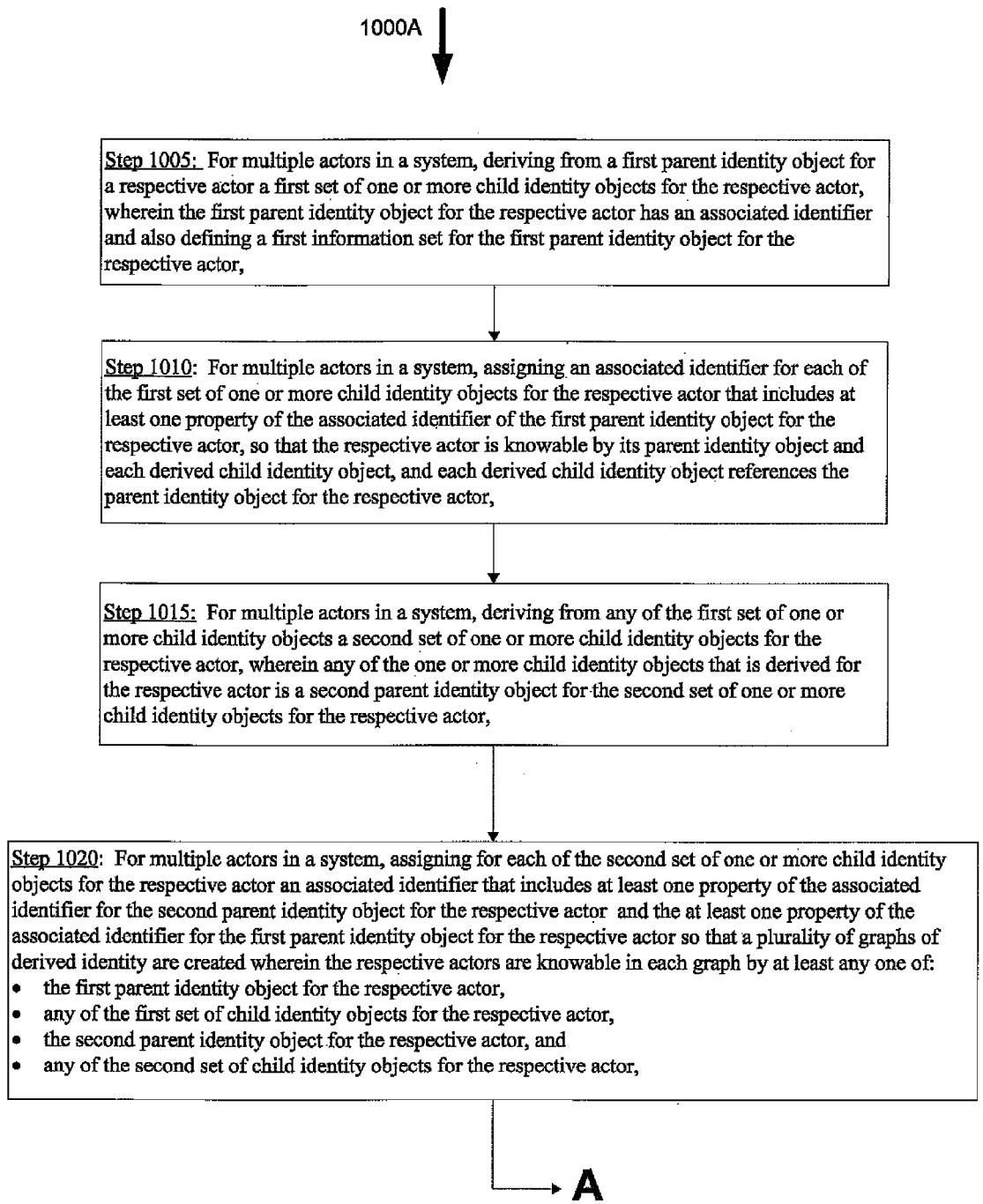
Figure 10A. Exemplary Process Flow for Creating Membership

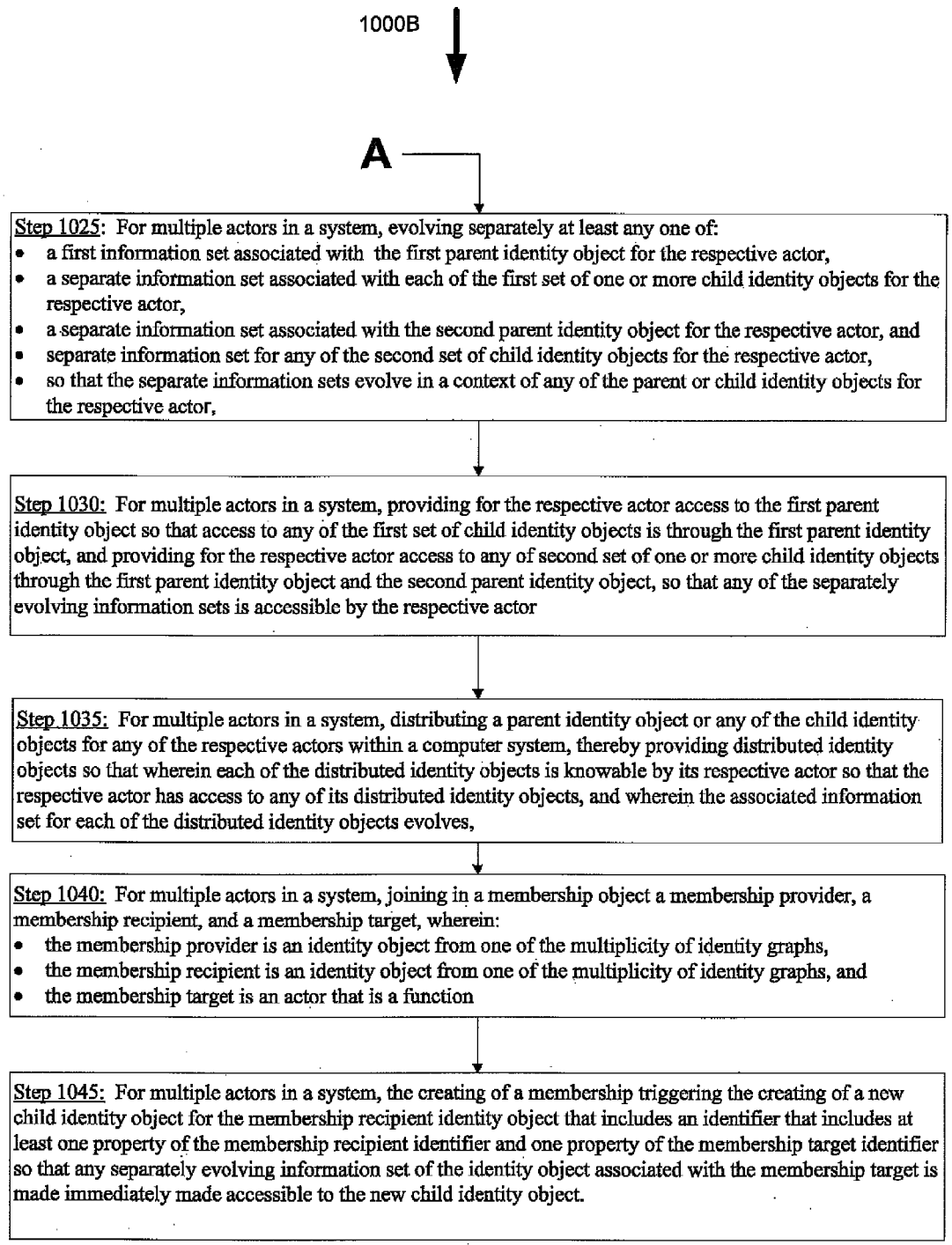
Figure 10B. Exemplary Process Flow for Creating Membership - continued

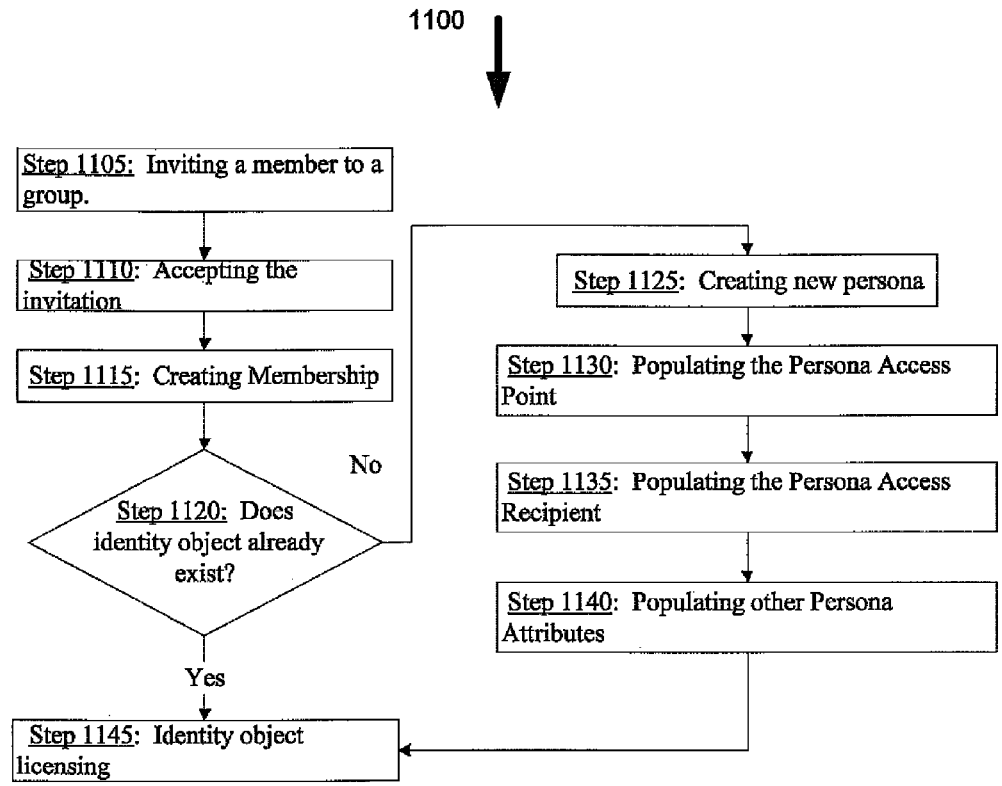
Figure 11. Process Flow for Deriving Multiple Personas from a Single Persona
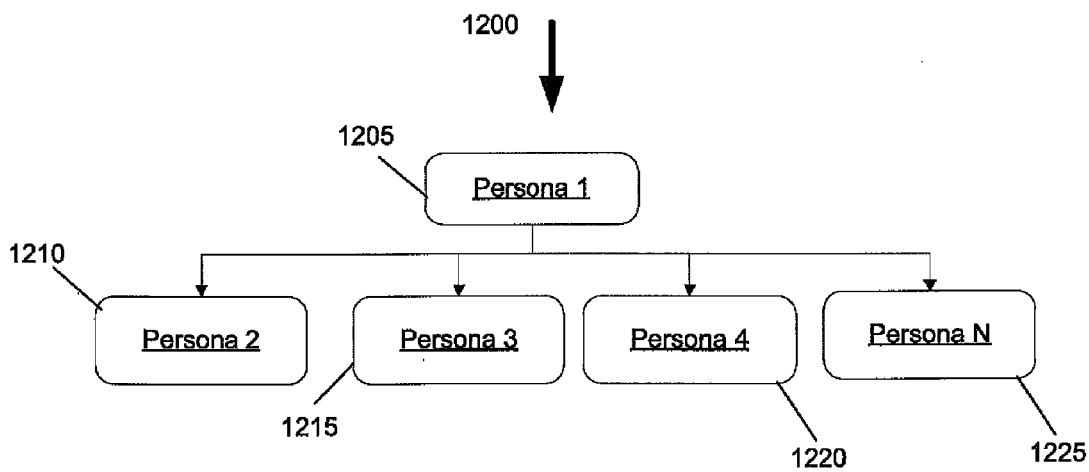
Figure 12. Logical Organization of Simple Derived Persona Graph

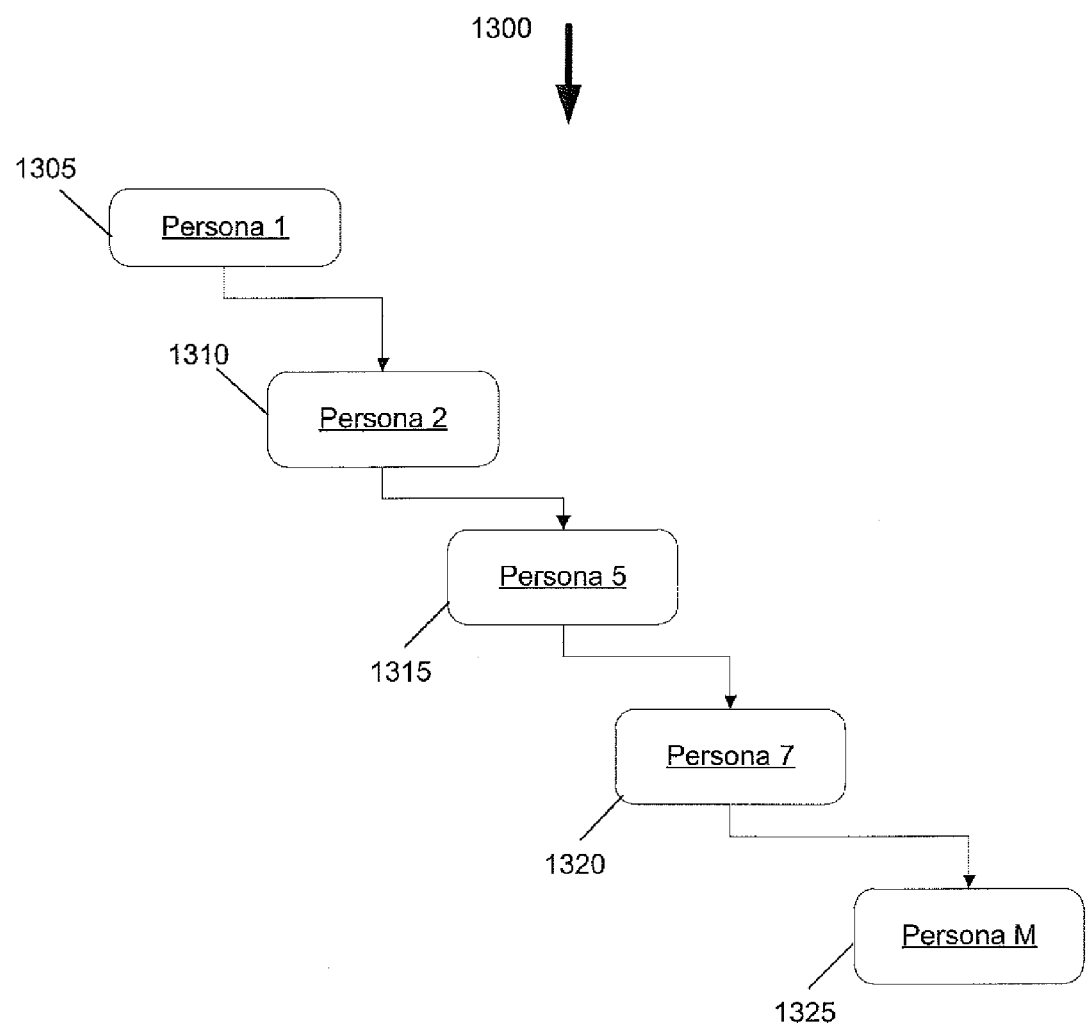
Figure 13. Logical Organization of Multi-Level Derived Persona Graph

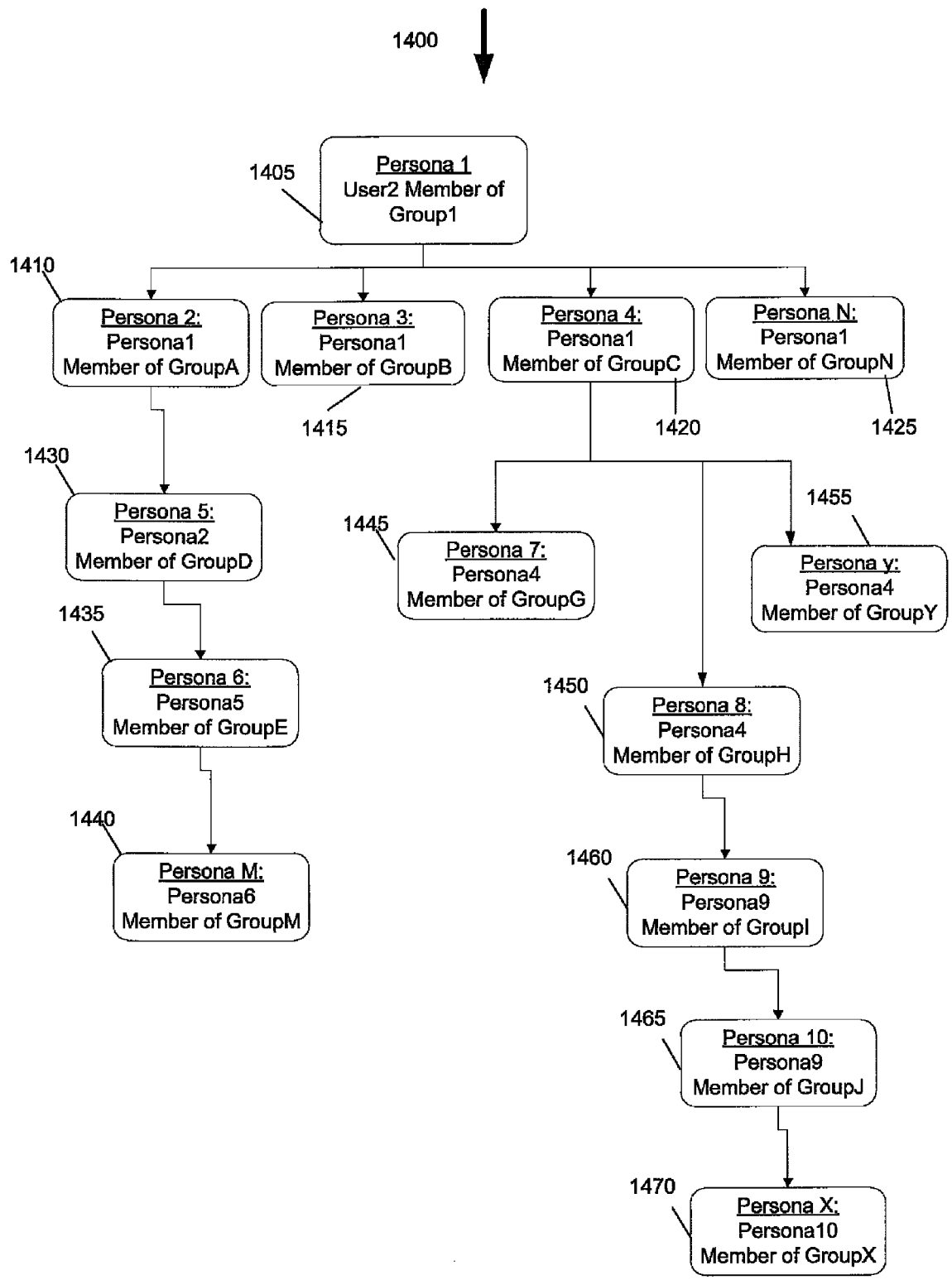
Figure 14. Logical Organization of Single and Multi-Level Derived Persona Graph

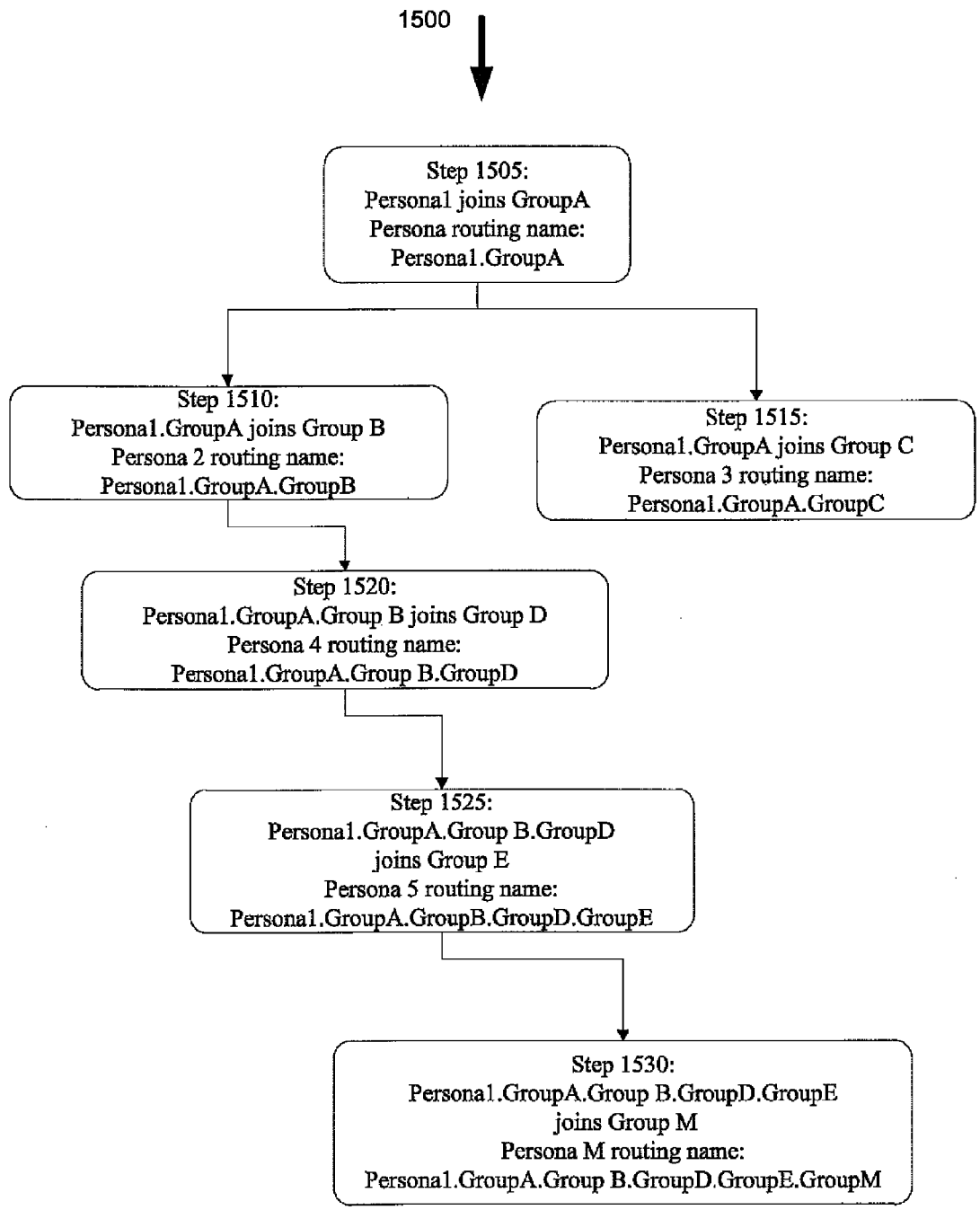
Figure 15: Example Routing Name Assignment in a Graph of Derived Personas

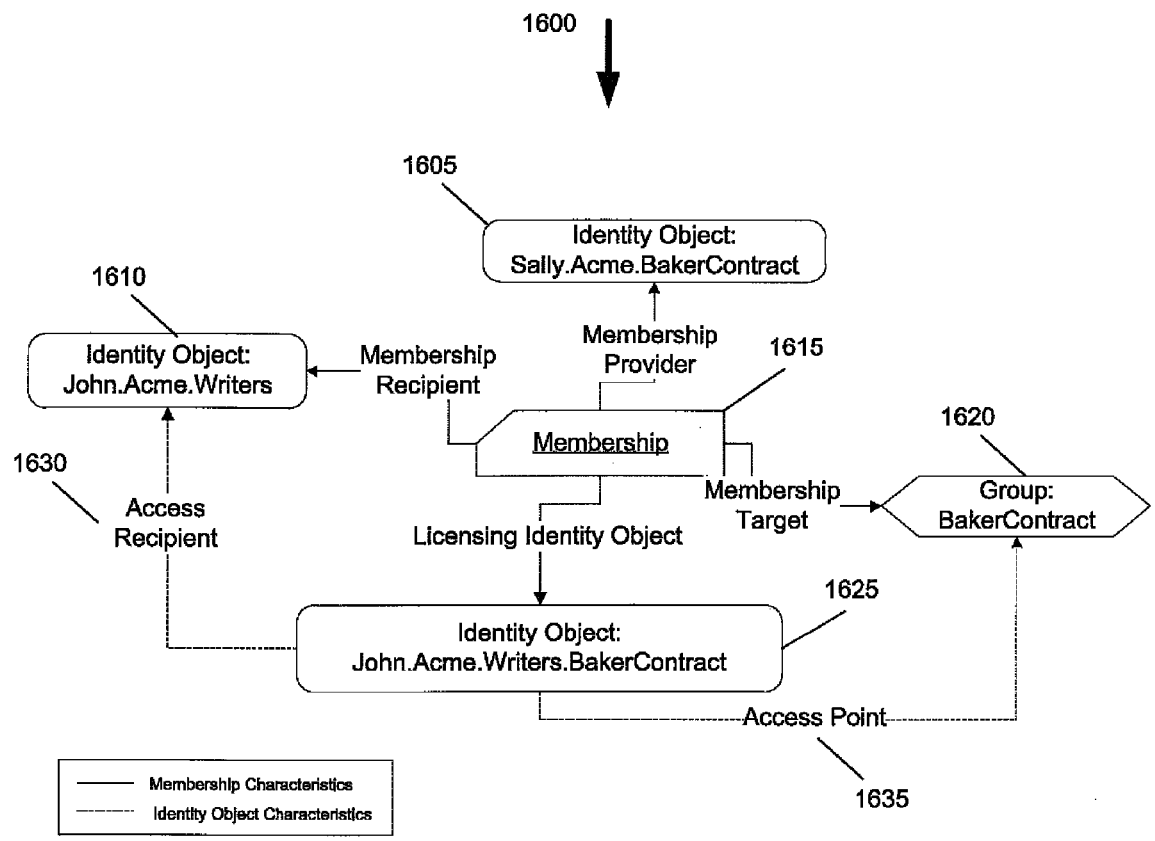
Figure 16. Persona and Membership

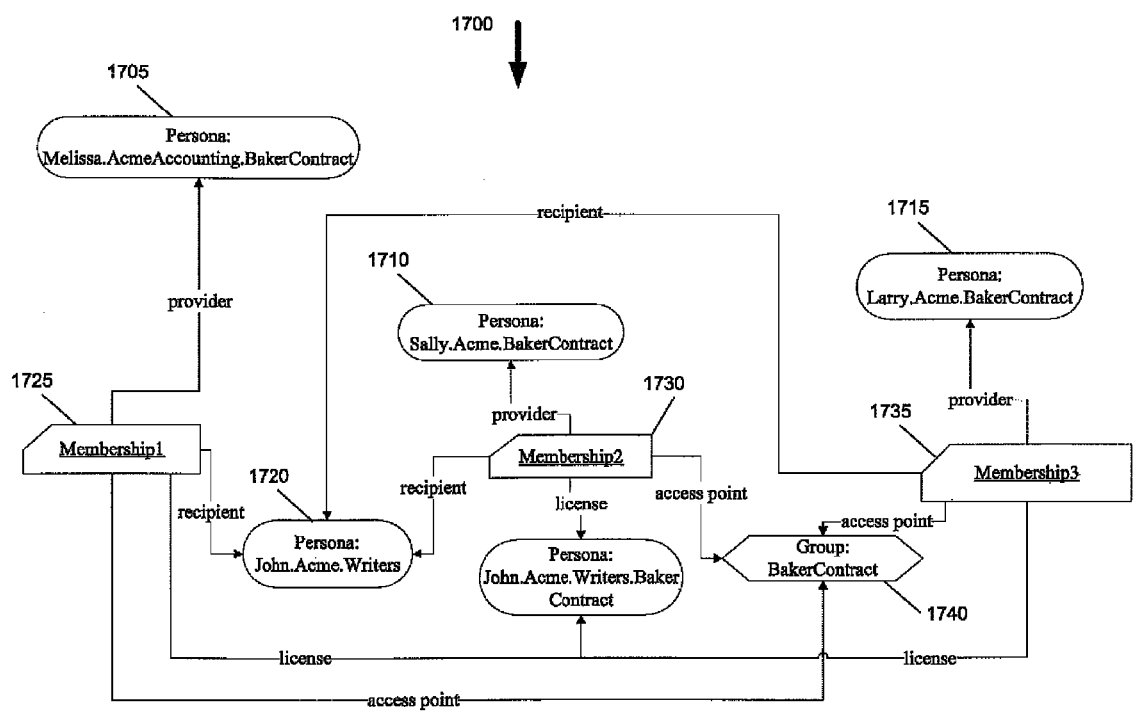
Figure 17. Derived Persona with Multiple Access Providers for the Same Group Membership

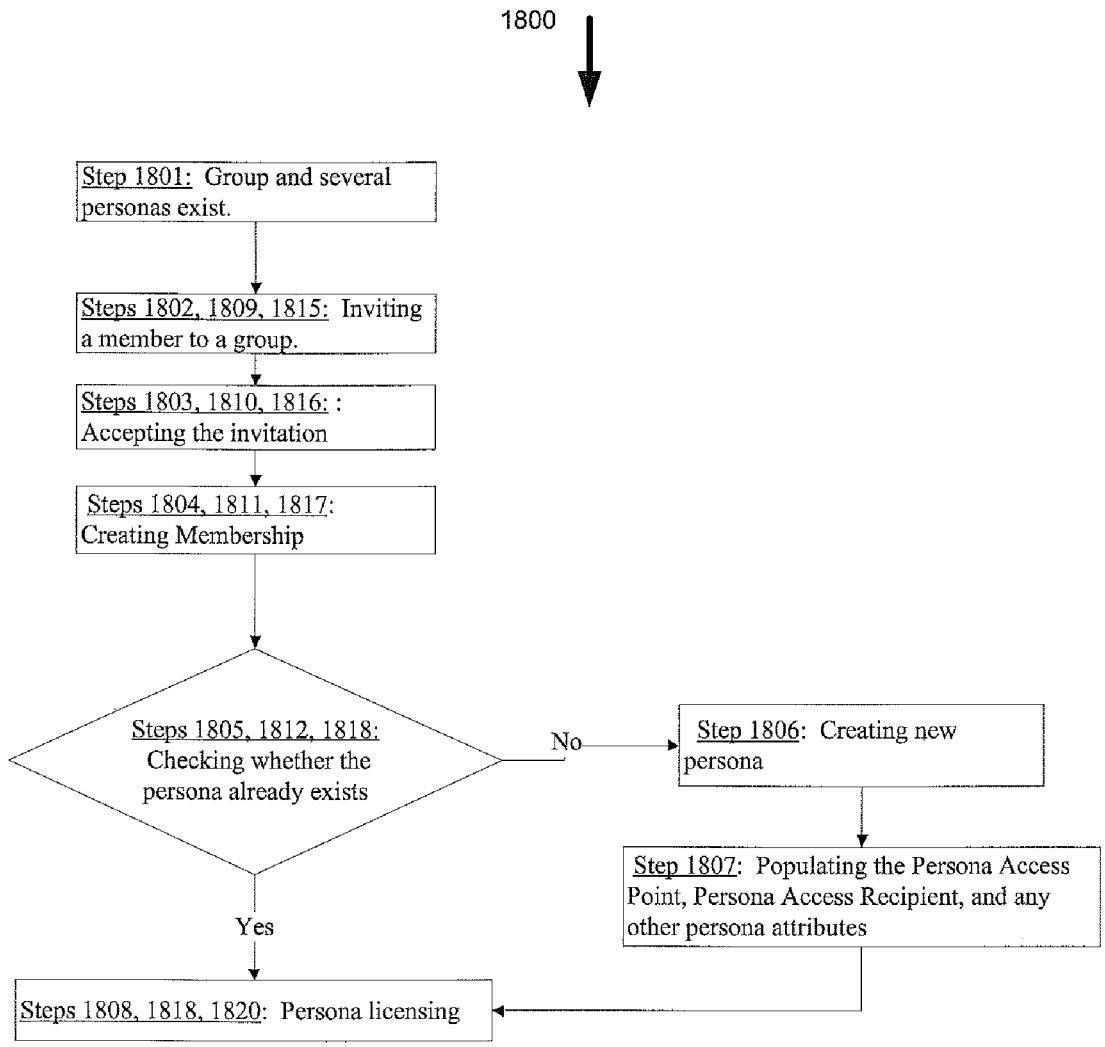
Figure 18. Multiple Membership Process Flow

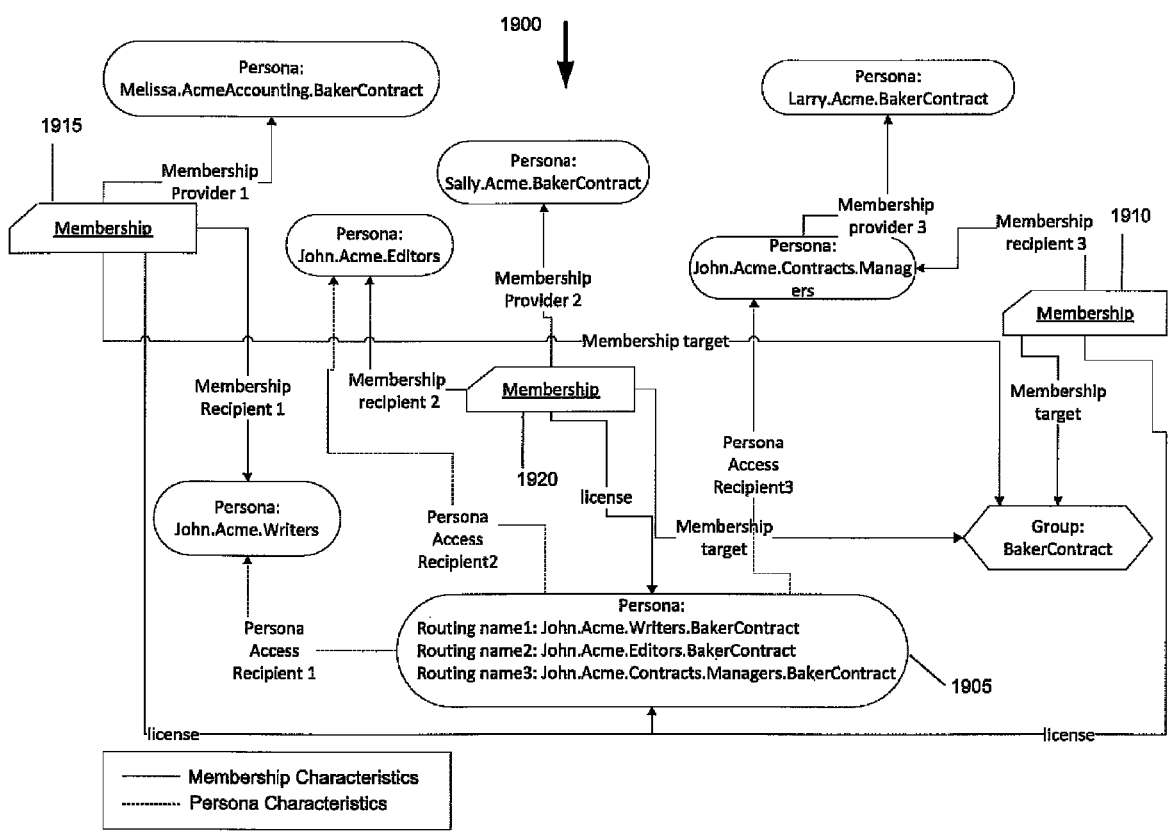
Figure 19. Persona Deriving from Multiple Parent Personas

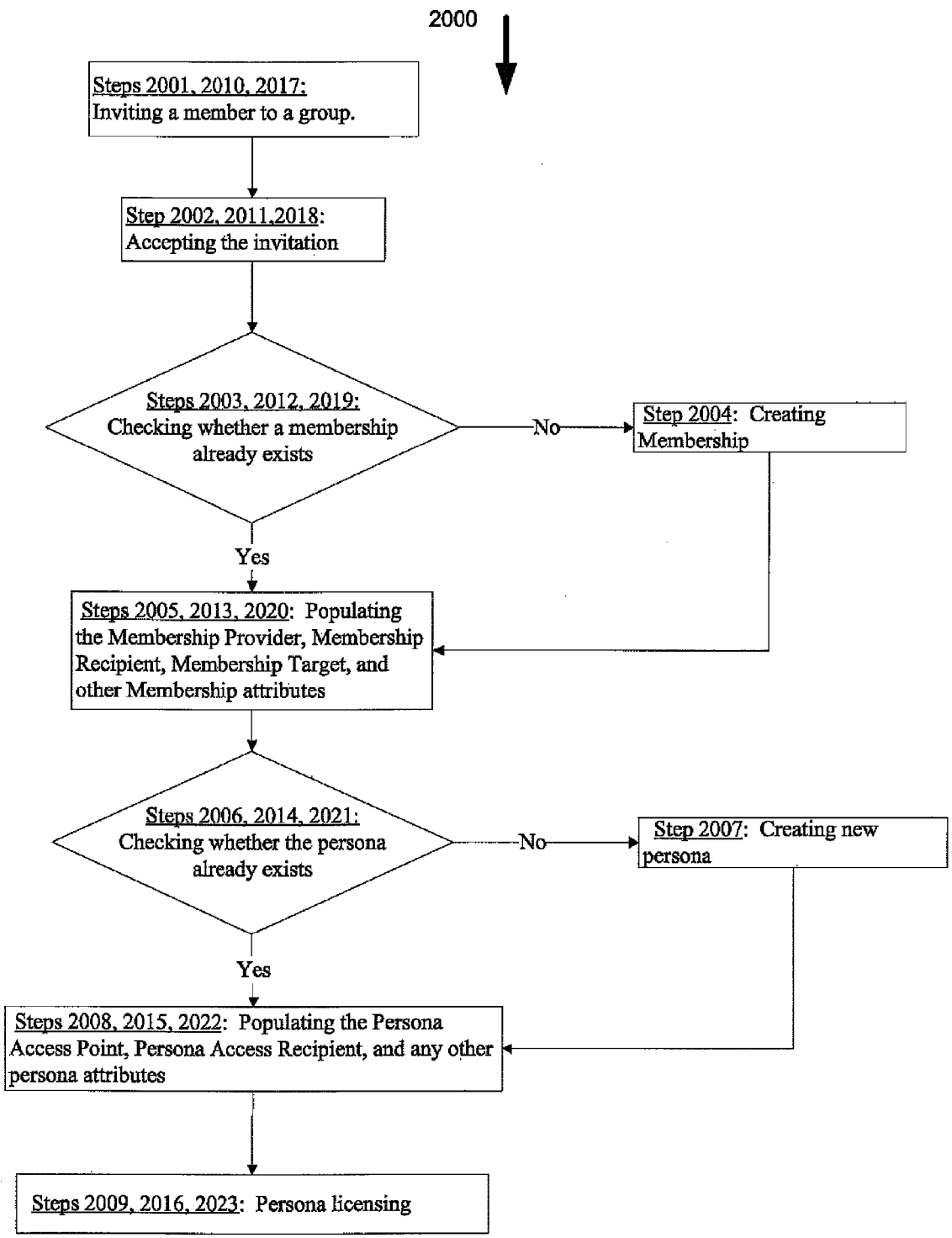
Figure 20. Flow Diagram: Persona Deriving from Multiple Parent Personas

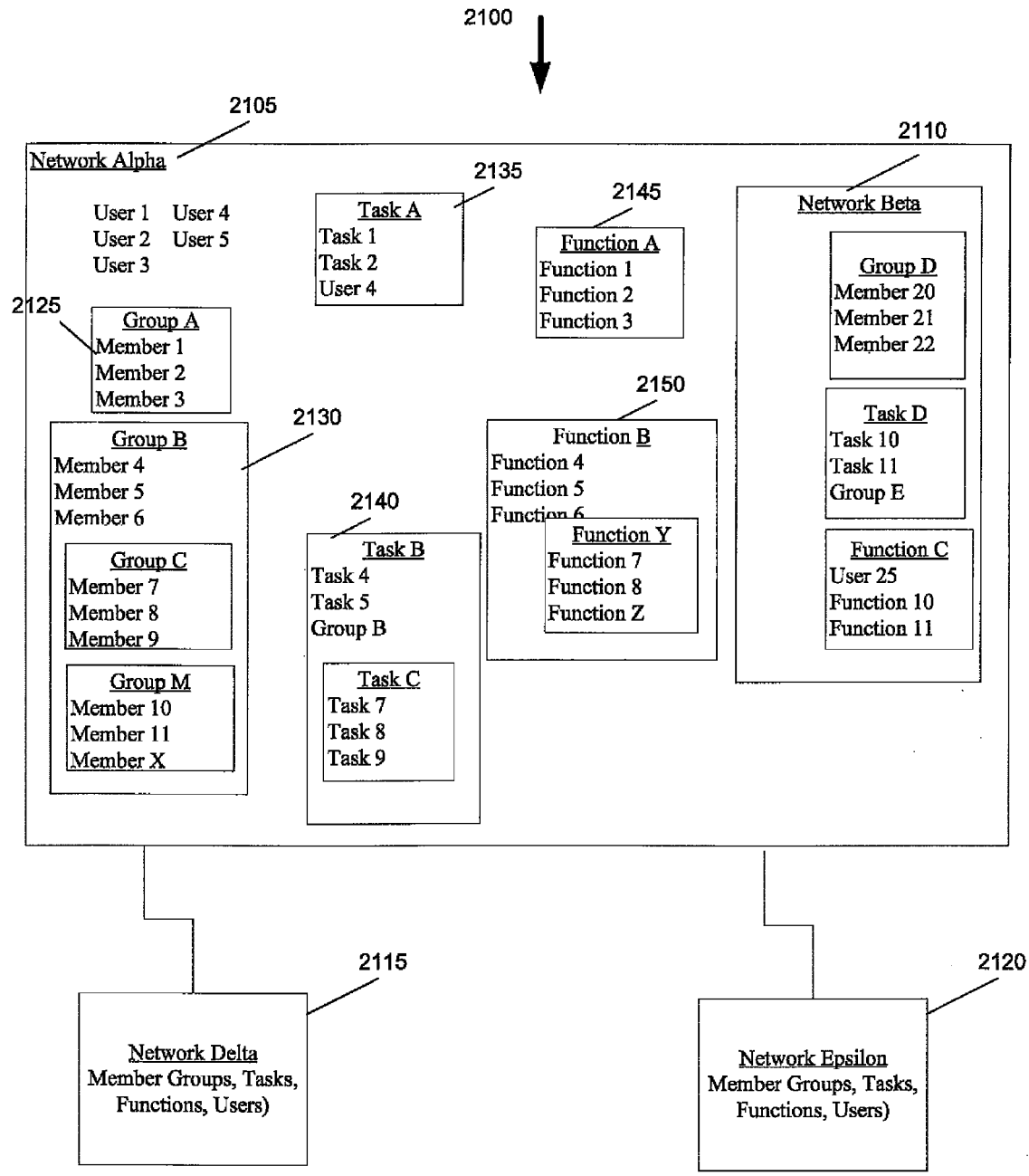
Figure 21. Function Decomposition through Memberships and Personas

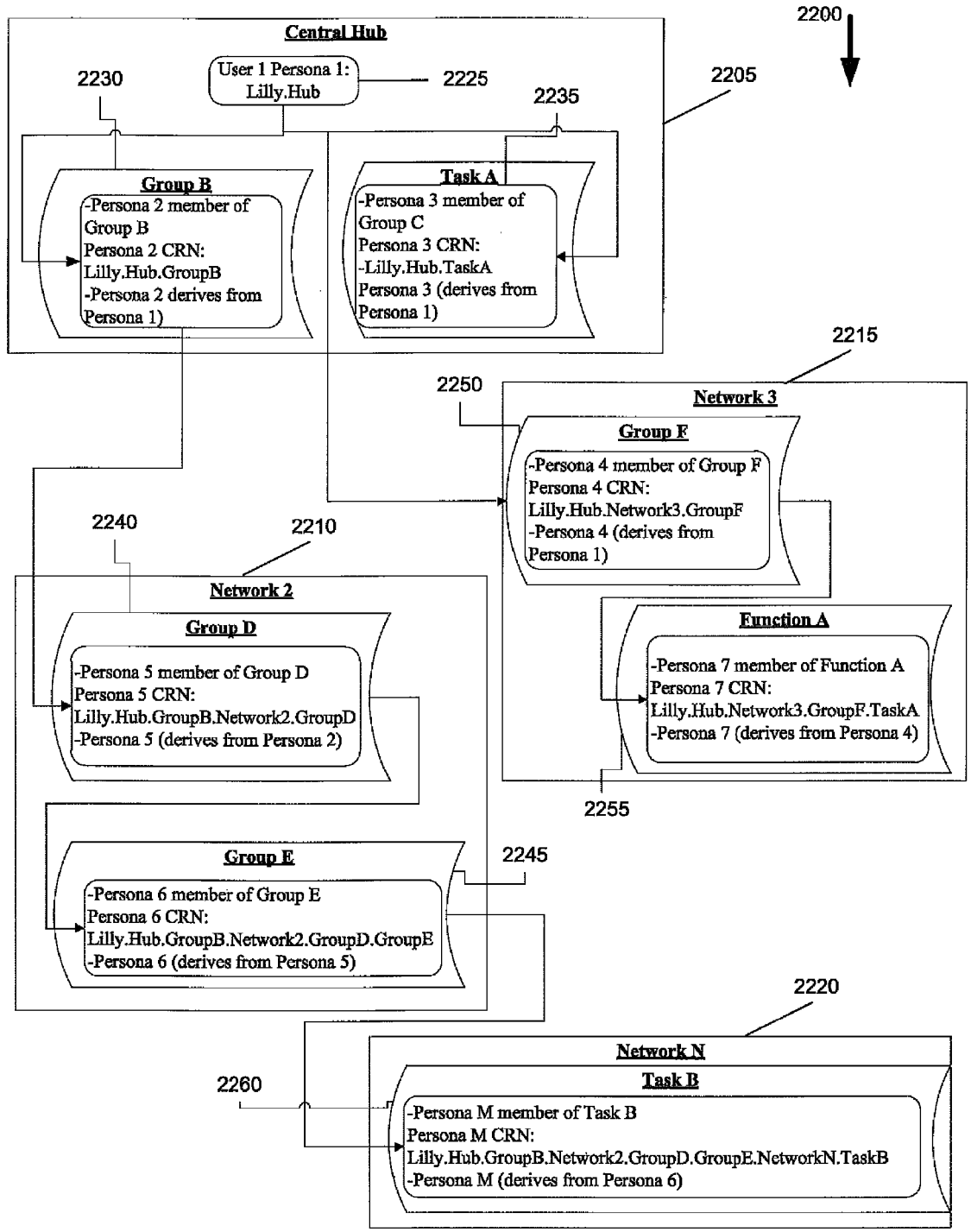
Figure 22. Persona Derivation in a Distributed System

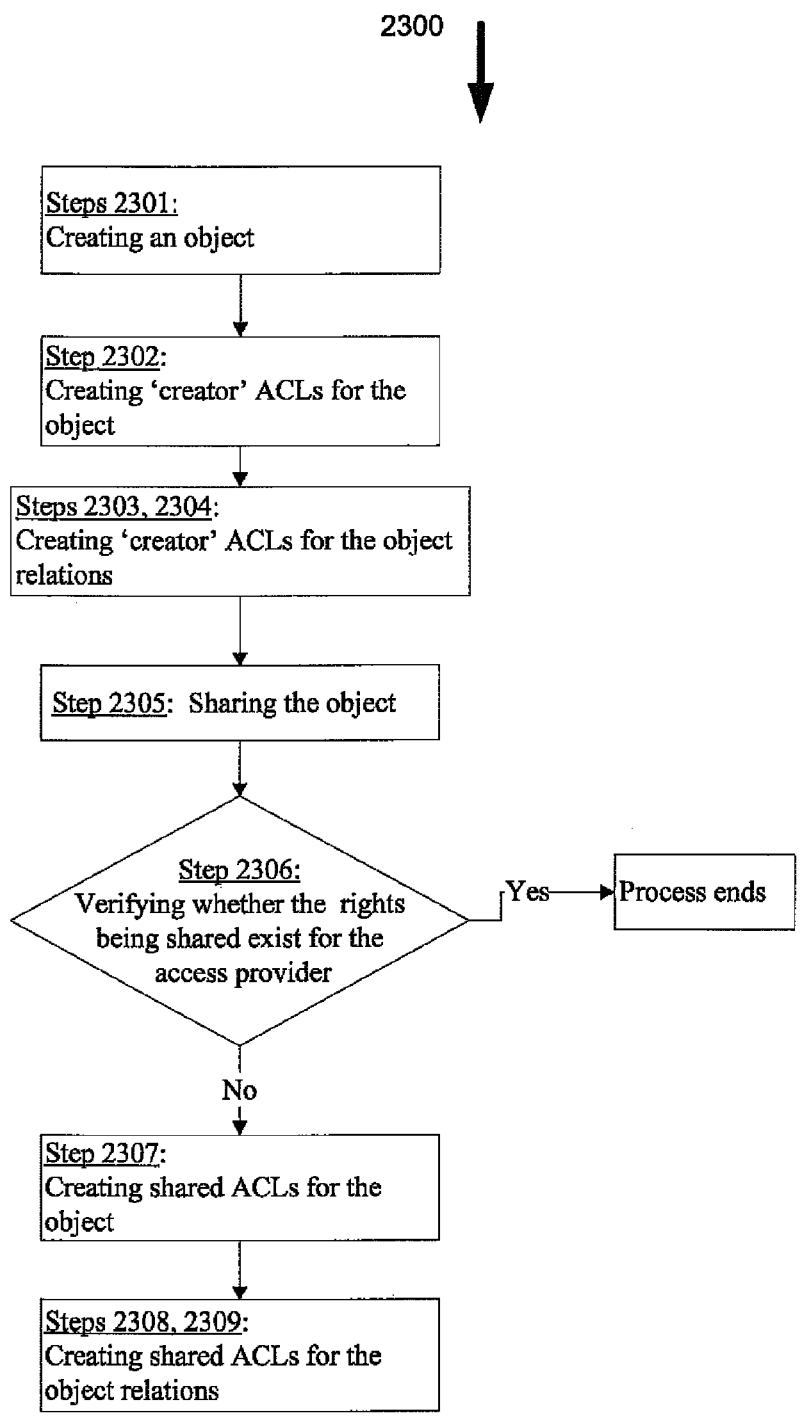
Figure 23. Process Flow for Creating ACLs

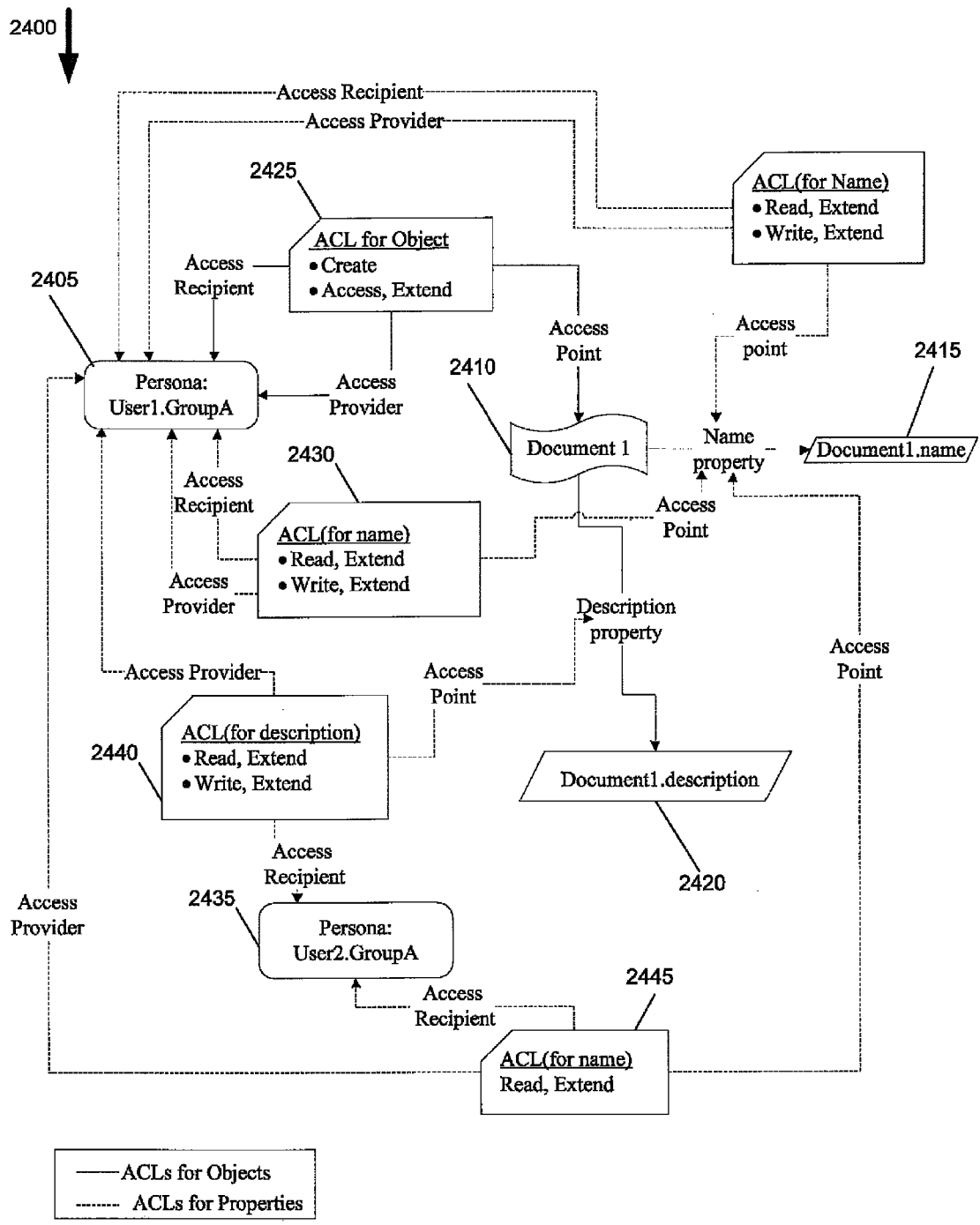
Figure 24. Logical Representation of Example ACLs for a Document

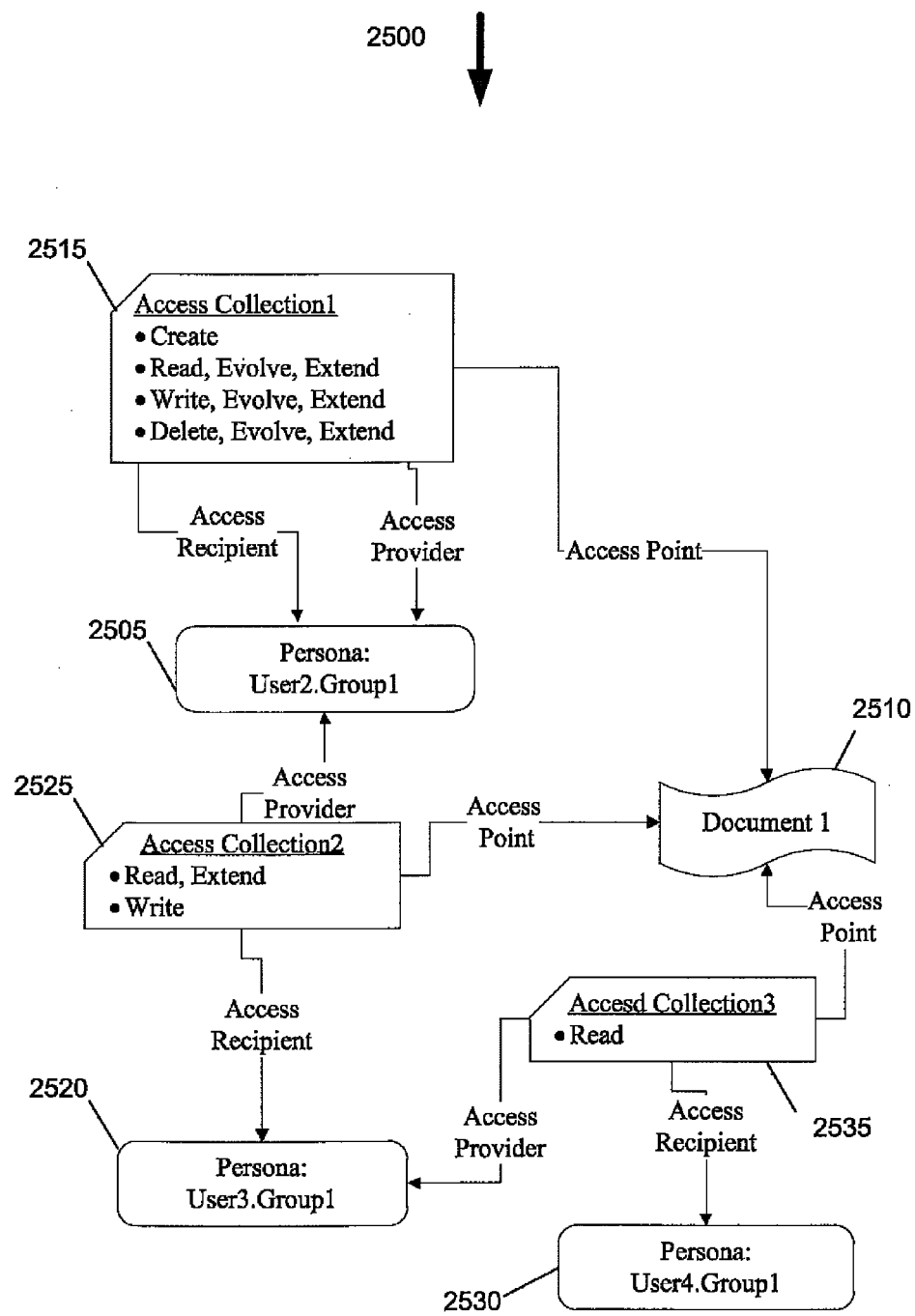
Figure 25. Example of Deriving Access Rights

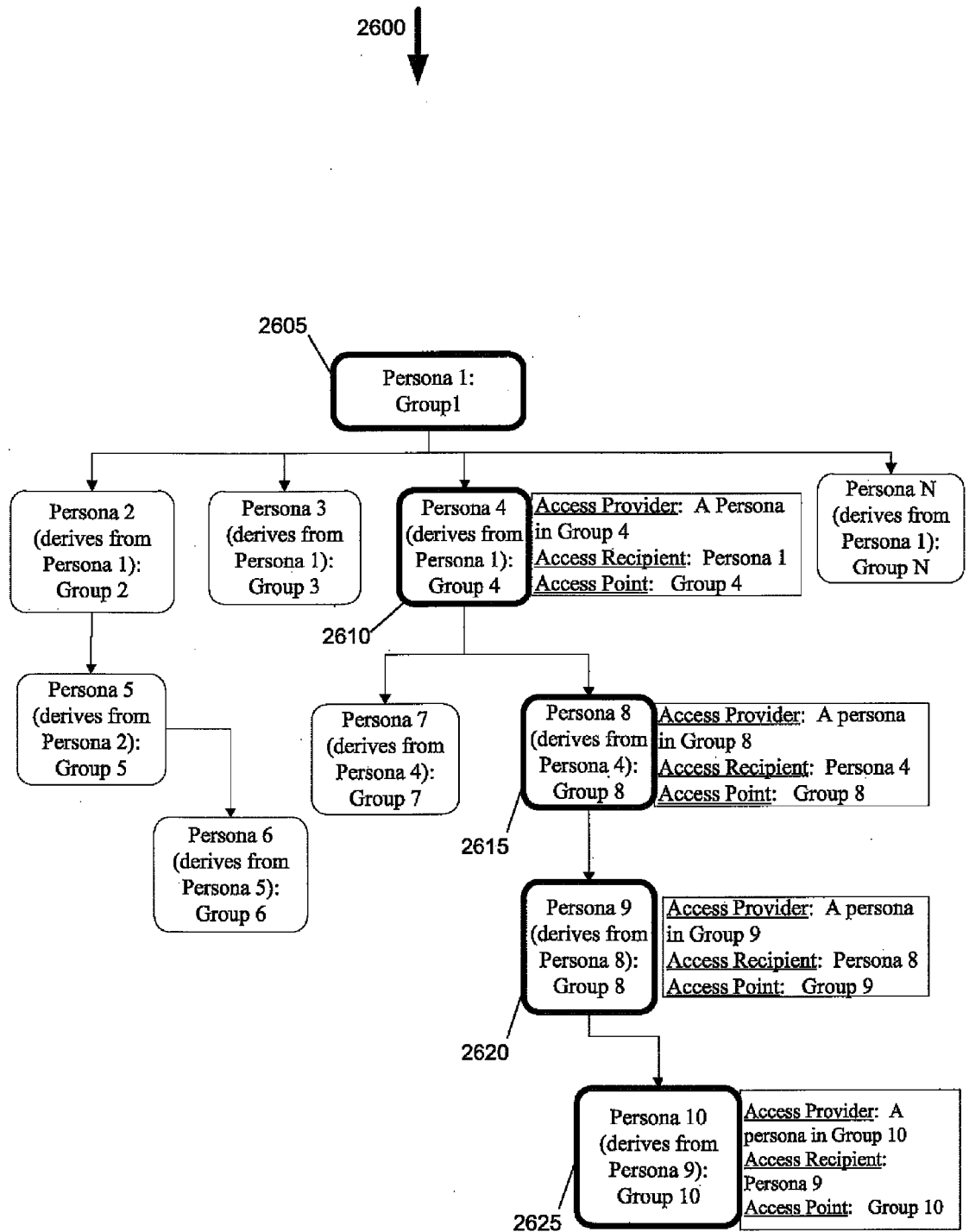
Figure 26. Discovering Identity

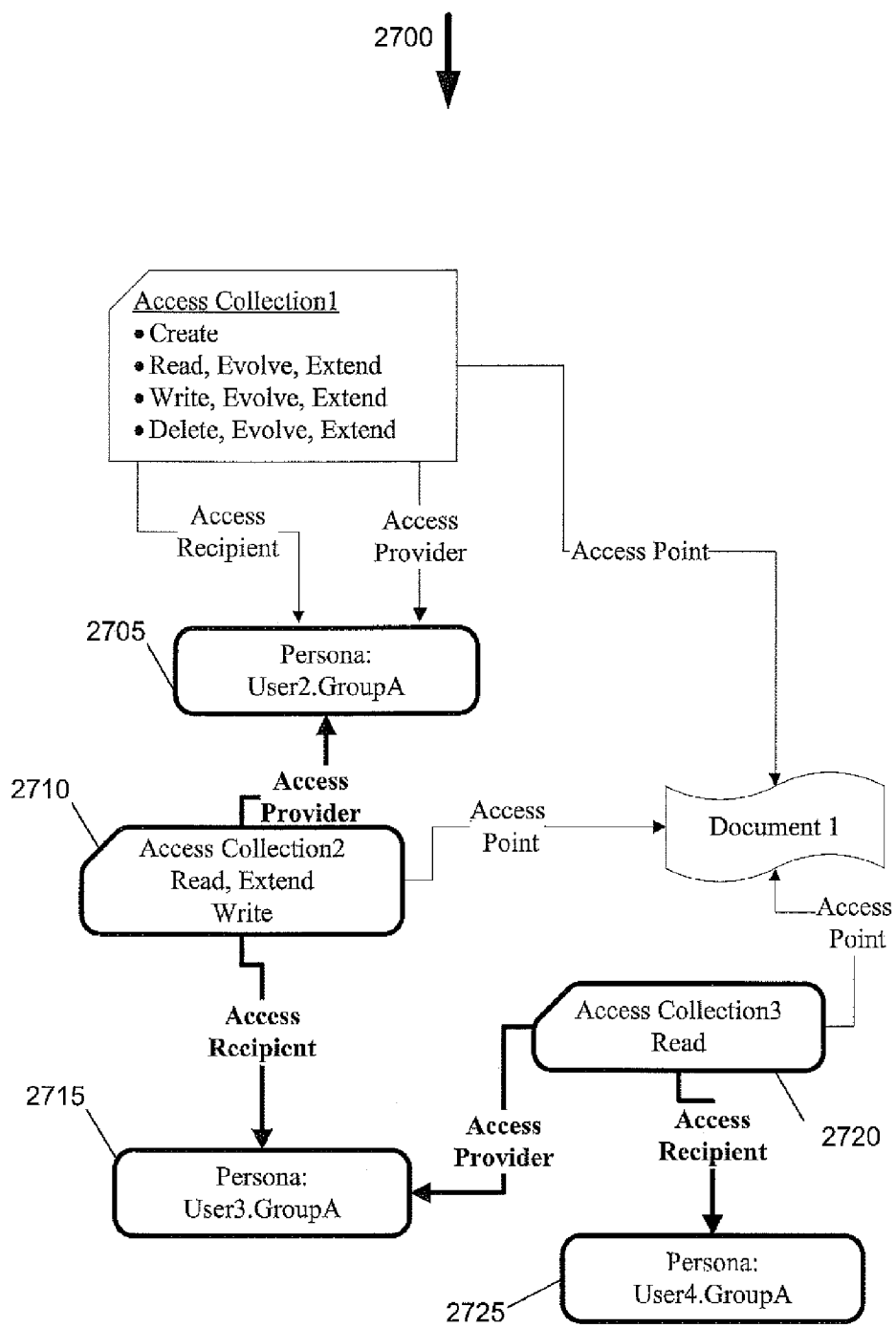
Figure 27. Discovering Access

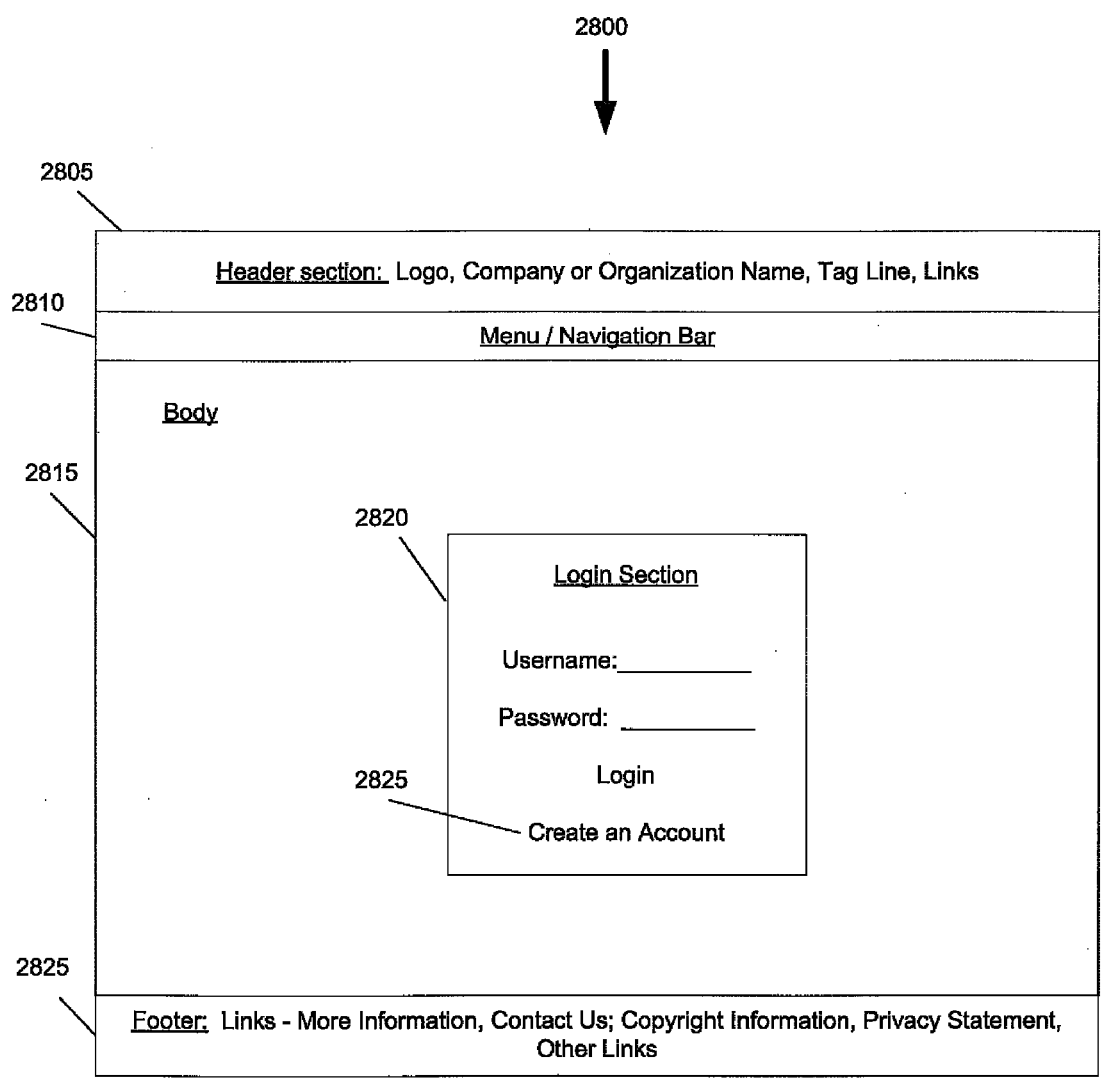
Figure 28. Login Page

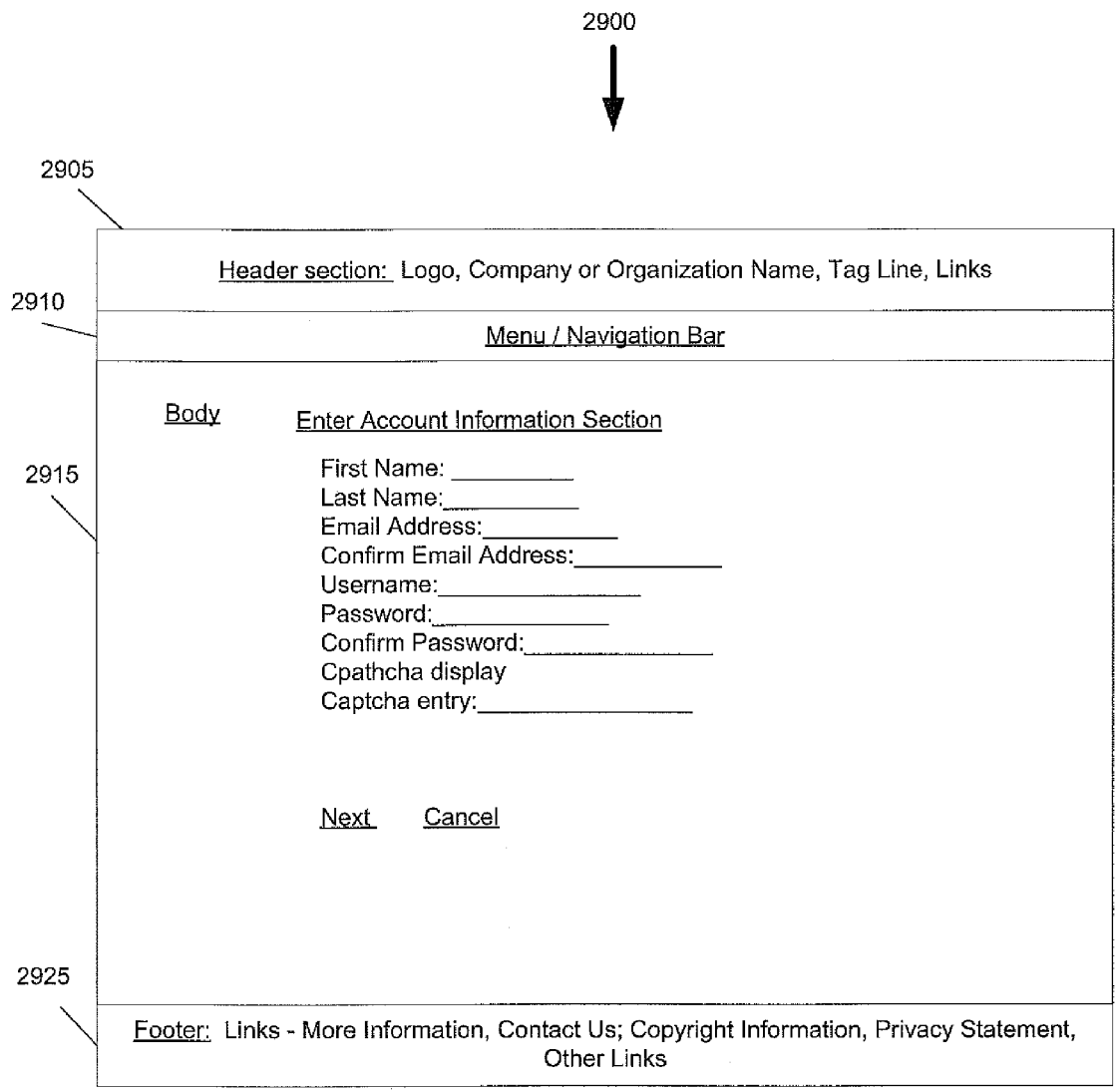
Figure 29. Create Account - Enter Account Information Page

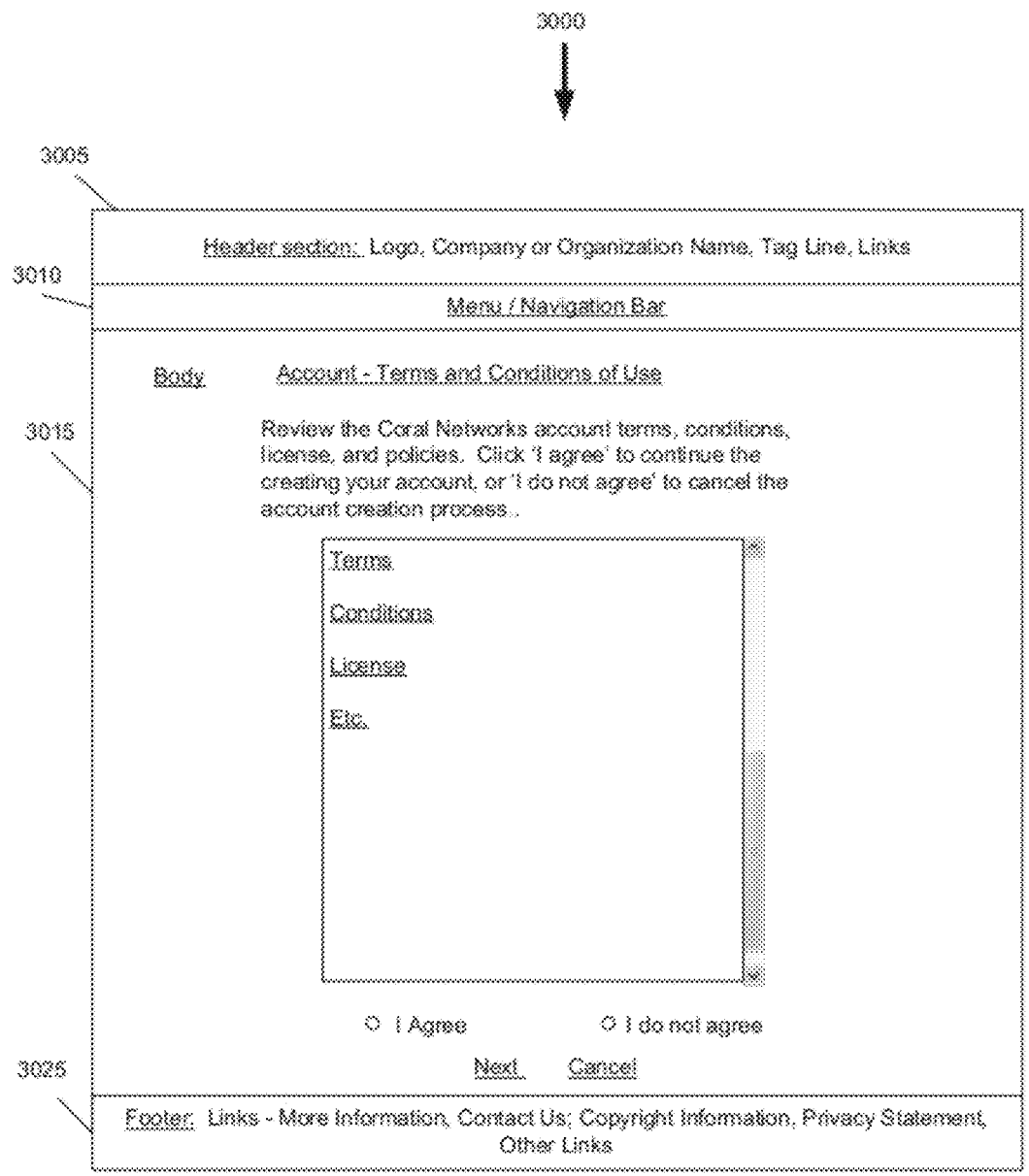
Figure 30. Create Account – Terms and Conditions of Use

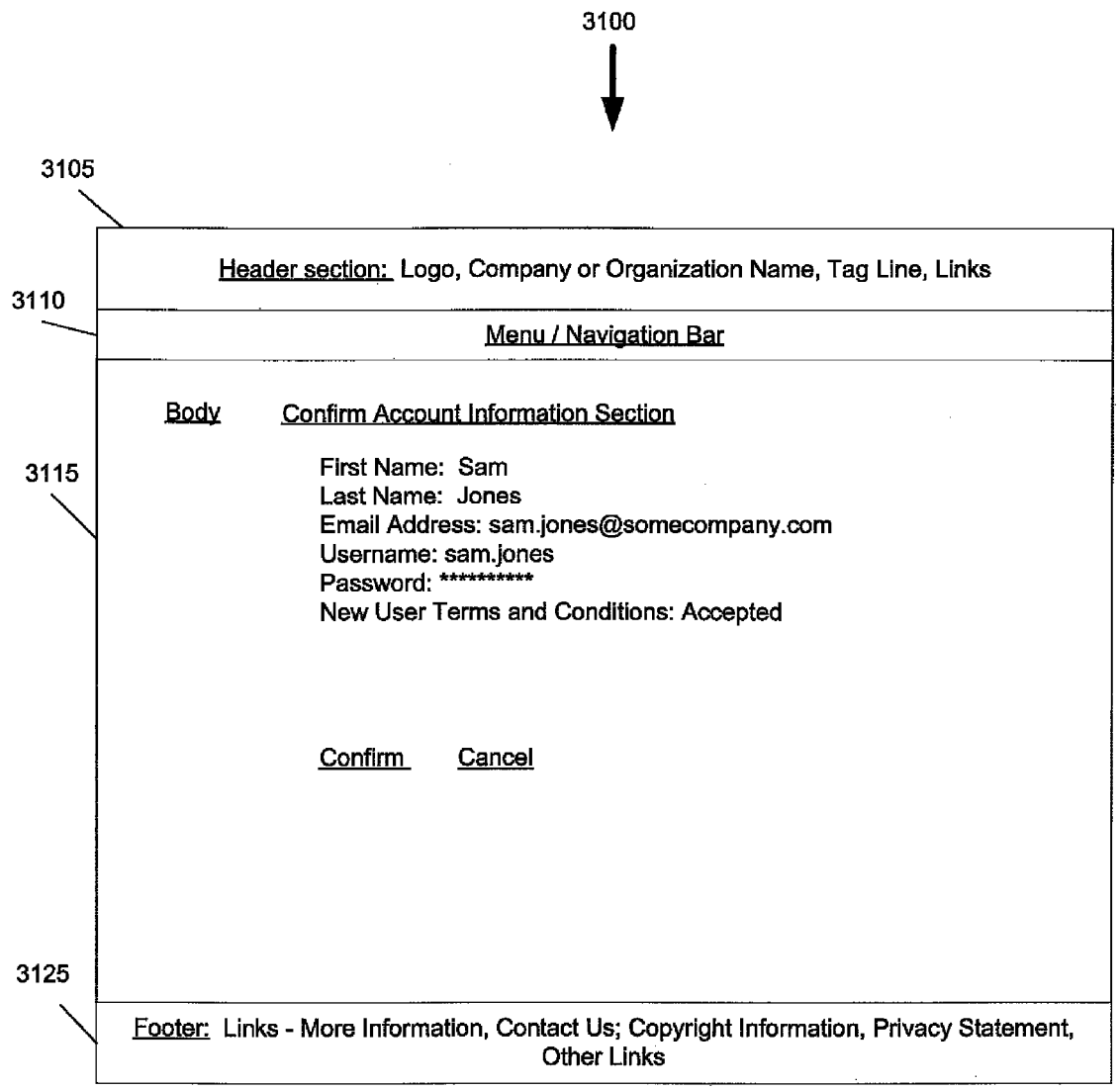
Figure 31. Create Account - Confirm Account Information Page

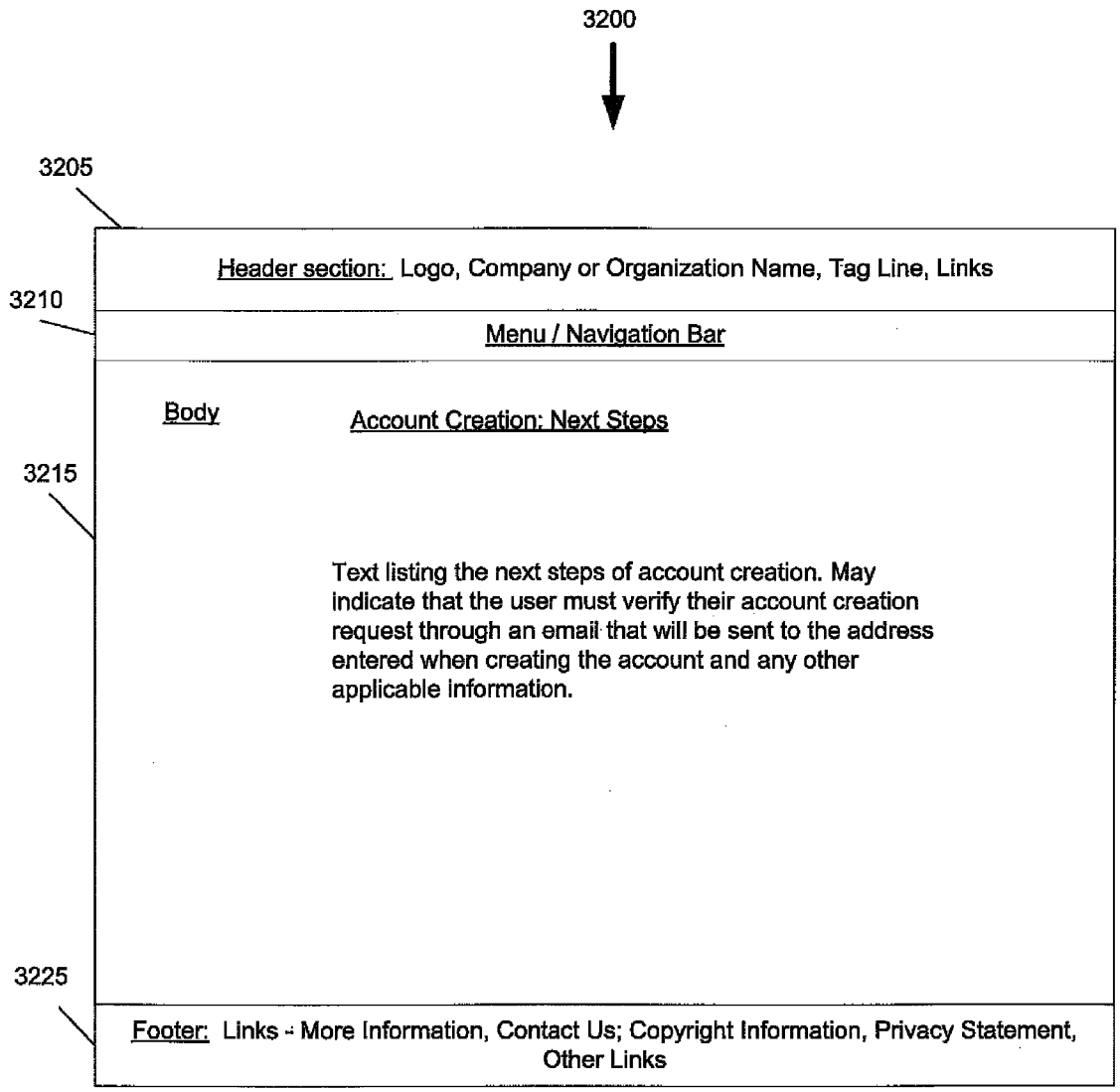
Figure 32. Create Account – Next Steps

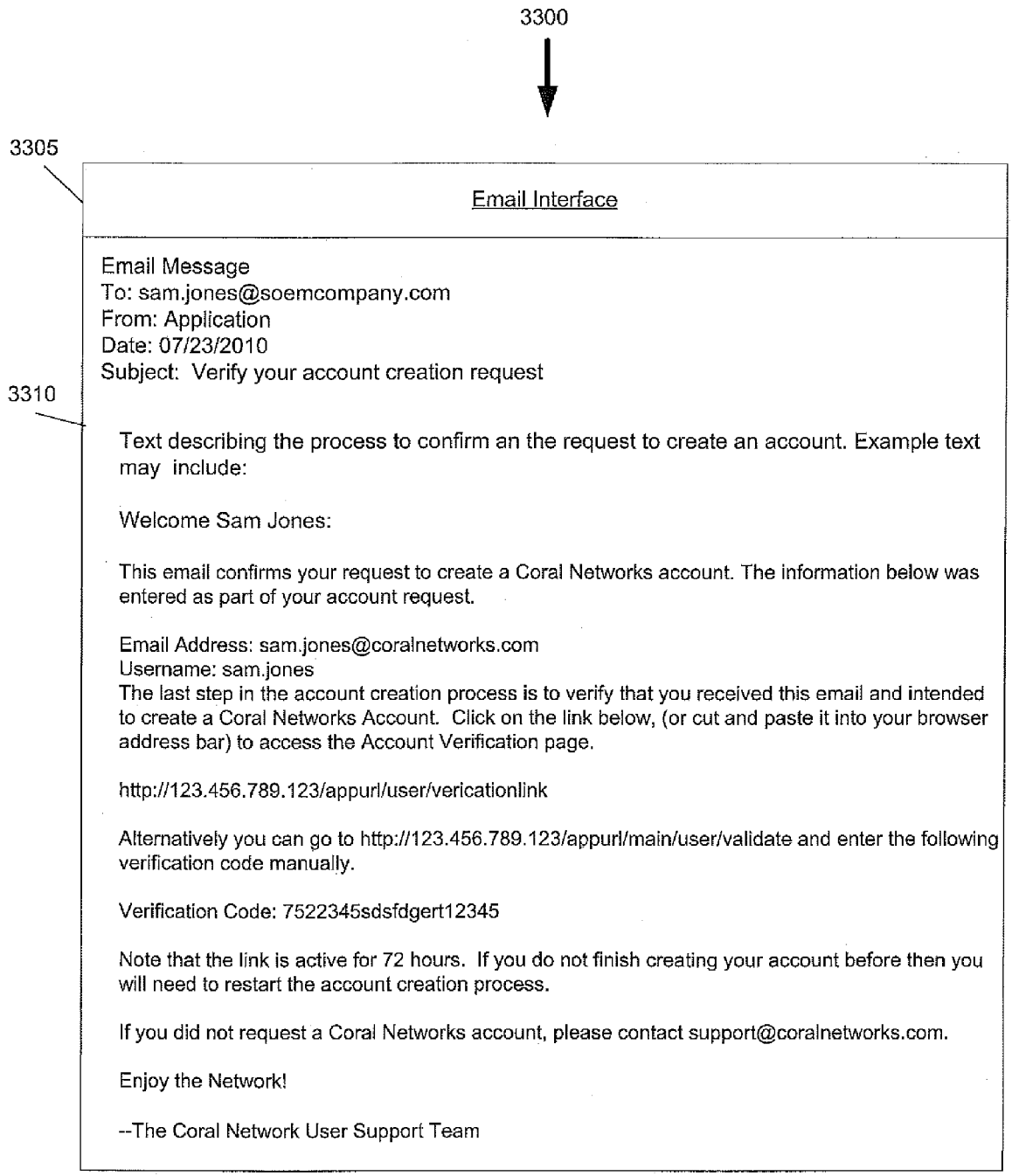
Figure 33. Create Account – Email with Instructions to Verify Account Creation Request

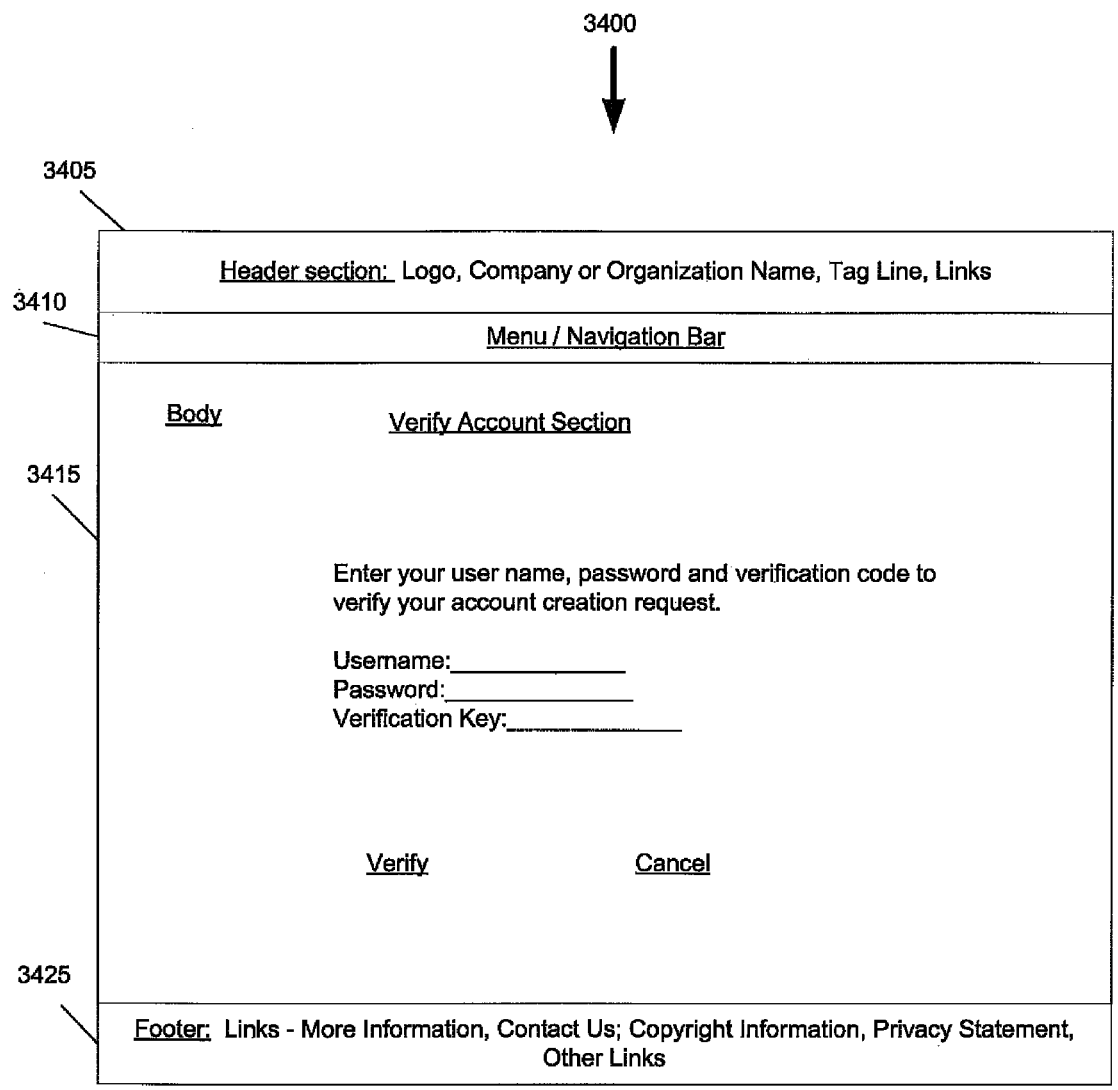
Figure 34. Verify Account Creation Page

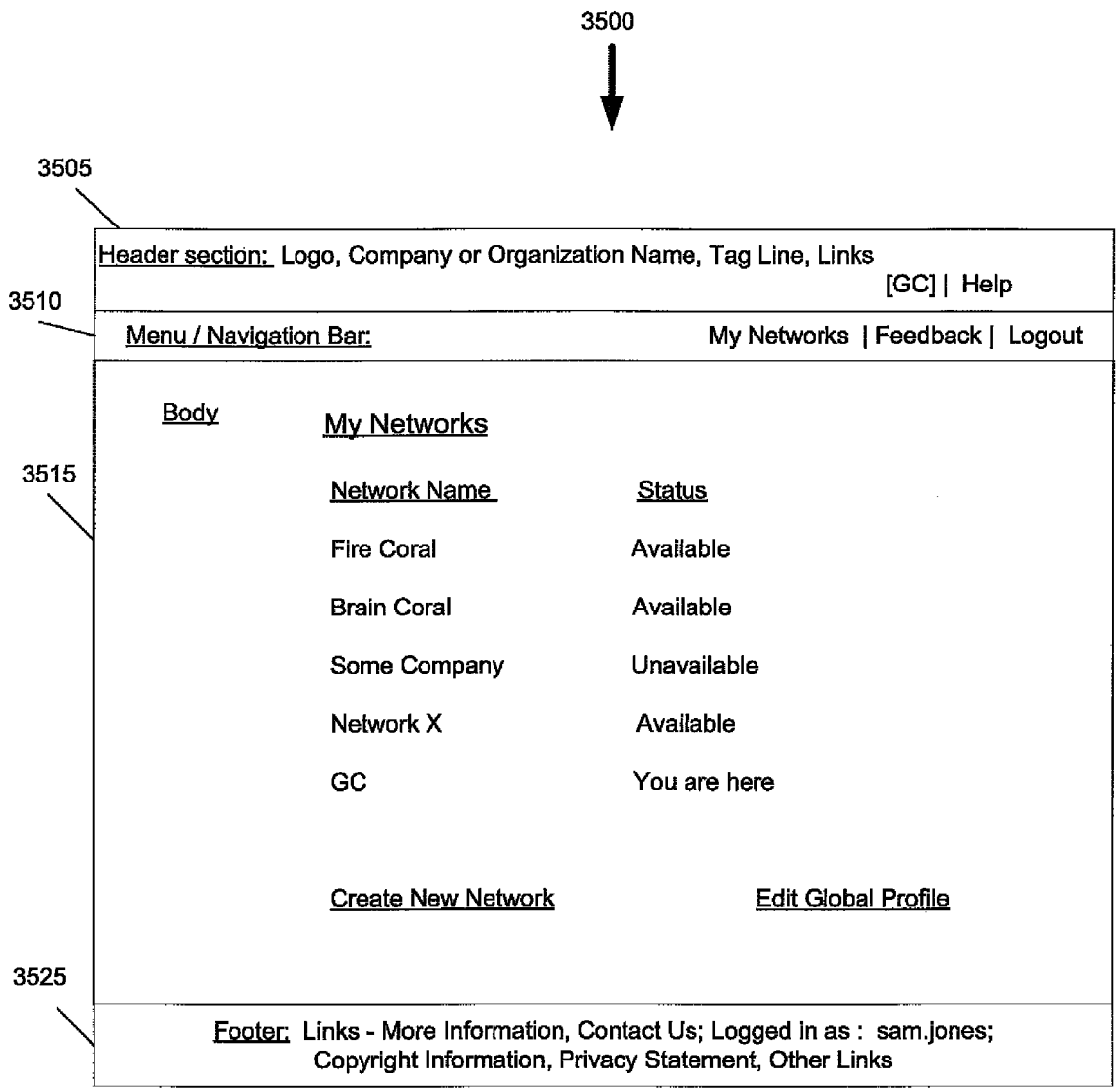
Figure 35. My Networks Page

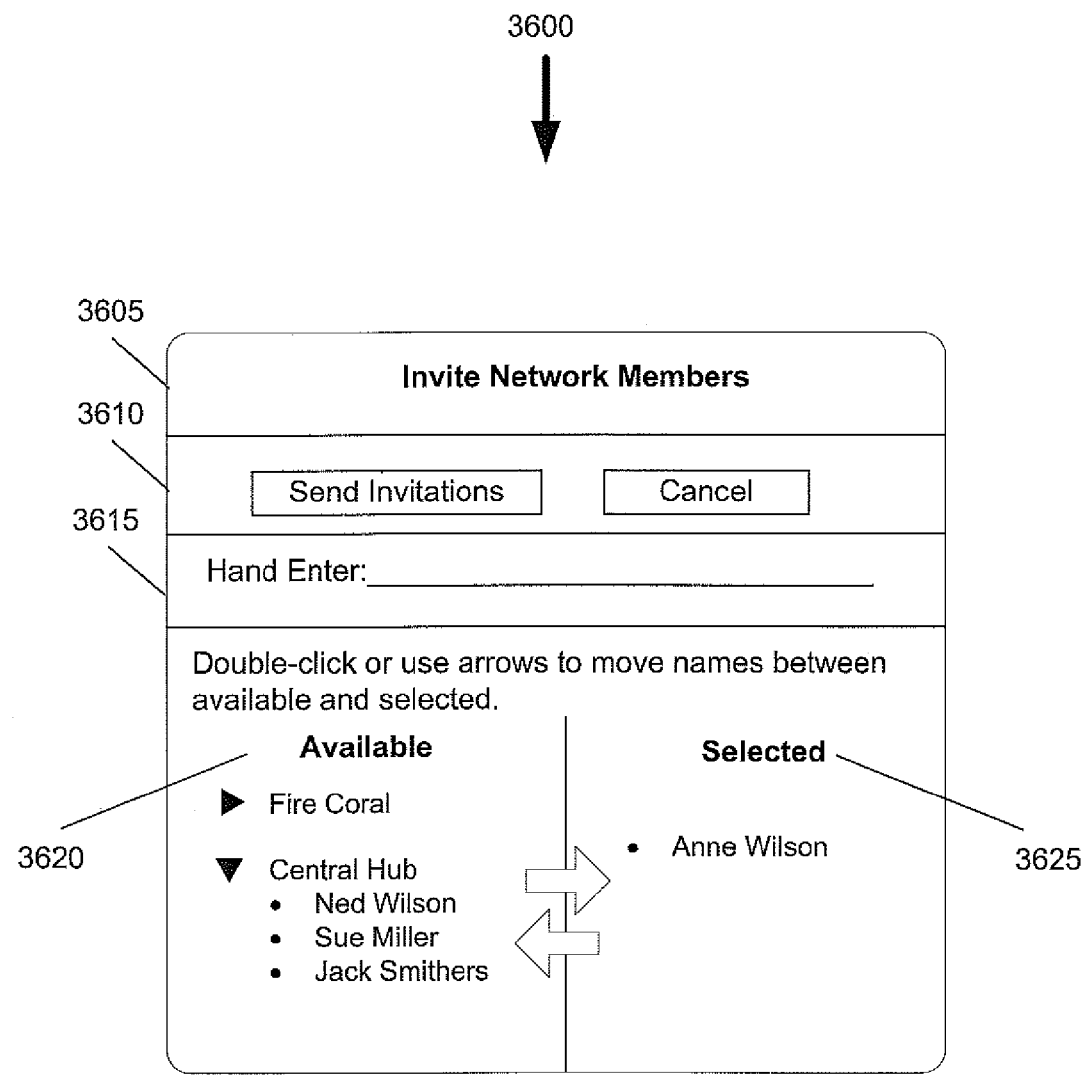
Figure 36. Invite Network Members Popup

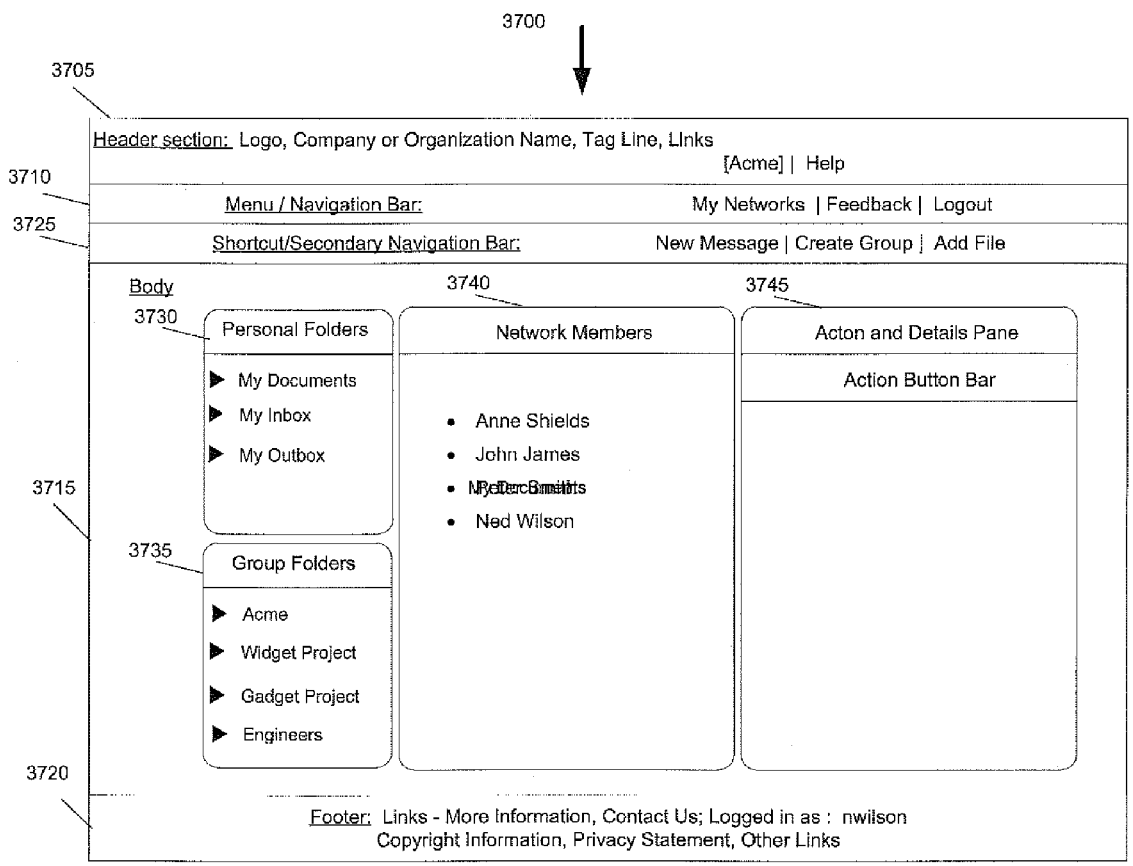
Figure 37. Network Home Page

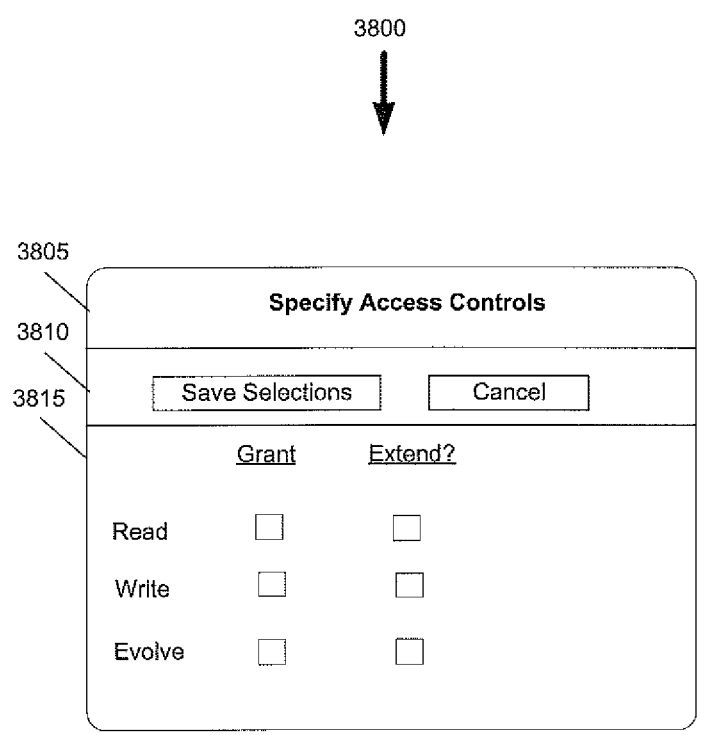
Figure 38. Specify Fine-Grained Access Control when Sharing a File

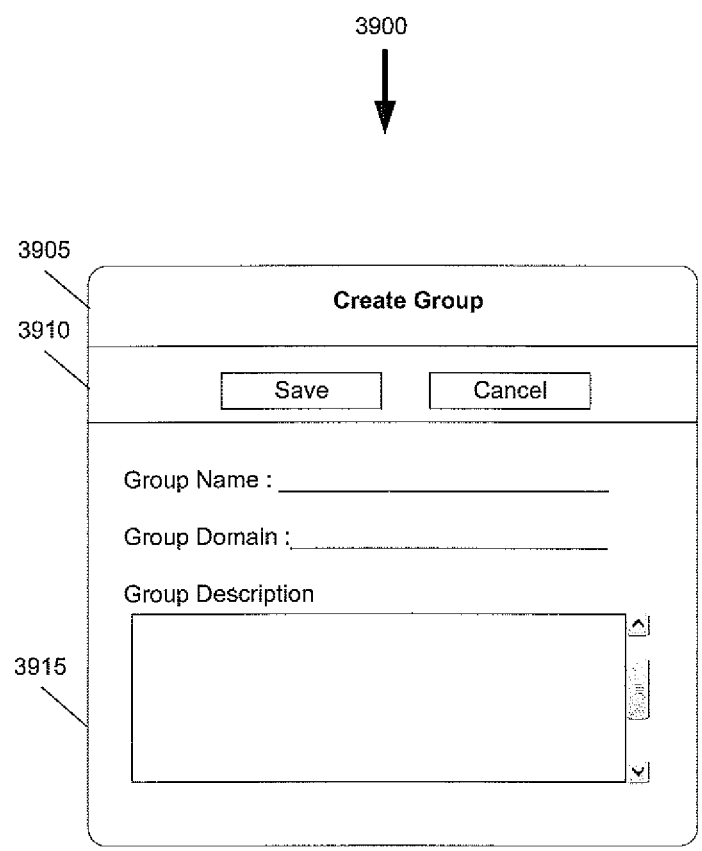
Figure 39. Create Group Popup

SYSTEM AND METHOD FOR ACCESS CONTROL AND IDENTITY MANAGEMENT

CROSS-REFERENCE TO RELATED APPLICATIONS

This application claims priority and benefit of U.S. Provisional Application No. 61/416,881 filed on Nov. 24, 2010, entitled SYSTEM AND METHOD FOR ACCESS CONTROL AND IDENTITY MANAGEMENT, the disclosure of which is incorporated herein in its entirety.

This application is also generally related to U.S. application Ser. No. 12/714,094 and is also generally related to U.S. application Ser. No. 13/155,601, and is also generally related to U.S. patent application Ser. No. 13/020,531, each of which is incorporated by reference herein in its entirety.

BACKGROUND 1.0 Field of the Invention

The invention relates generally to information processing technology and, more specifically, to a system and method that generally provides for management of access as a graph, management of identity as a graph, the intersection of the access graph and identity graph, the uniform representation and management of human and machine-automated functions, and the combination of human and machines functions as interpreters in a system of functional decomposition.

2.0 Related Art

Systems of today, before this disclosure, do not typically provide for derivation of multiple identity objects for actors, such as users and functions, and do not create a graph of linked identity objects so that each identity object, or node, in the graph may be assigned one or more access controls, may develop a separately evolving set of information, may be distributed across a multi-node system, and may interact with other identity objects for other actors, while maintaining it accessibility to the initial actor.

Systems of today before the disclosure also do not typically build a graph of derived access control that intersects with the graph of derived identity such that the granting of access to objects in a system may be tracked over time and attributed to the specific actors associated with the identity objects creating the access. The auditability of shared access is often critical in systems that manage proprietary or highly sensitive information.

Additionally, today's systems do not typically provide a uniform representation for human functions and machine functions so that any actor or any of the identity objects derived for an actor in a system may interpret a program, process, workflow, group, task by decomposing it into one or more subelements, for example subgroups, subfunctions, subprocesses and the like, so that each subelement itself becomes a member of the element it decomposes and may then further interpret the subelement. Human functions and machine functions of today are typically completed in separate systems or using codebases which provide duplicate functionality but that are delivered through a mechanism that can communicate with the disparately managed functions, requiring multiple systems or duplicative codebases, increasing the workload, redundancy, and inefficiency of systems.

Moreover, systems of today also do not layer identity and access graphs so that the interpretation may be constrained or expanded over time based on access controls, and the interpretation may evolve in the context of a specific identity object. These systems also do not record the temporal aspects of each decomposition, interpretation, identity derivation or access derivation such that the decomposition and implementation may not only vary over time, and the previous state of the system may be retrieved at any time by applying the temporal aspects.

SUMMARY OF THE DISCLOSURE

The principles of the invention described in this disclosure satisfies the above needs and avoids the drawbacks of the prior art by providing for a computer environment, a mechanism for the flow of access by means of derivation.

In one aspect, typically, access rights granted with respect to an access point flow from (or derive from) an access provider to an access recipient. Typically, the access provider is a function and the access recipient is a function. The access point may be any object, such as files or functions, to which the access recipient is granted access rights by the access provider. Access may typically be represented by a relationship object referencing the access provider function, the access recipient function, and the access point object, and a set of access rights.

In one aspect, there typically may be different types of access, including read access, right access, and membership access. Therefore, the membership access relationship is typically represented as a subtype of the general/abstract access relationship. Membership is the idea that a first function can gain access to a second function, so that the first function becomes the member of the second function.

In another aspect, generally, the membership access relationship (MAR1) maps the access provider role to a function A, maps the access recipient to function B, and maps the access point to function C, wherein, function A is a function doing the membership inviting and therefore providing access (as the access provider), function B is the function being invited and therefore receiving access (as the access recipient), and function C (the access point) is the function into which function B is obtaining membership. When a membership access relationship (MAR1) is created, typically a new associated persona function is generated, representing the new identity created for the access recipient function (function B) while serving as a member of the access point function (function C). Because the persona (persona1) is typically a function, additional rights may be granted to or granted by persona1, such as rights granted by persona1 (as the access provider in a new access relationship) or rights granted to persona1 (as the access recipient in a new access relationship). After a persona (persona1) is created, it may itself be invited by a function 3 to become a member in another function (function 4), thereby creating another membership access relationship (MAR2) in which MAR2's access recipient is persona 1, MAR2's access provider is function 3, and MAR2's access point is function 4. A second persona (persona2) is then typically automatically created representing the new membership access (MAR2). Persona2 is then said to derive from persona1, since persona 2 is based on persona1. In this way, identity derivation is provided so that persona1 has a derived persona2 (and persona 2 derives from persona 1). Persona1 may have a plurality of derived personas, including persona2, persona3, and persona4. Since these derived personas are based on the persona1, if persona1 is deleted, persona2, persona3, and persona4 (the derived personas) may also be deleted.

Therefore, in one aspect, a new technique is provided by which a function may be invited to participate in a plurality of other functions, wherein each membership "invite" is expressed by a new membership access relationship and each such membership access relationship results in the creation of a new and associated persona. When a persona function is invited to be a member in another function, that in turn generates a membership and a second persona that is derived from the first persona, resulting in identity derivation.

In one aspect, a computer-implemented method for access control and identity management embodied in a non-transitory computer storage medium that when read and executed performs the steps that a. creates and maintains an identity graph through the use of personas; through the use of personas, creates and maintains an identity graph that is distributable across a single system, multi-node system, or distributed graph-based system on one or a plurality of machines; b. uses personas and membership as a mechanism for providing access to system objects, creates and maintains an access graph by creating a persistent access collections that specify the access provider, access recipient, access target, and access rights; provides for an access provider persona to specify how an access recipient persona may interact with an access target by assigning access rights in an access collection; c. provides for any access recipient to become an access provider through the use of the extend access; d. through the use of extend access, provides for an access recipient to become an access provider to a second access recipient by sharing a subset of the access providers access rights; further providing for the second access recipient to become an access provider to a third access recipient by sharing a subset of the second access providers access rights; further providing the third access recipient to become an access provider to a fourth access recipient by sharing a subset of the access providers access rights; repeating this process indefinitely, with any access recipient having extend access becoming an access provider to another access recipient by sharing a subset of access rights, creating an access graph that can be expanded indefinitely through the use of personas and access collections; e. creates and maintains an access graph that can be distributed as a graph across a single system, multi-node system, or distributed graph-based system on one or a plurality of machines; f. provides for an access recipient to receive automated access to updated versions of an access target through the use of evolve access.

In another aspect, a computer implemented method for identity management embodied in a non-transitory computer storage medium that when read and executed performs the steps of deriving from a first parent identity object a first set of one or more child identity objects for at least one actor, wherein the first parent identity object has an associated identifier for at least one actor and also defining a first information set for the first parent identity object, assigning an associated identifier for each of the first set of one or more child identity objects that includes at least one property of the associated identifier of the first parent identity object so that the actor is knowable by the parent identity object and each child identity object, and each child identity object references the parent identity object, deriving from any of the first set of one or more child identity objects a second set of one or more child identity objects for the at least one actor, wherein any of the one or more child identity objects that is derived is a second parent identity object for the second set of one or more child identity objects, assigning for each of the second set of one or more child identity objects an associated identifier that includes at least one property of the associated identifier for the second parent identity object and the at least one property of the associated identifier for the first parent identity object so that a graph of derived identity is created wherein the actor is knowable by at least any one of: the first parent identity object, any of the first set of child identity objects, the second parent identity object, and any of the second set of child identity objects, evolving separately at least any one of: a first information set associated with the first parent identity object, a separate information set associated with each of the first set of one or more child identity objects, a separate information set associated with the second parent identity object, and a separate information set for any of the second set of child identity objects, so that the separate information sets evolve in a context of any of the parent or child identity objects, providing for the actor access to the first parent identity object so that access to any of the first set of child identity objects is through the first parent identity object, and providing for the actor access to any of the second set of one or more child identity objects through the first parent identity object and the second parent identity object, so that any of the separately evolving information sets is accessible by the actor, distributing a parent identity object or any of the child identity objects within a computer system, thereby providing distributed identity objects so that wherein each of the distributed identity objects is knowable by the actor so that an actor has access to any of the distributed identity objects, and wherein the respective associated information set evolves.

In another aspect, a computer program product having computer code stored in a tangible storage medium that when read and executed by a computer causes the following steps to be performed in a computer system having multiple actors: deriving from a first parent identity object for a respective actor a first set of one or more child identity objects for the respective actor, wherein the first parent identity object for the respective actor has an associated identifier and also defining a first information set for the first parent identity object for the respective actor; assigning an associated identifier for each of the first set of one or more child identity objects for the respective actor that includes at least one property of the associated identifier of the first parent identity object for the respective actor, so that the respective actor is knowable by its parent identity object and each derived child identity object, and each derived child identity object references the parent identity object for the respective actor, deriving from any of the first set of one or more child identity objects a second set of one or more child identity objects for the respective actor, wherein any of the one or more child identity objects that is derived for the respective actor is a second parent identity object for the second set of one or more child identity objects for the respective actor, assigning for each of the second set of one or more child identity objects for the respective actor an associated identifier that includes at least one property of the associated identifier for the second parent identity object for the respective actor and the at least one property of the associated identifier for the first parent identity object for the respective actor so that a plurality of graphs of derived identity are created wherein the respective actors are knowable in each graph by at least any one of: the first parent identity object for the respective actor, any of the first set of child identity objects for the respective actor, the second parent identity object for the respective actor, and any of the second set of child identity objects for the respective actor; evolving separately at least any one of: a first information set associated with the first parent identity object for the respective actor, a separate information set associated with each of the first set of one or more child identity objects for the respective actor, a separate information set associated with the second parent identity object for the respective actor, and a separate information set for any of the second set of child identity objects for the respective actor, so that the separate information sets evolve in a context of any of the parent or child identity objects for the respective actor, providing for the respective actor access to the first parent identity object so that access to any of the first set of child identity objects is through the first parent identity object, and providing for the respective actor access to any of second set of one or more child identity objects through the first parent identity object and the second parent identity object, so that any of the separately evolving information sets is accessible by the respective actor, distributing a parent identity object or any of the child identity objects for any of the respective actors within a computer system, thereby providing distributed identity objects so that wherein each of the distributed identity objects is knowable by its respective actor so that the respective actor has access to any of its distributed identity objects, and wherein the associated information set for each of the distributed identity objects evolves, joining in a membership object a membership provider, a membership recipient, and a membership target, wherein: the membership provider is an identity object from one of the multiplicity of identity graphs, the membership recipient is an identity object from one of the multiplicity of identity graphs, and the membership target is an actor and is a function, the creating of a membership triggering the creating of a new child identity object for the membership recipient identity object that includes an identifier that includes at least one property of the membership recipient identifier and one property of the membership target identifier so that any separately evolving information set of the identity object associated with the membership target is immediately made accessible to the new child identity object.

In another aspect, a computer program product for decomposing functions having computer code stored in a tangible storage medium that when read and executed by a computer causes the following steps to be performed in a computer system: creating a first function, a second function, and a third function; creating a first identity object with a first associated identifier for the first function, a second identity object with an a second associated identifier for the second function, and a third identity object with a third associated identifier for the third function, wherein each identity object has a separately evolving information set in the computer system; joining in a membership object the first identity object, the second identity object, and the third function, wherein the first identity object is a membership provider, the second identity object is a membership recipient, and the third function is a membership target, so that the second identity object is a member of the third function; creating a fourth identity object with an associated fourth identifier that derives from the second identity object, so that the third function is decomposable into a collection of multiple member functions through the creation of additional membership object, accomplishing decomposition of the membership target function through the creation of new membership objects, wherein the newly derived identity object resulting from the new membership is a member function of the membership target function, so that new member functions generate new membership objects, creating an expanding program structure and a collaborative means for interpreting the functional structure of a computer program wherein all of the member functions participate in the interpretation, performing interpretation dynamically at system runtime; creating separately evolving information sets for the identity objects associated with any of the member functions; providing immediate access to the member functions the information set of the membership target so that the a member function immediately access and operates on the information set of the membership target; wherein the member functions are distributable within a single system, throughout a multi-node system, or throughout a distributed graph database system on one or a plurality of machines so that the work of the function may also be distributed; applying specific access rights controlling how each of the multiple member functions accesses or operates on the information set of the membership target so that the membership target makes accessible its complete information set or a subset of its information set to its member functions, and so that different subsets of information made be made accessible to each member function.

In another aspect, a computer program product for decomposing functions having computer code stored in a tangible storage medium that when read and executed by a computer causes the following steps to be performed in a computer system: creating a first function, a second function, and a third function; creating a first identity object with a first associated identifier for the first function, a second identity object with an a second associated identifier for the second function, and a third identity object with a third associated identifier for the third function, wherein each identity object has a separately evolving information set in the computer system; joining in a membership object the first identity object, the second identity object, and the third function, wherein the first identity object is a membership provider, the second identity object is a membership recipient, and the third function is a membership target, so that the second identity object is a member of the third function; creating a fourth identity object with an associated fourth identifier that derives from the second identity object, so that the third function is decomposable into a collection of multiple member functions through the creation of additional membership object, accomplishing decomposition of the membership target function through the creation of new membership objects, wherein the newly derived identity object resulting from the new membership is a member function of the membership target function, so that new member functions generate new membership objects, creating an expanding program structure and a collaborative means for interpreting the functional structure of a computer program wherein all of the member functions participate in the interpretation, performing interpretation dynamically at system runtime; creating separately evolving information sets for the identity objects associated with any of the member functions; providing immediate access to the member functions the information set of the membership target so that the a member function immediately access and operates on the information set of the membership target; wherein the member functions are distributable within a single system, throughout a multi-node system, or throughout a distributed graph database system on one or a plurality of machines so that the work of the function may also be distributed; applying specific access rights controlling how each of the multiple member functions accesses or operates on the information set of the membership target so that the membership target makes accessible its complete information set or a subset of its information set to its member functions, and so that different subsets of information made be made accessible to each member function.

In another aspect, a computer implemented method for access control in a system of identity objects and membership embodied in a non-transitory computer storage medium that when read and executed by a computer performs the following: defining an access object including an access provider, an access recipient and an access point, and a set of access rights wherein the access provider is a function and the access recipient is a function; defining one or more access controls for each of the access points wherein the access control specifies the access provider, the access recipient, the access point, and the access rights; restricting the access the identity object may have to an access point through the access control so that the flow and evolution of information can be limited; expanding the access the identity object may have to an access point through the access control so that the flow and evolution of information can be increased; limiting the access rights specified by an access provider for an access recipient to a full or partial subset of the provided wherein the access rights that may be provided to an access recipient deriving the access rights that may be assigned to the access recipient as a subset of the access rights of the access provider; controlling access to the access point by the identity object based on the access control; so that any identity object is assignable access rights independently of any of the parent identity object from which it derives and independently from and child identity objects which derive from the any identity object.

BRIEF DESCRIPTION OF THE DRAWINGS

The accompanying drawings, which are included to provide a further understanding of the invention, are incorporated in and constitute a part of this specification, illustrate aspects of the invention and together with the detailed description serve to explain the principles of the invention. No attempt is made to show structural details of the invention in more detail than may be necessary for a fundamental understanding of the invention and the various ways in which it may be practiced. In the drawings:

FIG. 1 is an exemplary illustration of an Architecture of a System Incorporating Access Control and Identity Management, configured according to the principles of the disclosure;

FIG. 2 is an exemplary illustration of an Architecture of a Web-Based Distributed System Incorporating Access Control and Identity Management, configured according to the principles of the disclosure;

FIG. 3 is an exemplary illustration of an Architecture of a Client-Server System Incorporating Access Control and Identity Management, configured according to the principles of the disclosure;

FIG. 4 is an exemplary illustration of Identity Object Derivation, configured according to the principles of the disclosure;

FIG. 5 is an exemplary illustration of the Process Flow for Deriving Identity Objects, configured according to the principles of the disclosure;

FIG. 6 is an exemplary illustration of a Membership Overview, configured according to the principles of the disclosure;

FIG. 7 is an exemplary illustration of Membership for Users and Groups, configured according to the principles of the disclosure;

FIG. 8 is an exemplary illustration of Membership for Functions as Tasks, configured according to the principles of the disclosure;

FIG. 9 is an exemplary illustration of Membership for Functions as Computations, configured according to the principles of the disclosure;

FIG. 10A is an exemplary illustration of a Process Flow for Creating Membership, configured according to the principles of the disclosure;

FIG. 10B continues the exemplary illustration of a Process Flow for Creating Membership, configured according to the principles of the disclosure;

FIG. 11 is an exemplary illustration of a Process Flow for Deriving Multiple Personas from a Single Persona, configured according to the principles of the disclosure;

FIG. 12 is an exemplary illustration of a Logical Organization of Simple Derived Persona Graph, configured according to the principles of the disclosure;

FIG. 13 is an exemplary illustration of a Logical Organization of Multi-Level Derived Persona Graph, configured according to the principles of the disclosure;

FIG. 14 is an exemplary illustration of a Logical Organization of Single and Multi-Level Derived Persona Graph, configured according to the principles of the disclosure;

FIG. 15 is an exemplary illustration of Routing Name Assignment in a Graph of Derived Personas, configured according to the principles of the disclosure;

FIG. 16 is an exemplary illustration of Persona and Membership, configured according to the principles of the disclosure;

FIG. 17 is an exemplary illustration of Derived Persona with Multiple Access Providers for the Same Group Membership, configured according to the principles of the disclosure;

FIG. 18 is an exemplary illustration of Multiple Membership Process Flow, configured according to the principles of the disclosure;

FIG. 19 is an exemplary illustration of a Persona Deriving from Multiple Parent Personas, configured according to the principles of the disclosure;

FIG. 20 is an exemplary illustration of a Flow Diagram of a Persona Deriving from Multiple Parent Personas, configured according to the principles of the disclosure;

FIG. 21 is an exemplary illustration of Function Decomposition through Memberships and Personas, configured according to the principles of the disclosure;

FIG. 22 is an exemplary illustration of Persona Derivation in a Distributed System, configured according to the principles of the disclosure;

FIG. 23 is an exemplary illustration of a Process Flow for Creating ACLs, configured according to the principles of the disclosure;

FIG. 24 is an exemplary illustration of a Logical Representation of Example ACLs for a Document, configured according to the principles of the disclosure;

FIG. 25 is an exemplary illustration of Deriving Access Rights, configured according to the principles of the disclosure;

FIG. 26 is an exemplary illustration of Discovering Identity, configured according to the principles of the disclosure;

FIG. 27 is an exemplary illustration of Discovering Access, configured according to the principles of the disclosure;

FIG. 28 is an illustration of an example Login Page, configured according to the principles of the disclosure;

FIG. 29 is an illustration of an example Create Account—Enter Account Information Page, configured according to the principles of the disclosure;

FIG. 30 is an illustration of an example Create Account—Terms and Conditions of Use page, configured according to the principles of the disclosure;

FIG. 31 is an illustration of an example Create Account—Confirm Account Information Page, configured according to the principles of the disclosure;

FIG. 32 is an illustration of an example Create Account—Next Steps page, configured according to the principles of the disclosure;

FIG. 33 is an illustration of an example Create Account—Email with Instructions to Verify Account Creation Request, configured according to the principles of the disclosure;

FIG. 34 is an illustration of an example Verify Account Creation Page, configured according to the principles of the disclosure;

FIG. 35 is an illustration of an example My Networks Page, configured according to the principles of the disclosure;

FIG. 36 is an illustration of an example Invite Network Members Popup, configured according to the principles of the disclosure;

FIG. 37 is an illustration of an example Network Home Page, configured according to the principles of the disclosure;

FIG. 38 is an illustration of an example Specify Fine-Grained Access Control when Sharing a File page, configured according to the principles of the disclosure;

FIG. 39 is an illustration of an example Create Group page, configured according to the principles of the disclosure.

DETAILED DESCRIPTION OF THE DISCLOSURE

The various aspects of the disclosure and the various features and advantageous details thereof are explained more fully with reference to the non-limiting examples that are described and/or illustrated in the accompanying drawings and detailed in the following description. It should be noted that the features illustrated in the drawings are not necessarily drawn to scale, and features of one example may be employed with other examples as the skilled artisan would recognize, even if not explicitly stated herein. Descriptions of well-known components and processing techniques may be omitted so as to not unnecessarily obscure the various examples of the invention. The examples used herein are intended merely to facilitate an understanding of ways in which the invention may be practiced and to further enable those of skill in the art to practice the various aspects of the invention. Accordingly, the examples herein should not be construed as limiting the scope of the invention, which is defined solely by the appended claims and applicable law. Moreover, it is noted that like reference numerals represent similar parts throughout the several views of the drawings.

It is understood that the invention is not limited to the particular methodology, protocols, devices, apparatus, materials, applications, etc., described herein, as these may vary. It is also to be understood that the terminology used herein is used for the purpose of describing particular examples only, and is not intended to limit the scope of the invention, unless specifically stated otherwise. It must be noted that as used herein and in the appended claims, the singular forms "a," "an," and "the" include plural reference unless the context clearly dictates otherwise.

Definitions

Definitions for terms used to describe aspects of one implementation of the system and method for a computer based Access Control and Identity Management are provided below:

Identity: a unique object that may perform an action in a computer system and to which actions may be attributed. An identity may be assigned to a user, process, function, task, group, or other system object.

Identity Object: the context under which an identity may perform a particular action. For example, people in the real world, functions in a computer program, and processes in an application may be thought of as "wearing multiple hats" when fulfilling different job duties, roles, assignments, or operations which may or may not be related. These "multiple hats" may be interpreted as multiple identities for a single person. Similarly, each identity object may be thought of as a different "hat", a different role, or a different context, that the identity may "put on" as it works in the system and interacts with the available resources and functionality. An identity object may also be referred to as a persona.

In the access control and identity management (ACIM) environment, according to principles of the disclosure herein, a new, derived identity object may be created each time an existing identity object is invited to become a member of a function, group, or task in the system. This new identity object may represent that membership and may be derived from the invited identity object. Each identity object may include, but may not be limited to, one or more of the following:

Access Recipient: An identity object, such as a persona, user, group, or other similar object, to which access rights may be applied;

Access Point(s): Object(s) or resource(s) for which the access rights may be assigned to the access recipient;

Routing Name: A unique identifier for the identity object, may be human readable or machine readable;

Inbox: A container for objects that may be sent to an identity object;

Outbox: A container for objects that may be sent by an identity object;

Licensed to collection: A listing of the memberships to which the identity object may have been licensed;

Date and time that the identity object was created; and

Access Collection: Collection of objects the identity object may access, and may specify the rights granted, precluded, or revoked. Several non-limiting examples of the objects that may be accessed may include: files, folders, functions, tasks, projects, and other identity objects.

The newly created identity object may then be invited to become a member of another group, another task, or another similar object, creating a derived identity. Each identity object may itself become an access recipient, thus creating identity objects which derive from existing identity objects. This designation as access recipient and identity object derivation may be repeated over and over. Once an identity is authenticated to the system, it may move between one or more of its available identity objects, and each action performed may be completed under the context of one or more derived identity objects.

Membership: membership may typically be created following association of an identity object with, or entry into, a group, task, function, or other similar object. Membership may result in the creation of a new identity object derived from the invited identity object (i.e., a derived identity object), or may license an existing derived identity object. Membership may typically be granted to identity objects associated with users, personas, groups, tasks, functions, and other similar objects in the system. The system may attribute all actions and interactions with that group with the new identity object. A membership may include, but is not limited to, one or more of the following characteristics:

Membership Recipient: the identity object invited to join the group or task;

Membership Provider: the identity object that requested another identity object join the Membership target;

Membership Target: the group, task, function, project, or other object the identity object is being requested to join; and Licensing Identity Object: a derived identity that may be created as a result of the membership, this derived identity object may license the identity object being asked to join the membership target.

License: When becoming a member a group or task, the access recipient may 'license' an identity object to the membership target. Revoking or otherwise ending a membership may not delete or negate the licensed identity object; the identity object may exist independently of a single membership and may have multiple memberships to one or multiple membership targets.

Access Control: Designations that may grant, preclude, expand, or constrain the interactions with or operations on one or more specified object(s) in a system. An access control may also be referred to as a permission, and may have, but is not limited to, one or more of the following characteristics:

Access Provider: The object specifying access rights to be assigned, including but not limited to: an identity object, persona, function, user, group, task, project, property, or other similar object;

Access Recipient: The identity object being granted access;

Access Point: The object to which access is being granted;

Access Right: Specified permissions or actions the access recipient may be given on the access point;

Extend: A designation of whether the access recipient may become an access provider and share the full or a subset of the assigned access right to the access point with another access recipient; and Evolve: A designation of whether the access right on the current version of the access point may apply to future versions of the access point.

Access Right(s): May be used to grant, preclude, or revoke an identity object's ability to act on or interact with a system object in a specified manner. Access rights may be assigned to identity objects, users, groups, functions, tasks, processes, and other similar objects to grant, preclude, or deny access to other objects, application functionality, and data. There are several techniques for storing actual access rights such as the utilization of Access Control Lists (ACL). A few examples of access rights may include but are not limited to: read, write, delete, insert, extend, and evolve.

Actor: any agent internal or external to a computing system which is capable of providing inputs, submitting requests, or operating on a system object. Several examples of actors include but are not limited to: users, groups, tasks, projects, and functions. An actor may have a unique identifier and may be associated with multiple identity objects, including parent identity objects and child identity objects. Child identity objects may also be referred to as derived identity objects.

User: an actor in a system. Examples of users may include but are not limited to: actual person who wishes to use the system, a function acting in the system, a task in the system, and another computer application interacting with the system.

Group: an object that may be associated with a collection of one or more identity objects, personas, tasks, users, groups, functions, or other similar objects. The objects may be associated with the group through membership relationships.

Users of the system may create groups and invite other users into groups. Groups may be created for any reason desired by the user, unless restricted through system processes. One example of a group may include a team of coworkers that are users of the system and may be collaborating on a project. The group may serve as a central location for storage of all of the coworkers' project-related information and processes so that other team members may gain access to it. Other objects in the system may also perform similar to a group and allow for membership to be granted, including but not limited to projects, tasks, and organizations. For simplicity, all of these types of objects may be referred to as groups herein.

Parent identity object: the identity object from which another identity object may derive. For example, if the john.writerGroup identity object is granted access to the CityTimesGroup, a new identity object, designated john.writerGroup.cityTimesGroup may be created. In this example, the john.writerGroup identity object is the parent of the john.writerGroup.CityTimesGroup identity object.

Child identity object: the identity object that is derived from another identity object. For example, if the john.writerGroup identity object is granted access to the CityTimesGroup group, and a new identity object, designated john.writerGroup.CityTimesGroup may be created. In this example, the john.writerGroup.CityTimesGroup identity object is the child of, or derives from, the john.writerGroup identity object.

Anonymous user: a user that may not be associated with an identity or identity object known by the system. Anonymous users may access functionality that does not require login and authentication, such as a page or a screen that may present login functionality, getting started, create account, and other related functionality for a system.

Identified user: a user that may have provided a valid credential and may have been authenticated with the system. Identified users may be associated with an identity and multiple identity objects.

Persona: in one implementation of the invention, persona may be another name for an identity object. One skilled in the art would recognize that many other terms may be appropriate synonyms for identity objects.

Top level persona: the identity object that may be created when a user creates an account and joins a system group.

Extension: A characteristic of an access right that may allow an identity object that is an access recipient to extend a subset of their access right(s) to other identity object(s).

Evolution: A characteristic of an access right that may allow an identity object that is an access recipient to automatically be granted access to future versions of an access point. For example, a document may have multiple versions as access recipients modify and update the document content. If access evolution is enabled for an access recipient, all future versions of a document may be accessible to that access recipient.

Classification: A pre-defined grouping of access rights that may reflect the desired management, handling of, and/or allowable interactions with a specific set of access points. The access recipients and the access points may be classified on the same basis, or the access recipient basis may be mapped to the access point basis, or other combinations. For example, a group of files classified as '2' may only be accessed by access recipients with a classification of '2' or higher, or a group of files classified as 'G' may only be accessed by access recipients with a classification of '6' or higher.

Role: A grouping of access rights based on specifications for a group of users that may be expected to operate in a similar manner or perform similar functions. For example, an Administrator role may be defined as users granted read-extend and write-extend access to a set of access points. These users may then grant read and write access to those access points to other users.

Access Control List (ACL): a link to the collection of access points and corresponding access rights assigned to a specific identity object.

Exemplary Architecture

FIG. 1 (100) and FIG. 2 (200) and FIG. 3 (300) are illustrative block diagrams of an exemplary architecture, configured according to principles of the disclosure. The systems shown in these Figures are exemplary and may take on different architectures as one of ordinary skill in the art may recognize.

These exemplary figures show the use of servers, virtual machines, and nodes connected in a distributed system. As one of ordinary skill in the art may recognize, a server may typically include a physical device with, for example: one or more hard drives that may provide a storage medium for electronic data; random access memory (RAM) for holding information that may be needed to execute computer programs and their instructions; a processor that may execute the various computer programs and their instructions; various connection points for input/output, multimedia devices, other peripheral devices, and communications with other servers; and a motherboard, may also be referred to as a circuit board, that may connect and may provide power to the server components.

The terms "virtual machine" and "virtual server" may typically refer to a collection of software that may be required to execute and run programs on a physical server. A virtual server may share the memory and storage resources of the physical server on which it resides with other virtual machines or other installed software, or the virtual server may be specifically allocated memory and storage resources that cannot be accessed by other software on the same physical server.

A "node" as shown in exemplary FIG. 2 may indicate a virtual server, virtual machine, physical server, physical machine, electronic device, program, or programming environment capable of running a system or part of a system configured according to the principles of the disclosure. A "node" as shown in exemplary FIG. 2 may refer to a specific node or collection of nodes associated in a parent:child relationship.

FIG. 1 is a block diagram showing an exemplary architecture of an illustrative system configured according to the principles of the disclosure, generally denoted by 100. The example environment shown in FIG. 1 may include the following:

User Devices (105, 110, 115): electronic equipment capable of accessing the server computer that contains the application.

Server Computers (120, 140): Physical or virtual machines configured to operate a computer system.

Web Server (125): In general, may receive HTTP requests, typically from an internet browser, may forward those requests to the Application Server, and may deliver the response to the internet browser in the form of a web page.

Application server (130): May typically interpret HTTP requests (or similar requests) and may perform processes and operations required to respond to the request. May forward the response to the request to the web server Target application integrating the ACIM system and method (135): Software that may typically be accessed and run using an internet browser.

Data collection for the target application (145): A construct that may store structured and unstructured data collected by or associated with the target application (145). Examples of the format of the data collection may include but are not limited to: key value store, graph database, text file, SQL-database, XML, or other structures capable of persisting information.

In the example architecture shown in FIG. 1, a server (120) may host an application, such as a Java® application, that may incorporate the operational logic for ACIM (135), and may be deployed using a web server (125) that may be accessible through the internet. The application may be employed inside of an application server (130) such as Apache Tomcat™, for example. The application may use a Java Database Connector (JDBC) to connect to a remote or embedded collection of data (145), including but not limited to a database such as Oracle's MySQL®, a key-value database, object-oriented database, graph database, or may directly interact with a text file, or other collections of data. In the scenario where a remote collection of data may be used, a server (140) may be required to house that remote collection. The data collection provides storage and retrieval of the data for or to the application. The application server (130), such as Apache Tomcat™, may also connect to a web server (125) such as Apache HTTP Server®. A user device (105, 110, 115) may access the application with a software tool or similar utility capable of communicating with the web server (125). The tool may include, for example, an internet browser, such as Mozilla's Firefox® or Microsoft Internet Explorer® and connecting to the application via a Uniform Resource Locator (URL). The requests are received by the web server (125) and immediately passed to the application server (130) for processing by the application (135).

Another example of an environment of the invention is shown in the block diagram of FIG. 2 and generally denoted by 200. This exemplary figure shows the use of servers, virtual machines, and nodes housing in a distributed architecture a distributed system that may incorporate the access control and identity management (ACIM) system. The example environment shown in FIG. 2, generally designated by reference numeral 200, may include the following:

Application Hub and Server for incorporating ACIM (205): Coordinates and manages all Node Servers (210, 215, 220, 225) incorporating ACIM. Each server may provide a set of applications (e.g., file management, user management, group management, database applications, etc.), and persist and manage data, information, and users.

Clients (230a, 230b, 230c) for Application Hub and Server: interface through which users may access the Node Servers for systems incorporating ACIM, applications, data, and information. The client interface may be a thin web client, thick web client, desktop interface, command prompt, or another interface type.

Node Servers (210, 215, 220, 225) incorporating ACIM: Servers that may be allocated for a purpose defined by the user that created the node. Each server may provide a set of applications (e.g., file management, user management, group management, database applications, specialized applications, etc.), and may persist and manage data, information, and users.

Clients (235a, 235b, 235c, 240a, 240b, 240c, 245a, 245b, 245c, 250a, 250b, 250c) for Node Server incorporating ACIM: interface through which users may access the Node Servers for systems incorporating ACIM, applications, data, and information. The interface may be a thin web client, thick web client, desktop interface, command prompt, or other interface type.

Messaging Server (255): May receive, queue, store, manage, and otherwise transact information packets being transferred between Node servers for Systems incorporating ACIM.

The Application Hub and Server (205) may be connected to a set of Node Servers (210, 215, 220, 225), a Messaging Server (255), and a set of Clients (235a, 235b, 235c). Additional Clients (240a, 240b, 240c, 245a, 245b, 245c, 250a, 250b, 250c) may be connected to each Node Server for Systems incorporating ACIM after authenticating to the Application hub and server One of ordinary skill in the art may recognize that any number (greater than zero) of Application Hub and Servers, Messaging Servers, Node Servers incorporating ACIM, and clients may be implemented in this architecture.

In addition, the communications protocol shown in this example is internet protocol (IP). One of ordinary skill in the art may recognize that other protocols may be used. The connection protocol communications may be secured through the use of firewall, secure socket layer (SSL) technology Virtual Private Network (VPN), or other security protocols.

In the example of FIG. 2, clients may first connect to the Application Hub and Server (205) via internet protocol, authenticate, and may then be passed to another Node Server for (210, 215, 220, 225), with or without secondary authentication. Messages may be passed between Nodes for systems incorporating ACIM using the exemplary Messaging Server (255).

FIG. 3, generally denoted by 300, is a block diagram of another exemplary environment for implementing principles of the invention. In this example, ACIM has been implemented in a system using typical client-server configuration. The server-based portion of the application (330) is installed either directly in the operating system of the server (325) if it was written in such a computer language as C or C++, or inside of a framework if it was written in a language such as Microsoft.NET® or Java®. Each user may install the client-based portion of the application (310,320) on their computer device (395, 315) which may include but is not limited to laptops, desktops, tablets, smart phones, and other devices capable or running applications or applets or similar computer programs. Similar to the server software, the client application (310, 320) could be installed either directly in the operating system of the device (305, 315) if it was written in such a language as C or C++, or inside of a framework if it was written in a language such as Microsoft.NET® or Java®. The client software (310, 320) is configured to connect to the server software (330) and transfer data between. In this example, the security information is shown being stored by writing to remote or embedded collection of data (335), which may include but is not limited to a database such as Oracle's MySQL®, a key-value database, object-oriented database, graph database, text file, or other collection of data.

It should be apparent to those of ordinary skill in the art that this architecture could be operated in a non-Internet environment, including a client-server mode or stand-alone mode, through the use virtual machine technology that acts on and interacts with other virtual machines or physical servers; or any combination of client-server, Internet, dedicated, and virtual environments.

Access Control and Identity Management

In one implementation configured according to the principles of the disclosure, the access control and identity management may be used to create graphs of identity, graphs of access, and graphs of functional decomposition, wherein a graph may be a set of objects linked as a web, a hierarchy of objects, or a tree of objects. In such an implementation, information flows and is distributed according to the intersecting graphs of identity, graphs of access, graphs of function, and membership. Implementations configured according to the principles of the invention may be used to create systems in which users may be functions, groups many be functions, computations may be functions, and system objects may be functions. As user functions are invited to join others functions, the invited user function may become a member of the other function, and may then further interpreter that other function through a process of functional decomposition. By inviting other user functions to join the other function, or subdividing the other function into additional functions, the user function may create a self-describing system in which member functions program and expand the collection of functions that comprise the complete functional graph of the system.

Identity

Actors in a system configured according the principles of the invention may have an identity. An actor may be any agent internal or external to the computer system that is configured to perform any of the following: providing one or more inputs, consuming one or more inputs, generating one or more outputs, submitting one or more requests, or operating in a system. An agent may be a function, and specific examples of functions may include but are not limited to any one or more of a user, projects, task, group, computation, and network. Inputs and outputs may also be functions in a system configured according to the principles of the invention.

The identity of each actor may be described by any number of properties and typically includes an associated identifier. This associated identifier may be machine-readable, human-readable, or both. Examples of the associated identifier may include but are not limited: to a globally unique identifier that may be a distinct number represented in a specific format such as hexadecimal; a routing name; a series of randomly generated characters, numbers, or both; or a combination of these examples.

Actors may perform actions under different contexts in a system incorporating ACIM. These contexts may be referred to as identity objects. For example, people in the real world, functions in a computer program, and processes in an application often "wear multiple hats" when fulfilling different job duties, roles, assignments, or operations which may or may not be related. Each identity object may be thought of as a different "hat", or a different role, that the identity can "put on" as it works in the system and interact with the available resources and functionality.

In the ACIM, identity objects may be derived from the actor identity, and additional identity objects may be derived from any existing identity object. The identity object from which another identity object is derived may be referred to as the parent identity object, and the derived identity object may be referred to as a child identity object. When a new child identity object is derived from an existing child identity object, the existing child identity object may be referred to as the parent identity object for the new child identity object.

FIG. 4 is an illustration of identity object derivation, configured according to the principles of the disclosure, generally denoted by reference numeral 400. An example identity object derivation may include an Actor (405) and Identity Object 1 (410) for the Actor. Identity Object 1 (410) may be derived to create Identity Object 2 (415), Identity Object 3 (420), Identity Object 4 (425), and Identity Object 5 (430). Identity Object 2 (415), Identity Object 3 (420), Identity Object 4 (425), and Identity Object 5 (430) may also be referred to as child identity objects of Identity Object 1. Identity Object 3 (420) may be derived to create derived Identity Object 6 (435), derived Identity Object 6 (435) may be derived to create derived Identity Object 7 (440), and Identity Object 7 (440) may be derived to create derived Identity Object 8 (445) so that child identity objects may be further derived to create additional child identity objects. In this example, child Identity Object 3(420) may also be referred to as a parent identity object of child Identity Object 6 (435), child Identity Object 6 (435) may also be referred to as a parent identity object of child Identity Object 7 (440), and child Identity Object 7 (440) may also be referred to as a parent identity object of child Identity Object 8 (445).

The properties of an identity object may vary according to the requirements of a particular implementation, but may typically include an identifier that may be similar to a property of the parent identity object from which the identity object was derived. For example, in one implementation of the invention, if the parent identity object has a GUID identifier, the derived identity object may identifier may append a second GUID or a specific string of characters to the end of the parent identity object GUID. Referring to the Example Persona Derivation 400, Identity Object 1 may have an identifier of 1a234-5a9-762 and Identity Object 2 may have an identifier of 1a234-5a9-762.9a065-4230a.

In another example, if the parent identity object has a string or name identifier, the child identity object identifier may append another string or name to the end of the parent identity object string or name identifier. Referring to the Example Persona Derivation 400, in this example Identity Object 1 (410) may have an identifier of Tom.NetworkA and Identity Object 2 (415) may have an identifier of Tom.NetworkA. GroupA.

One of ordinary skill in the art may recognize that a wide variety of human and/or machine readable formats may be appropriate for the identifier of an Identity Object, and a specific implementation may be based on the requirements of a specific implementation.

In addition to an identifier, each identity object may also be associated with a collection of content; this collection of content may also be referred to as an information set. The content that may be associated with an identity object may include any object in a system or may be restricted to a subset of the types of objects in a system. For example, content may include files such as document, images, and program files; functions; inputs; outputs; and the like. The information set associated with an identity object may evolve independently of any of its parent or child identity objects, so that content added to one identity object is only accessible to that identity object.

FIG. 5 is an example flow diagram for the process of Deriving Identity Objects, including associating identifiers, creating separately evolving information sets, and distributing identities, and is generally denoted by 500. The Deriving Identity Objects Process Flow 500 may include:

Step 505: Creating a first parent identity object for at least one actor;

Step 510: Associating an identifier with the first parent identity object;

Step 515: Deriving a first information set for the first parent identity object;

Step 520: Deriving from a first parent identity object a first set of one or more child identity objects for the at least one actor;

Step 525: Assigning an associated identifier for each of the first set of one or more child identity objects that includes at least one property of the associated identifier of the first parent identity object so that the actor is knowable by the parent identity object and each child identity object, and each child identity object references the parent identity object;

Step 530: Deriving from any of the first set of one or more child identity objects a second set of one or more child identity objects for the at least one actor, wherein any of the one or more child identity objects that is derived is a second parent identity object for the second set of one or more child identity objects;

Step 535: Assigning for each of the second set of one or more child identity objects an associated identifier that includes at least one property of the associated identifier for the second parent identity object and the at least one property of the associated identifier for the first parent identity object so that a graph of derived identity is created wherein the actor is knowable by at least any one of:

the first parent identity object,
any of the first set of child identity objects,
the second parent identity object, and
any of the second set of child identity objects, Step 540: evolving separately at least any one of:
a first information set associated with (or contained by) the first parent identity object,
a separate information set associated with each of the first set of one or more child identity objects,
a separate information set associated with the second parent identity object, and
a separate information set for any of the second set of child identity objects, so that the separate information sets evolve in a context of any of the parent or child identity objects;

Step 545: providing for the actor access to the first parent identity object so that access to any of the first set of child identity objects is through the first parent identity object, and providing for the actor access to any of second set of one or more child identity objects through the first parent identity object and the second parent identity object, so that any of the separately evolving information sets is accessible by the actor, Step 550: distributing a parent identity object or any of the child identity objects within a computer system, thereby providing distributed identity objects wherein each of the distributed identity objects is knowable by the actor so that an actor has access to any of the distributed identity objects, and wherein the respective associated information set evolves separately.

The distributed identity objects may be knowable to the actor through the graph of identity derivation. A knowable identity object may be accessible to the actor. In some implementations, the identifier associated with the derived identity object, no matter how many degrees away from the actor, may include a property of each parent identity object above it in the graph. Alternatively, the identity object identifier may be inspected, may be introspected, or may be retrieved by other techniques in a system in accordance with the rules used to create the identifier to discover the identity of the initial actor. This approach may also be used to provide access to an identity object to an actor.

The ACIM may allow for both identified and anonymous actors in a system. Each identified actor has a unique account so that it can be uniquely identified. Anonymous actors may provide their credentials and proof of identity in order to authenticate against the system.

This is typically performed through a login screen where the actor enters identifying information such as username and password. Other additional information or actions may also be required such as biometrics. Once authenticated, the user's session may then be linked to their specific user account. Everything that happens in the system may then be linked either to an identified actor, a system account, or anonymous actor by the ACIM.

Actors in the ACIM can interact with or act on any object that has an identity. These actors may be objects themselves, and may include but are not limited to users, processes, tasks, functions, groups or any object in the system. For example, a user named "John" that is an actor that created a system account may be associated with a derived "John. System" identity object. Similarly, a function titled "getResults" may be associated with a "getResults" identity object.

Membership

In one aspect of the invention, a membership object may be created as a result of the association of an identity object with a function. Creating membership through membership objects may also be referred to as an identity object "joining" a function. A function may be a group, task, project, input, output, or other similar object. A membership object may have one or more of the following characteristics:

Membership Recipient: the identity object associating with, or 'joining' the function.

Membership Provider: the identity object initiating the association with or joining of the membership recipient identity object with the membership target.

Membership Target: the function with which the membership recipient identity object may associate or join.

Licensing Persona: a new identity object that may be created as a result of the membership. This new identity object may license the membership from the membership recipient identity object. The identifier for this new identity object may include a property of the membership recipient identity object identifier and a property of the membership target.

A membership object may be a type of access derivation in which the access provider may be a function that may also be a membership provider, the access recipient may be a function that may also be a membership recipient, and the access point may be a function that may also be a membership target to which the access recipient, may also be referred to as the membership recipient, may be granted access.

In some implementations of the invention, membership may be initiated though an invitation process in which a first identity object may invite a second identity object to join a membership target. The invitation process may be automated or manual, the invitation may require acceptance prior to creating membership, or the membership may be immediately created after initiating the invitation process.

When a membership is granted, it may cause the creation of a new identity object that derives from the identity object of the membership recipient. The new identity object may include an identifier that may have at least one property of the membership recipient identifier and one property of the membership target identifier so that any separately evolving information set of an identity object associated with the membership target may be made immediately accessible to the new child identity object. In addition, objects associated with the accessible identity objects of the membership target in addition to the separately evolving information set may also be accessible to the new identity object. These other objects may include other identity objects joined to the membership target through other membership objects. For example, if the identity object for an actor that is a user is the membership recipient in a membership object where the membership target is a group, the new identity object created for the user may see a listing of group members by gaining immediate access to the other identity objects created for other users that are joined to the group through other membership objects.

Additionally, a system configured according to the principles of the disclosure may record and/or may attribute all actions and interactions by the new identity object with or on any separately evolving information set of any accessible identity object of the membership target to the new identity object.

A system configured according to the principles of the disclosure may use an access collection to specify interaction privileges between the new identity object separately evolving information sets.

Many combinations of identity objects and functions may be possible in a system configured according to the principles of the invention. A few examples include but are not limited to: when a user joins the system, membership in the System Group may be the first membership created; when a Group is created in the system, membership in the System Group for the new Group may be created; and when 'Group A' is invited to join 'Group B', membership for 'Group A' in 'Group B' may be created; and when a function is added to a Group, membership of the function in the new Group may be created.

FIG. 6 is an exemplary overview of logical organization of membership providers, membership recipients, membership object, and associated identity objects and actors, and is generally denoted by 600. In this example, a first actor (610) with a first identity object (625) invites a second identity object (620) associated with a second actor (605) to join a third actor (615). In this example, the membership object may include: a membership provider that is the first identity object (625), and membership recipient that is the second identity object (620), and a membership target that is the third actor (615). Creation of the membership object triggers creation of a fourth identity object (640). This fourth identity object is also associated with the second actor (605). The fourth identity object (640) then licenses the membership (635) between the second identity object (620) and the third actor (615). The license may be useful so that if the membership (635) at some point may need to be discontinued, the license to the fourth identity object (640) may be discontinued without affecting the second identity object (620).

In one exemplary aspect of membership, the membership target may be an actor that is a Group, which may also be a function, and the membership provider and membership recipient may both be identity objects for actors that are users. FIG. 7 is an example of membership for a User joining a Group and is generally denoted by 700. In FIG. 7 (700), a first actor Sally (710) with a first identity object Sally.System (725) invites a second identity object John.System (720) associated with a second actor John (705) to join a third actor SalesGroup (715). In this example, the membership object may include: a membership provider that is the first identity object Sally.System (725), and membership recipient that is the second identity object John. System (720), and a membership target that is the third actor SalesGroup (715). Creation of the membership object triggers creation of a fourth identity object John.System.SalesGroup (740). This fourth identity object is also associated with the second actor John. System (705). The fourth identity object John.System.SalesGroup (740) then licenses the membership (735) between the second identity object John.System (720) and the third actor SalesGroup (715). After licensing the membership, the fourth identity object John. System.SalesGroup may operate or may be operated on independently of the John.System identity object (720). For example, actions performed by the John actor (705) may then operate under the context of John.System.SalesGroup (740). Additionally, operations such as providing access to the information set of SalesGroup can be granted to the John. System.SalesGroup (740) identity object. For example, suppose John.System.SalesGroup (740) was granted access to FileA of the SalesGroup content. If John. System.SalesGroup (740) provides a new version of FileA to the SalesGroup content, the creator of that new version may be recorded as John. System.SalesGroup (740). The license may also be useful in a scenario where the membership (735) of John.System (720) in SalesGroup (715) should be revoked. In this scenario, the license may be discontinued without the need to delete John.System and may not impact other memberships that John. System may have in a system.

In another exemplary aspect of membership, the membership target may be a function that is a task, the membership provider a user, and the membership recipient may be a new task that is a subtask of the membership target. FIG. 8 is an example of membership for first function, referred to as a task in this example, being associated with a second function, also referred to as a Task in this example, and is generally denoted by 800. In this example, one of the actors may be a user, and two of the actors may be functions that may be considered tasks. In FIG. 8 (800), a first actor Sally (810) with a first identity object Sally.System.WriteReportTask (825) invites a second identity object, PrepareOutlineTask.System (820), associated with a first function PrepareOutlineTask (805) to join a second function WriteReportTask (815). In this example, the membership object may include: a membership provider that is the first identity object Sally.System.WriteReportTask (825), and membership recipient that is the second identity object PrepareOutlineTask.System (820), and a membership target that is the second function WriteReportTask (815). Creation of the membership object triggers creation of a fourth identity object PrepareOutlineTask.System.WriteReportTask (840). This fourth identity object is also associated with the second function PrepareOutlineTask.System (805). The fourth identity object PrepareOutlineTask.System.WriteReportTask (840) then licenses the membership (835) between the second identity object PrepareOutlineTask.System (820) and the third actor WriteReportTask (815). After licensing the membership, the fourth identity object PrepareOutlineTask.System.WriteReportTask (840) may operate or may be operated on independently of the PrepareOutlineTask.System identity object (820). For example, actions performed by the PrepareOutlineTask.actor (805) may be conducted under the context of PrepareOutlineTask.System.WriteReportTask (840). Additionally, operations such as providing access to the information set of WriteReportTask (815) may be granted to the PrepareOutlineTask.System.WriteReportTask (840) identity object. Additional identity objects may be invited to join PrepareOutlineTask.System.WriteReportTask (840). As a task itself, identity objects associated with users may be invited to join PrepareOutlineTask.System.WriteReportTask (840) and perform activities. An Outline File may be created and associated with the content of PrepareOutlineTask.System.WriteReportTask (840). Additionally, PrepareOutlineTask.System (820) may be invited to participate in other tasks and additional memberships created. In this way, a system configured according to the principles of the invention may include functions or tasks that may be reused in a multiplicity of other functions. The PrepareOutlineTask.System (820) function may be invited to the WriteReportTask (815), it may be invited to a CompanyAnnualReportTask, and any report writing task, streamlining workflow creation processes and providing more efficiency through reusability. The license may also be useful in a scenario where the membership (835) of PrepareOutlineTask.System (820) in WriteReportTask (815) should be revoked. In this scenario, the license may be discontinued without the need to delete PrepareOutlineTask.System (820) and may not impact other memberships that PrepareOutlineTask.System (820) may have in a system.

In a third exemplary aspect of membership, the membership target may be a function that is a computation, the membership provider the function itself, and the membership recipient may be a computation, or subfunction, of the membership target.

FIG. 10A and FIG. 10B are example flow diagrams for the process of Creating Membership and are generally denoted by 1000A and 1000B. The Creating Membership Process Flow 1000A and 1000B may include:

Step 1005: For multiple actors in a system, may derive from a first parent identity object for a respective actor a first set of one or more child identity objects for the respective actor, wherein the first parent identity object for the respective actor may have an associated identifier and also defining a first information set for the first parent identity object for the respective actor, Step 1010: For multiple actors in a system, may assign an associated identifier for each of the first set of one or more child identity objects for the respective actor that may include at least one property of the associated identifier of the first parent identity object for the respective actor, so that the respective actor may be knowable by its parent identity object and each derived child identity object, and each derived child identity object may reference the parent identity object for the respective actor, Step 1015: For multiple actors in a system, may derive from any of the first set of one or more child identity objects a second set of one or more child identity objects for the respective actor, wherein any of the one or more child identity objects that may be derived for the respective actor may be a second parent identity object for the second set of one or more child identity objects for the respective actor, Step 1020: For multiple actors in a system, may assign for each of the second set of one or more child identity objects for the respective actor an associated identifier that may include at least one property of the associated identifier for the second parent identity object for the respective actor and the at least one property of the associated identifier for the first parent identity object for the respective actor so that a plurality of graphs of derived identity may be created wherein the respective actors may be knowable in each graph by at least any one of: the first parent identity object for the respective actor, any of the first set of child identity objects for the respective actor, the second parent identity object for the respective actor, and any of the second set of child identity objects for the respective actor, Step 1025: For multiple actors in a system, may evolve separately at least any one of: a first information set associated with, or contained by, the first parent identity object for the respective actor, a separate information set associated with each of the first set of one or more child identity objects for the respective actor, a separate information set associated with the second parent identity object for the respective actor, and a separate information set for any of the second set of child identity objects for the respective actor, so that the separate information sets may evolve in a context of any of the parent or child identity objects for the respective actor, Step 1030: For multiple actors in a system, may provide for the respective actor access to the first parent identity object so that access to any of the first set of child identity objects may be through the first parent identity object, and may provide for the respective actor access to any of second set of one or more child identity objects through the first parent identity object and the second parent identity object, so that any of the separately evolving information sets may be accessible by the respective actor, Step 1035: For multiple actors in a system, may distribute a parent identity object or any of the child identity objects for any of the respective actors within a computer system, thereby may provide distributed identity objects so that wherein each of the distributed identity objects may be knowable by its respective actor so that the respective actor may access any of its distributed identity objects, and wherein the associated information set for each of the distributed identity objects may evolve, Step 1040: For multiple actors in a system, may join in a membership object a membership provider, a membership recipient, and a membership target, wherein:
- the membership provider may be an identity object, including a function, from one of the multiplicity of identity graphs,
- the membership recipient may be an identity object, including a function, from one of the multiplicity of identity graphs, and
- the membership target is an actor that may also be a function.

Step 1045: For multiple actors in a system, the creating of a membership may trigger the creating of a new child identity object for the membership recipient identity object that may include an identifier that may include at least one property of the membership recipient identifier and one property of the membership target identifier so that any separately evolving information set of the identity object associated with the membership target may be made immediately made accessible to the new child identity object and so that the new child identity object may invite additional identity objects, including functions, to join with the membership target in a membership relationship. For example, if the membership target is a group, the new child identity object may immediately be granted access to the list of group members, any files shared with or created by the group, and any messages sent to the group. In another example, if the membership target is a function, the new child identity object may be granted access to all member functions for the function, all function inputs, and al function outputs.

In addition, membership may be used to accomplish decomposition of the membership target function through the creation of new membership objects, wherein the newly derived identity object resulting from the new membership is a member function of the membership target function, so that new member functions generate new membership objects and the collection of functions and member function may create an expanding program structure, thus creating a collaborative means for interpreting the functional structure of a computer program wherein all of the member functions may participate in the interpretation so that interpretation may be performed dynamically at system runtime so that the structure of a program can change dynamically at runtime and fluidly adapt to changing requirements.

Personas as Identity Objects

In an exemplary system configured according to the principles of the invention, an identity object may be referred to as a persona. Similarly, a derived identity object may be referred to as a derived persona, a child identity object may be referred to as a child persona, and parent identity object may be referred to as a parent persona. One of ordinary skill in the art may envision that any number of terms, including but not limited to identity object, persona, alias, alternate identity, and the like may be used as when referring to identity objects. For ease of discussion, identity objects may be used interchangeably with personas in this disclosure.

After a persona, or identity object is created, it may be applied or used in a system configured according the principles of the invention in several ways, such as for example:
- A persona may be associated with and granted access to objects in the system;
- A persona may be invited to join a group and may be specified as the membership recipient in a new membership, and may result in the creation of a new persona, or derived persona;
- A persona may be used to accomplish decomposition in a system.

In one aspect of the invention, a persona may only be generated as a result of membership. As such, a persona may have a set of associated properties, which may include the following:
- Identifier: a unique identifier for the persona, may be machine or human readable, may include one or more properties of a persona from which it derives, if any.
- Date/timestamp: the date and time at which the persona was created
- Access Recipient: the persona from which the new persona derives and the
- Access Point: the membership target that the persona object or persona the person.
- ACL Collection—Received: access rights that may have been granted to the persona by other personas.
- ACL Collections—Granted: access rights the persona may have granted to other personas.
- Content: references to the information objects that may comprise the information set associated with the persona. The information set may include files, folders, messages, comments, tasks, computations, functions, other personas, and the like.
- Derived personas: references to the personas that may derive from the persona. For example, if a persona was invited to join five different groups, the five personas derived from the persona as a result of the creation of five membership objects for those five invitations would be referenced.
- Invited personas: references to personas that the persona has invited to join with a function in a membership object. For example, if a persona invited three other personas to join a group, the personas that are the membership recipient in the membership relationship would be referenced as invited personas.

One of ordinary skill in the art may recognize that the persona property names are exemplary and any name, human or machine readable, may be appropriate for a system configured according to the principles of the invention.

A persona may be considered derived from another persona when it is generated as the result of membership and its' Access Recipient is specified as the other persona. In this scenario, the new persona may derive from the other persona specified as its' access recipient. The new, or derived persona may then be associated with and granted access to objects in the information set associated with the membership target, and it may also be invited to join other function, such as groups by being designated as the access recipient in yet another new membership, creating a third derived persona.

A derived persona may have all of the same features and functions as the persona from which it derives, though it may have different membership(s) and may include different access rights. There may be no limitation on the number of times a persona can be derived, and no limitation on the depth of persona derivation. This derivation of personas may create an identity graph.

FIG. 11 is an exemplary flow diagram of a process for deriving multiple personas from a single persona as a result of the creation of several membership objects and is generally denoted as 1100. The following scenario applies to the flow shown in FIG. 11: Persona 1 is invited to join Group B, Persona 2 is created and derives from Persona 1, Persona 2 may then be invited to join any number of groups, creating any number of personas that derive from Persona 2. The deriving multiple personas as a result of several memberships flow 1100 may include:

Step 1105: Persona 1 is invited to join Group B.
Step 1110: Persona 1 accepts the invitation.

Step 1115: A Membership object is created.
Step 1120: The system verifies whether Persona 1 already has a membership in Group B.
   Step 1125: If not as in this example, a new persona is created: Persona 2.
      Step 1130: Persona 2's Access Point is set to Group B,
      Step 1135: Persona 2's and the Access Recipient is set to Persona 1.
      Step 1140: Other attributes of Persona 2 are specified as appropriate.
Step 1145: Persona 2 licenses Persona 1.

FIG. 12, generally denoted as 1200, displays the logical organization of the simple derived persona graph that may be created as a result of repeating the flow shown in FIG. 11 (1100) for each of the following:

Persona 2 (1205) may be invited to join Group C and may result in the creation of Persona 3 (1210) which may derive from Persona 1 (1205). Persona 3 (1210) may then be invited to join any number of groups, which may create any number of personas that derive from Persona 3 (1210).
   Persona 1 (1205) may be invited to join Group D and may result in the creation of Persona 4 (1215) which may derive from Persona 1 (1205). Persona 4 (1215) may then be invited to join any number of groups, creating any number of personas that derive from Persona 4 (1215).
   Persona 1 (1205) may be invited to join Group N, where N is any number, and may result in the creation of Persona N (1220) which may derive from Persona 1 (1205). Persona N (1220) may then be invited to join any number of groups, creating any number of personas that derive from Persona 1 (1205).

The numbering of personas and groups in these examples are for illustrative purposes only; personas and groups may be assigned any alphanumeric, system generated, or machine-readable name as appropriate to the system.

FIG. 13, generally denoted as 1300, displays the logical organization of a derived identity graph that is somewhat more complex that that shown in FIG. 12 (1200). The graph shown in FIG. 13 (1300) may be created as a result of repeating the flow shown in FIG. 11 (1100) for each of the following:

Persona 1 (1305) may be invited to join Group A and may result in the creation of Persona 2 (1310) which may derive from Persona 1 (1305). Persona 2 (1310) may then be invited to join any number of groups, which may create any number of personas that derive from Persona 2 (1310).
   Persona 2 (1310) may be invited to join Group D and may result in the creation of Persona 5 (1315) which may derive from Persona 2 (1310). Persona 5 (1315) may then be invited to join any number of groups, which may create any number of personas that derive from Persona 5 (1315).
   Persona 5 (1315) may be invited to join Group E and may result in the creation of Persona 7 (1320) which may derive from Persona 5 (1315). Persona 7 (1320) may then be invited to join any number of groups, which may create any number of personas that derive from Persona 7 (1320).
   Persona 7 (1320) may be invited to join Group M and may result in the creation of Persona M (1325) which may derive from Persona 7 (1320). Persona M (1325) may then be invited to join any number of groups, which may create any number of personas that derive from Persona M (1325).

FIG. 14, generally denoted as 1400, displays the logical organization of a derived identity graph that is more complex than that shown in FIG. 12 (1200) and FIG. 13 (1300). The identity graph shown in FIG. 14 (1400) may be created as a result of repeating the flow shown in FIG. 11 (1100) for each of the following:

Persona 1 (1405) may be invited to join Group A and may result in the creation of Persona 2 (1410) which may derive from Persona 1 (1405). Persona 2 (1410) may then be invited to join any number of groups, which may create any number of personas that derive from Persona 2 (1410).
   Persona 2 (1410) may be invited to join Group D and may result in the creation of Persona 5 (1430) which may derive from Persona 2 (1410). Persona 5 (1430) may then be invited to join any number of groups, which may create any number of personas that derive from Persona 5 (1430).
   Persona 5 (1430) may be invited to join Group E and may result in the creation of Persona 6 (1435) which may derive from Persona 5 (1430). Persona6 (1435) may then be invited to join any number of groups, which may create any number of personas that derive from Persona 6 (1435).
   Persona 6 (1420) may be invited to join Group M and may result in the creation of Persona M (1440) which may derive from Persona 6 (1435). Persona M (1440) may then be invited to join any number of groups, which may create any number of personas that derive from Persona M (1440).
   Persona 1 (1405) may be invited to join Group B and may result in the creation of Persona 3 (1415) which may derive from Persona 1 (1405). Persona 3 (1415) may then be invited to join any number of groups, which may create any number of personas that derive from Persona 2 (1415).
   Persona 1 (1405) may be invited to join Group C and may result in the creation of Persona 4 (1410) which may derive from Persona 1 (1405). Persona 4 (1420) may then be invited to join any number of groups, which may create any number of personas that derive from Persona 4 (14).
      i. Persona 4 (1420) is invited to join Group G. Persona 7 (1445) is created and derives from Persona 4 (1420). Persona 7 (1445) can be invited to join any number of groups, creating any number of personas that derive from Persona 7 (1445).
      ii. Persona 4 (1420) is invited to join Group H. Persona 8 (1450) is created and derives from Persona 4 (1420). Persona 8 (1450) can be invited to join any number of groups,
         1. Persona 8 (1450) is invited to join Group I. Persona 9 (1460) is created and derives from Persona 8 (1450). Persona 9 (1460) can be invited to join any number of groups, creating any number of personas that derive from Persona 9 (1460).
         2. Persona 9 (1460) is invited to join Group J. Persona 10 (1465) is created and derives from Persona 9 (1460). Persona 10 (1465) can be invited to join any number of groups, creating any number of personas that derive from Persona 10 (1465).
         3. Persona 10 (1465) is invited to join Group X. Persona X is created and derives from Persona 10 (1465). Persona X (1470) can be invited to join any number of groups, creating any number of personas that derive from Persona X (1470).

iii. Persona 4 (1420) is invited to join Group Y, where Y is any number. Persona Y (1455) is created and derives from Persona 4 (1420). Persona Y (1455) can be invited to join any number of groups, creating any number of personas that derive from Persona Y (1455).

Persona 1 (1405) may be invited to join Group N and may result in the creation of Persona N (1425) which may derive from Persona 1 (1405). Persona N (1425) may then be invited to join any number of groups, creating any number of personas that derive from Persona N (1425).

A persona in the system may often have multiple derived personas in a system at one time as the persona becomes a member of various groups, or members of various distributed systems. In addition, depending on how the persona may have been associated with the different groups and systems of which it is a member, the personas may derive from one another in the graph similar to a family tree or the personas may all derive straight from the same top persona in a flat structure.

Routing Names

In some systems configured according to the principles of the invention, it may be useful to define a mechanism for referring to and differentiating between a persona and all of the objects in which a persona has membership. While a unique identification number may also be assigned in the system for each of these objects, a human readable routing name can also be useful. One method for assigning human readable routing names is described in this section. One of ordinary skill in the art may recognize that many techniques for assigning names to differentiate personas are possible.

When an identity, such as a user, group, function, or any object to which membership may be granted is created, it may be assigned a unique identifier. For a user this may typically be the username. For a group or another function, it may be a unique variation of the associated name. After membership is granted to a group and a persona is created, a unique routing name may be created by combining the property of the membership recipient routing name to the property of the membership target group name.

For example, if a user with a username of user1 becomes a member of a group with a routing name of group1, then the routing name of the persona that may be created for that membership may be user1.group1. If that persona then becomes a member of a group with a routing name of group2, the new persona routing name may then be user1.group1.group2. In this example, the persona routing name may answer the question: Who joined what? Where the first part of the routing name may specify the "who" and the second part may specify the "what".

FIG. 15 is a conceptual process diagram showing an assignment of routing names in a graph of derived personas in a system configured according to the principles of the invention, the steps performed according to principles of the invention, the process diagram is generally denoted as 1500. FIG. 15 (1500) Routing Name Assignment process flow may include the following steps:

Step 1505: User 1 joins Group 1, an example routing name for the persona that may be generated as a result of this membership may be: User1.Group1

Step 1510: User 1.Group1 joins Group 2, an example routing name for the persona that may be generated as a result of this membership may be: User1.Group1.Group2

Step 1515: User 1.Group1.Group2 joins Group 5, an example routing name for the persona that may be generated as a result of this membership may be: User1.Group1.Group2.Group5

Step 1520: User 1.Group1.Group2.Group5 joins Group 6, an example routing name for the persona that may be generated as a result of this membership may be: User1.Group1.Group2.Group5.Group6

Step 1525: User 1.Group1.Group2.Group5.Group6 joins Group M, an example routing name for the persona that may be generated as a result of this membership may be: User1.Group1.Group2.Group5.Group6.GroupM Step 1535: User 1.Group1 joins Group 3, an example routing name for the persona that may be generated as a result of this membership may be: User1.Group1.Group3

For step 1505 through Step 1535, the process flow shown in FIG. 11 (1100) may be repeated by the system. The routing name is populated in Step 1140.

FIG. 16 is a logical functional block diagram that provides an example of creating a membership and also displays the persona characteristics of Access Recipient and Access Point. In the Membership and Persona example 1600, the following steps may be completed:

Assumptions: John and Sally are both members of Acme. John is also a member of Writers.Acme. Sally is also a member of BakerContract.Acme.

Step 1: John and Sally are both members of Acme. Identity Object: Sally.Acme.BakerContract (1605) has invited the Identity Object: John.Acme.Writers (1610) to join the Group: BakerContract (1620).

Step 2: John.Acme.Writers (1605) accepts the invitation.

Step 3: A Membership (1615) is created.

Step 4: Verify whether the required identity object already exists.

Step 5: A new identity object is created: John.Acme.Writers.BakerContract (1625), Step 6: Populate the Access Point (1635) as Group: BakerContract (1635).

Step 8: Populate the Access Recipient (1630) as John.Acme.Writers.BakerContract (1625).

Step 8: Populate any additional persona attributes as appropriate.

Step 9: The newly created Identity Object: John.Acme.Writers.BakerContract (1625).licenses the Identity Object: John.Acme.Writers (1610).

In this Membership and Licensing example shown in FIG. 4, the membership characteristics are as follows:

Member: John.Acme.Writers (1610)
Membership Provider: Sally.Acme.BakerContract (1605)
Membership Target: BakerContract (1620)
Licensing Persona: John.Acme.Writers.BakerContract (1625)

Membership and Licensing Personas

In one aspect of the invention, access to an information set may not be granted until a persona is granted membership in a function that is associated with the content of interest. This membership may create a new identity object that licenses the identity object invited to the function. This new persona may derive from an existing persona.

After the membership is created, the membership recipient may be immediately granted access to objects associated with the membership target, as well as objects that otherwise exist in the system. If the membership target is a group, the identity object that licenses the membership may be immediately granted access to other objects to which the group has access, which may include group content, other group members, and the like.

In one aspect of the invention as configured according to the principles of the invention, membership in a group and creation of an identity object that licenses that membership may convey to that identity object access to all objects that have been shared with the group. In other words, information that is shared with a group may be automatically shared with all members of the group. Access rights indicating how a persona may interact with or operate on each object being shared may be specified in a system configured according to the principles of the invention. Example access rights may include but are not limited to: read, write, delete, create, share, evolve, extend, and the like. One skilled in the art may recognize that in other implementations, membership in a group may not immediately convey to the persona object that licenses the membership access to the objects in the evolving information set or otherwise shared with the group.

The licensing of a persona as a result of membership may provide a number of benefits in a system configured according to the principles of the invention. For example, with licensing in place, a derived persona may be created as a result of each membership. If there is a need to discontinue the membership, the license may be discontinued without impacting the parent persna. For example, as shown in Figure XX, after John.Acme.Writers joins the BakerContract group, the new persona with a routing name of John.Acme.Writers-.BakerContract may be created and may license the persona with a routing name John.Acme.Writers. If at a later date, the actor associated with John.Acme.Writers.BakerContract is assigned to work on a different project and he should no longer have access to the information set of the BakerContract group, the license between the two personas, John.Acme.Writers and John.Acme.Writers.BakerContract may be discontinued. Discontinuing the license may essentially revoke the membership of John.Acme.Writers in the group and access between the two personas. If the John.Acme.Writers may no longer access John.Acme.Writers.BakerContract, and any access to the information set of the group may also no longer be available, thus the sharing of information set of the group is also discontinued.

The creation of derived personas and licensing the derived persona to the persona from which it derives may also allow for an actor to join the same group through multiple access providers. For example, FIG. 16, generally denoted as 1600, shows an example of the characteristics of the new identity object as overlaying the membership characteristics In another example, the "John.CPA" identity may be invited to join the Accounting Group by the "Jane.AccountingGroup" identity object. In this example, the following membership and identity object may be created:

Membership
Member: John.CPA
Membership Provider: Jane.AccountingGroup
Membership Target: AccountingGroup
Licensing Persona: John.CPA.AccountingGroup
Identity Object
Access Recipient: John.CPA
Access Point: Accounting Group
Routing Name: John.CPA.AccountingGroup
Licensed to: no licensing in this example In a third example, the "GetResults( )" function may be added to the Accounting Group by John.CPA.AccountingGroup. In this example, the following identity object may be created:

Membership
Member: 'GetResults( )' function
Membership Provider: John.CPA.AccountingGroup
Membership Target: AccountingGroup
Licensing Persona: 'GetResults( )'.AccountingGroup Identity Object
Access Recipient: 'GetResults( )'function
Access Point: AccountingGroup
Routing Name: 'GetResults( )'.AccountingGroup
Licensed to: no licensing in this example Each identity object may itself become an access recipient in another identity object, thus creating new identity objects which derive from the existing identity objects, resulting in an identity graph. This designation as access recipient as well as the identity object derivation may be repeated over and over and the identity graph expanded indefinitely. This provides for operability in systems in which the same actor, operating under its many derived identities, can be granted many different types of access to resources in a single or distributed system, rather than assigned a specific role and a single set of access rights that apply throughout the system.

Once an actor is authenticated to the system, the actor may move between one or more of its available identity objects, and each action performed may be completed under the context of one or more derived identity objects. This may be especially useful in systems where there is a desire to maintain a record of actions and access performed by actors. In addition, in some scenarios, the Membership Provider and the Membership Recipient may be the same identity object.

Additionally, in systems configured according to the principles of the invention, access recipients may become access providers rather than requiring access to come from a system or other administrator. For example, suppose a system configured according to the principles of the invention is being used to share blueprints with contractors on a construction project for a 12 story building. The lighting contractor may be assigned to complete installation of light fixtures for all 12 floors in a one week time period. After reviewing the blueprints, the lighting contractor may decide to bring on two subcontractors in order to get the job done on time. In a system configured according to the principles of the invention, when the blueprints were shared with the lighting contractor lead, he was given extend access rights. The lighting contractor may share the blueprints directly with their subcontractor. In systems before the invention, the lighting contractor may have been required to request that an Administrator approve the subcontractor access to the blueprints. Providing for access recipient sharing of access rights saves time and eliminates the need to funnel all access grant requests through a central administrator.

Initial Membership in a System with the ACIM

In an embodiment of the invention, access may be granted to a user's identity to create the initial membership in the system, or top level group. At that time, the identity is the recipient of the membership access right to the group. This new membership may then trigger the creation of a new persona for that identity in that group. All other access rights for that identity in that group may then be granted to the new persona.

1. Once authenticated, the user's session may then be linked to their specific user account. If a top level persona is present for the user account then the user's session may then be automatically linked to their top level persona.
2. "Everything" which happens on the system may be linked either to a persona, a system account, or anonymous user.
3. All actions performed by a user may be linked to the persona under which they were acting at the time that they performed the action.

4. Access rights are typically granted to personas. One example of a possible occurrence when this does not happen is when a brand new user account is created and granted membership to the top level group. At that time, the user object is the recipient of the membership access right to the group. This new membership may then trigger the creation of a new persona for that user in that group. All other access rights for that user in that group may then be granted to the new persona.

Linking Actions to Identity Objects

After authenticating to a system configured according to the principles of the invention, the actor's session may be linked to one of it's associated identity objects. If a top level identity object is present for the actor, then the actor's session may be automatically linked to the top level identity object. In general, all actions performed by an actor may be linked to the identity object under which they were acting at the time the action was performed.

Multiple Memberships

In a system configured according to the principles of the invention, a persona may often be associated with a graph of multiple derived personas as it becomes a member of various groups. Depending on how the identity object was added to the different groups, some of the personas may derive from one another creating a more complex persona graph, whereas multiple other personas may derive from the same parent persona, creating a simpler graph.

As part of the membership process joining a persona to a group, a new derived persona that licenses the membership recipient persona to the membership target, for example, a group, may be created. If the membership recipient persona is already a member of the membership target group, then the new membership that is created may license the same membership recipient persona.

A system configured according to the principles of the invention may provide for a Persona to be invited to join the same membership target, such as a group, network, task, or function, by one or more Access Providers. This process may result in the invited Persona having multiple memberships, all of which may be licenses by the same derived Persona for the same membership target. FIG. 17, generally denoted as 1700, is a functional logical block diagram of multiple memberships licensed by the same derived Persona that may a result from multiple invitations to join a Group by the user actors associated with three other personas. In this example, three membership providers (1705, 1710, and 1715) invited the same membership recipient (1720) to join the same membership target (1740), resulting in the creation of three membership objects (1725, 1730, and 1735), all of which are licensed by the same derived identity object (1720) The derived persona may be independently granted access to Group resources by each Access Provider. One Access Provider may grant read access to a resource, while another Access Provider may grant write access to the same resource.

FIG. 18, generally denoted as 1800, provides a flow diagram of the steps that may be completed as a part of the process of creating multiple memberships to the same membership target such as the group shown in FIG. 17 (1700). The Multiple membership Process Flow FIG. 1800 may include the following:

Step 1801: Prerequisites: The BakerContract Group exists and has the following member personas: Sally.BakerContract.Acme, Larry.BakerContract.Acme, Bruce.BakerContract.Acme, Melissa.Accounting.BakerContract.Acme, and Alex.Legal.BakerContract.Acme Step 1802: The John.Writers.Acme persona is invited to BakerContract Group by Melissa.Accounting.BakerContract.Acme.

Step 1803: John.Writers.Acme persona accepts the invitation.

Step 1804: Membership 1 is created. The membership provider is specified as Melissa.Accounting.BakerContract.Acme. The membership target is specified as the BakerContract Group.

Step 1805: The system checks whether a membership for John.Writers.Acme already exists for the BakerContract Group.

Step 1806: A membership does not already exist, so the system creates the persona John.Writers.BakerContract.Acme Step 1807: The Persona John.Writers.BakerContract.Acme is populated as follows:
Persona access recipient is specified as Persona: John.Writers.Acme
Persona access point is specified as: Group: BakerContract.

Step 1808: Membership) Licenses the John.Writers.BakerContract.Acme persona.

Step 1809: The John.Writers.Acme persona is invited to BakerContract Group by Sally.BakerContract.Acme.

Step 1810: John.Writers.Acme persona accepts the invitation.

Step 1811: Membership 2 is created. The membership provider is specified as Sally.BakerContract.Acme. The membership target is specified as the BakerContract Group.

Step 1812: The system checks whether a membership for John.Writers.Acme already exists for the BakerContract Group.

Step 1813: A membership already exists; a new persona is not needed.

Step 1814: Membership2 licenses the John.Writers.BakerContract.Acme persona.

Step 1815: The John.Writers.Acme persona is invited to BakerContract Group by Larry.BakerContract.Acme.

Step 1816: John.Writers.Acme persona accepts the invitation.

Step 1817: Membership 3 is created. The membership provider is specified as Larry.BakerContract.Acme. The membership target specified as is the BakerContract Group.

Step 1818: The system checks whether a membership for John.Writers.Acme already exists for the BakerContract Group.

Step 1819: A membership already exists; a new persona is not needed.

Step 1820: Membership3 licenses the John.Writers.BakerContract.Acme persona.

If an Access Recipient has multiple memberships in a group, each provided by a different Access Provider, as long as at least one of the memberships has not been revoked, then the Access Recipient may still be considered a member of the group. Once the last membership that an Access Recipient has in a group has been revoked, then that Access Recipient may no longer be a member and may not be able to access the content of the Group nor of the Persona that was created for membership in that group.

Persona Derived from Multiple Parents

Persona derivation may be extended in some systems configured according to the principles of the invention such that in addition to a persona having multiple children, a persona could also have multiple parents, or in other words, derive from multiple parent personas. In this type of implementation, membership would have multiple recipients, persona may have multiple access recipients, and the persona may have multiple routing names. Other properties of a persona, such as inbox, outbox, and content, may collect the information if forwarded to one of multiple routing names. FIG. 19, generally denoted as 1900, is a functional logical block diagram that provides a view of the memberships (1910, 1915, 1920) and persona (1905) that may result from a persona deriving from multiple parent personas, including an example of the multiple routing names that may apply to the persona.

FIG. 20 provides an example view of a persona deriving from multiple parents, where the following steps were completed:

Step 2001: Persona: Melissa.Accounting.BakerContract.Acme has invited the persona: John.Writers.Acme to join the Group: BakerContract.

Step 2002: John.Writers.Acme accepts the invitation.

Step 2003: Verify whether a membership for any personas in the John.Writers.Acme identity tree already exist for the BakerContract.

Step 2004: A Membership is created.

Step 2005: Populate the Membership characteristics:
Membership Provider: Melissa.Accounting.BakerContract.Acme
Membership Target: BakerContract Group
Membership Recipient: John.Writers.Acme
Populate any additional Membership characteristics as appropriate Step 2006: Verify whether the required persona already exists.

Step 2007: Create a new persona: John.Writers.BakerContract.Acme,

Step 2008: Populate the persona characteristics:
Access Point: BakerContract.
Access Recipient as John.Writers.Acme
Any additional persona attributes as appropriate.
Routing name: John.Writers.BakerContract.Acme Step 2009: The newly created persona licenses the Persona: John.Writers.Acme.

Step 2010: Persona: Sally.Acme.BakerContract has invited the persona: John.Editors.Acme to join the Group: BakerContract.

Step 2011: John.Editors.Acme accepts the invitation.

Step 2012: Verify whether a membership for any personas in the John.Editors.Acme identity tree already exist for the BakerContract.

Step 2013: A Membership already exists, update the Membership characteristics:
Membership Provider(2): Sally.BakerContract.Acme
Membership Target: unchanged
Membership Recipient: John.Editors.Acme
Populate any additional Membership characteristics as appropriate Step 2014: Verify whether the required persona already exists.

Step 2015: A persona already exists, update the persona
Access Point is unchanged
AccessRecipient(2): John.Editors.Acme
Additional persona attributes as appropriate.
Routing name(2): John.Editors.BakerContract.Acme Step 2016: The updated persona also licenses the Persona: John.Editors.Acme.

Step 2017: Persona: Larry.BakerContract.Acme has invited the persona: John.Contracts.Managers.Acme to join the Group: BakerContract.

Step 2018: John.Contracts.Managers.Acme accepts the invitation.

Step 2019: Verify whether a membership for any personas in the John.Contracts.Managers.Acme identity tree already exist for the BakerContract.

Step 2020: A Membership already exists, update the Membership characteristics:
Membership Provider(3): Larry.BakerContract.Acme
Membership Target: unchanged
Membership Recipient: John.Contracts.Managers.Acme
Populate any additional Membership characteristics as appropriate Step 2021: Verify whether the required persona already exists.

Step 2022: A persona already exists, update the persona
Access Point is unchanged
AccessRecipient(3): John.Contracts.Managers.Acme
Additional persona attributes as appropriate.
Routing name(3): John.Contracts.Managers.BakerContract.Acme Step 2023: The updated persona also licenses the Persona: John.Contracts.Managers.Acme.

Function Decomposition Using Personas and Membership

Personas may be created for any objects that become a member of another object. Personas may be used to represent, for example, systems in a collection of distributed systems, groups, users, tasks, functions, to list just a few. In one exemplary environment for implementing principles of the disclosure, these systems may be referred to as networks. Personas and membership may be applied to decompose a membership target into zero or a plurality of additional functions that interpret the membership target objects.

For example, a system may be implemented as a Network and the network may have a persona. The Network persona may be decomposed into a collection of Groups that have membership with it and the member group personas may derive from the Network persona. A Group may also be decomposed into a collection of additional member groups that derive from initial group persona. The group may also include one or more members that are associated with personas that are users. A task may be decomposed into a collection of member tasks that make up, or derive from, the parent task. A function may be decomposed into a collection of member functions, or functions that derive from the initial parent function. In a system configured according to the principles of the invention, any actor, function, group, task, or other object may be decomposed into one or a plurality of member objects. Each of these member objects may be considered and interpreter of the parent object. The member functions may also be assigned a particular order for execution.

For example, inviting a function to join another function in a membership object essentially specifies the function that licenses the membership recipient as an interpreter of the membership target function. The membership target may be considered an outer function and the function that licenses the membership recipient may be considered an inner function. Continuing the example, if a hypotenuse function invites a sum of squared sides function and a square root function to join it in a membership, the memberships created as a result of this invitation may include the following. For ease of reference, each function is referred to by a routing name:

Sum of Square Sides function membership in a hypotenuse function
Membership provider: Hypotenuse.system
Membership Recipient: SumofSquaredSides.system
Membership target: Hypotenuse
Licensed by: SumofSquaredSides.System.Hypotenuse Square root function membership in a hypotenuse function
- Membership provider: Hypotenuse.system
- Membership Recipient: SquareRoot.system
- Membership target: Hypotenuse
- Licensed by: SquareRoot.System.Hypotenuse Further continuing this example, the SumofSquaredSides function may invite an Add function and a Square function to join through a membership object. In this way, the Sum of Squared Sides is an interpreter of the Hypotenuse function. The memberships created as a result of these invitation may include the following. For ease of reference, each function is referred to by a routing name:

Add function membership in a SumofSquaredSides function
- Membership provider: SumofSquaredSides.System.Hypotenuse
- Membership Recipient: Add.system
- Membership target: SumofSquaredSides.System
- Licensed by: Add.SumofSquaredSides.System.Hypotenuse Square function membership in a SumofSquaredSides function
- Membership provider: SumofSquaredSides.System.Hypotenuse
- Membership Recipient: Square.system
- Membership target: SumofSquaredSides.System
- Licensed by: Square.SumofSquaredSides.System.Hypotenuse In another exemplary environment for implementing principles of the disclosure, the Hypotenuse function may be considered an outer function, the SumofSquaredSides function an inner function, and the a SquareRoot function a second inner function. Additionally, the Add function and Square function may be considered inner functions of the SumofSquaredSides function. These additional inner functions interpret the SumofSquaredSides function. This succession of outer functions and inner function create a function graph. In this example, one of ordinary skill in the art may recognize that the outer function may be more general, or more abstract, and the succeeding layers of inner functions may become more and more concrete with each progressive layer. The inner functions may concretely interpret the outer function which is an abstract function.

In another example, suppose a Sales Group that is a function and a user Sally.SalesGroup is a member of the SalesGroup in a system that is configured according to the principles of the invention. Suppose further that Sally.SalesGroup invites five other users to join the Sales Group. Suppose Sally.SalesGroup creates a PreSales Group as a member of SalesGroup, and a PostSales Group as a member of SalesGroup. In all of these instances, Sally.SalesGroup is interpreting the SalesGroup by adding new member functions, each of which may also further interpret, or decompose, SalesGroup by inviting additional member functions.

The functional decomposition aspect of the invention provides for starting with a general, or abstract function, and as memberships are created, adding inner functions that interpret the work of the outer function into more specific, or more concrete units of work. This is a powerful paradigm that is similar to traditional computing interpreters that are accomplished using language and syntax. However, when configured according to the principles of the invention, interpreters in a system may be users that are people, people who may map a function information set to include its inputs and outputs, users that may invite other users to a functions, and those invited users themselves become interpreters of the function. As these interpreters decompose the function into a collection of additional functions, the interpreters are themselves dynamically generating functions, and dynamically generating programs.

Additionally, in a system configured according to the principles of the invention, if a task exists and 8 user functions are invited to join the task through membership, a multi-threaded model of execution which includes 8 threads, one for each invited function or user, may be created. Each user may have a persona and each persona is a function; membership and persona generation may be one process by which the system may grow, expand, and evolve. Inviting 8 users to a function may be inviting 8 functions to a function. Because each function may operate independently of any other member function within the scope of its access rights, the membership target function may operate as a multi-threaded function.

In another example of a system configured according to the principles of the invention, suppose a Shipping function exists and five user personas are invited to become members of the shipping function. Each of the five personas creates one new abstract member function for the Shipping function, which may include: pack, paperwork, delivery method, fees, and complaints. In creating a member function, each member user is programming the function. The user functions may then invite additional users to join in a membership with one of the member functions. These member users may then further subdivide any of the member functions, continuing to program the system. In a system configured according to the principles of the invention, user functions can build complex systems rather than relying on expensive software developers with specialized skills. The system can be readily modified by discontinuing memberships or adding new memberships that add additional functions or invite additional users and the like. The program may become self-generating as the member functions collectively expand the functional space. Further, the decomposition of functions through membership creates a function graph that can be distributed across systems on a single node or multiple nodes in any combination of physical and virtual server environments.

The decomposition aspect of the disclosure may provide for functions to generate functions through identity, access control, and membership. For example, in a system that contains four function in which a membership object joins the first identity object, the second identity object, and the third function and he first identity object is a membership provider, the second identity object is a membership recipient, and the third function is a membership target, so that the second identity object is a member of the third function. Through the creation of a fourth identity object with an associated fourth identifier that derives from the second identity object in the membership relations, the third function is decomposable into a collection of multiple member functions through the creation of additional membership object, accomplishing decomposition of the membership target function through the creation of new membership objects, wherein the newly derived identity object resulting from the new membership is a member function of the membership target function, so that new member functions generate new membership objects, creating an expanding program structure and a collaborative means for interpreting the functional structure of a computer program wherein all of the member functions participate in the interpretation, performing interpretation dynamically at system runtime so that the structure of a program dynamically changes at runtime and fluidly adapts to changing requirements.

In the illustrative architecture shown in FIG. 2 (200), each system could be implemented as a Network. FIG. 21, generally denoted as 2100, provides an example of a snapshot of a distributed set of Networks decomposed into member Networks (2105, 2110, 2115, 2120), Groups (2125, 2130), Functions (2145, 2150), Tasks (2135, 2140) and the like. Note that not all elements are labeled to maintain readability of FIG. 21 (2100). Although not shown in FIG. 2 (200), each of the included member, network, tasks, function, and group may have a corresponding persona that provides the membership and persona derivation functionality. The naming conventions used are exemplary, the number and combination of each type of object is not limited to that shown. Any object that can be modeled in a data collection could be decomposed using the membership and persona functionality, and that zero or a plurality of decomposition levels is possible.

FIG. 21 includes Networks, member networks, users, groups, member users, and member groups, tasks and member tasks, and the like. Any functions may be decomposed into any other type of function. For example, groups may be decomposed into member functions that are users, personas, tasks, and the like. Tasks may be decomposed into member functions that may include tasks, subtasks, subfunctions, users, personas, computations, and the like.

Authentication and Personas

In an exemplary environment for implementing principles of the disclosure, any persona may be required to authenticate before being allowed to access its membership as well as its and any of the associated information sets and access collections. For example, the John.Acme.Writers.BakerContract persona may indicate the following memberships for John:
- A membership for the John user on the Acme network, routing name: John.Acme
- A membership for the John user in the Writers group on the Acme network, routing name: John.Acme.Writers
- A membership in the BakerCotnract Group for the John User n the Writers group on the Acme network, routing name: John.Acme.Writers.BakerContract.

Each of these memberships may provide access to a different or similar set of objects such as documents, files, folders, other user personas, and the like. In a system configured according to the principles of the invention, the John user may be required to authenticate zero, one, or multiple times to access the information set accessible to the derived persona licensing the membership recipient persona. For example, John may need to authenticate to access John.Acme, may not need to authenticate to access John.Acme.Writers, and may need to authenticate to access John.Acme.Writers.BakerContract.

Identity Distribution

Within a single system configured according to the principles of the invention, personas may be invited to join Groups that are members of the system. Membership in each group may result in the creation of new or the relicensing of an existing and possibly derived persona, thus distributing identity across the personas and creating an identity graph. The derived, or child, personas may be traversed through the Access Recipient entries to discover the parent persona.

Similarly to the single system architecture, such as in an architecture as shown in FIG. 2 (200), multiple systems configured according to the principles of the invention may run and with other systems directly or may interact through one or more central hubs. In multi-system exemplary environment for implementing principles of the disclosure, personas may be invited to join Groups on any one or more of the member systems. In one example, a user may enter the network of systems via the central Hub, and access other systems through the personas that specify access point as a group on another of the member systems. In this embodiment, a persona on one system may include only a membership to a single persona on a separate system and no additional information about other memberships that may have been created on the other system and derived personas licensing the membership recipient persona, in another embodiment a central hub may track all derived personas and act as a repository for the graph of identity. In these and other embodiments of the invention, a persona may participate in an indefinite number of memberships, generating a plurality of corresponding derived persona licensing the membership target persona within and across systems that can communicate, without requiring any one persona in an identity graph to track all other derived personas for the actor in the graph, with the exception of the persona from which it derives and the zero or more child personas that derive directly from it. Access rights may also be distributed as they may typically be assigned to each personas as desired by another persona.

FIG. 22, generally denoted as (2200) provides an example of persona derivation and identity distribution in a distributed system configured according to the principles of the invention. In the Persona Derivation and Identity Distribution Example 2200, a central hub system (2205) contains at least user1 with persona 1 referenceable through a Lilly.Hub CRN. The central hub (2205) also includes Group B (2230) with which Lilly.Hub has a membership licensed to a derived persona with a CRN Lilly.Hub.GroupB. Additionally, the central hub (2205) also includes TaskA (2235) with which Lilly.Hub has a membership licensed to a derived persona with a CRN Lilly.Hub.TaskA.

Continuing the example, the system also includes Network 2 (2210). The derived persona with a CRN Lilly.Hub.GroupB was invited to join GroupD (2240) on Network 2 (2210). The persona with CRN Lilly.Hub.GroupB has a membership with GroupD (2240) licensed to a derived persona in Group D (2240) with a CRN Lilly.Hub.GroupB.Network2.GroupD.

Network 2 (2210) also includes Group E (2245) in which the persona with CRN Lilly.Hub.GroupB.Network2.GroupD was invited to join. The persona Lilly.Hub.GroupB.Network2.GroupD has a membership with this Group E (2245) licensed to a derived persona with CRN Lilly.Hub.GroupB.Network2.GroupD.GroupE.

In addition, the system also includes Network 3 (2215). The derived persona with a CRN Lilly.Hub was invited to join GroupF (2250) on Network 3 (2215). The persona with CRN Lilly.Hub has a membership with GroupF (2250) licensed to a derived persona in Group F (2250) with a CRN Lilly.Hub.Network3.GroupF.

Network 3 (2215) also includes Function A (2255) in which the persona with CRN Lilly.Hub.GroupB.Network3.GroupF was invited to join. The persona Lilly.Hub.GroupB.Network3.GroupF has a membership with the FunctionA (2255) licensed to a derived persona with CRN Lilly.Hub.GroupB.Network3.GroupF.TaskA Lastly, the system includes Network N (2220) with TaskB (2260) in which the persona with CRN Lilly.Hub.GroupB.Network2.GroupD.GroupE was invited to join. The persona Lilly.Hub.GroupB.Network2.GroupD.GroupE has a membership with Task B (2260) licensed to a derived persona with CRN Lilly.Hub.GroupB.Network2.GroupD.GroupE.TaskB.

The process flow used to create the memberships and derived personas corresponding to FIG. 22 (2200) include:
- Step 2201: User1 with Persona1 is invited to join GroupB on the Central Hub
- Step 2202: Persona1 with CRN Lilly. Hub accepts the invitation.

Step 2203: The system checks whether a membership for Persona1 with CRN Lilly.Hub already exists for GroupB on CentralHub.

Step 2204: In this example, a membership does not already exist, so the system creates the membership. The membership provider is specified as the persona that invited the persona with the CRN Lilly.Hub. The Membership Target is specified as GroupB.

Step 2205: The system creates the derived persona that licenses the membership recipient persona with CRN Lilly.Hub Step 2206: The derived persona is populated as follows:

Persona access recipient is specified as Persona: Lilly.Hub.GroupB
Persona access point is specified as: GroupB.
CRN: Lilly.Hub.GroupB Step 2206: The derived persona licenses the membership of persona with CRN Lilly.Hub with Group B.

Step 2207: This process is repeated throughout the distributed system when a persona is invited to join with a task, group, function, or the like.

Identity Graph

The process of creating a tree or hierarchy of personas that derive from other personas results in a graph of identity. This identity management graph can be distributed across a plurality of architectures, including but not limited to those shown in FIG. 1, FIG. 2, and FIG. 3. One skilled in the art may recognize that the distribution of identity across multiple systems using the ACIM could take on many different architectures.

In one implementation of the architecture shown in FIG. 2, the system may include a series of virtual networks distributed across a collection of virtual machines owned or used by different companies and organizations, all connected through a central hub. In this example, a node on the identity graph created in one system/machine may be extended and joined to a node on one or a plurality of other systems/machines. The identity graph for that identity may then continue to be derived in the other systems. The ACIM may be used to preclude further derivation on identity at any node in the identity graph.

Access Control

In an exemplary environment for implementing principles of the disclosure, actors may require at least a System or Top Level Persona before access to any system object(s) or resource(s) can be granted. The persona may then provide for access to be granted through the Access Collection.

Using the Access Collection component of a system configured according to the principles of the invention, a persona may be granted access to the one or more objects and to the properties associated with the object that is the membership target as well as its information set, any other objects shared with it, and any of the properties of either the information set of other object. These possible access targets may also be referred to as Access Points. Access specified using the Access Collection component of a system configured according to the principles of the invention may be fine-grained.

Below is a sample listing of access rights, sometimes referred to as permissions, that may be specified as part of the access collection for a persona. One skilled in the art may recognize that some implementations may apply alternate, additional, or fewer access rights:

Read: the ability to view an object
Write: the ability to edit an object
Delete: the ability to delete or negate an object
Create: the ability to generate an object Each access specification may also include the following two additional characteristics, or properties, that may be independently activated or deactivated:

Extend or Share: the ability to share a subset of the access rights an access provider has on the object with an access recipient. For example, if an access provider has the read access and the extend property is active, that access provider may grant read access to another access recipient.

Evolve: the ability to automatically share with an access recipient a snapshot, subset, or full collection of previous, current, and future versions of an object. For example, if an access provider grants read access for a document to an access recipient, the access provider may specify using the evolve property whether the recipient may be granted access to the current version of the document only, or whether the access recipient may be automatically granted access to all future versions of the document.

Any persona may be designated as an access recipient in a system configured according to the principles of the invention, including but not limited to personas created for groups, users, functions, tasks, derived personas, and the like.

After a persona is created, the access recipient may be granted access to the information set associated with one or more personas and/or functions associated with the membership target, as well as other objects and information shared with the membership target. A persona may share information directly with any other persona or function. After sharing information with a persona or function that has a plurality of members, such as a group, a system configured according to the principles of the invention may create and grants access to the shared information with all members of the membership target.

The Access Provider need not be aware of the rights the access recipient may or may not already have to an object. Multiple Access Providers may designate different access rights for the same object for the same access recipient. When determining access rights in a system configured according to the principles of the invention, all applicable access rights may be reviewed and either the broadest, the strictest, or some combination may be applied. Additionally, an access provider hierarchy may also be applied and allow the access rights to be expanded or limited based on grants higher in the authority hierarchy. For example, suppose a Project Manager for a TaskA constraints access to Report1 to MemberA such that MemberA may not access, read, or write Report1. Suppose also that a member of TaskA provides read and write access to Report1 to MemberA. A system configured according to the principles of the invention may selectively apply the access restrictions of the project manager and override the access granted by the Task member. This may be useful when creating a Task in a system where a range of confidential and non-confidential information may be required to complete the task, but only certain users may need access to the confidential information. For example, if a task requires creation of a company annual report, it may only be appropriate for a subset of members of the task to have access to revenue and profitability information by client.

An access recipient may have multiple access rights to an object from multiple access providers. If one access provider revokes some or all of the granted access rights, but the same access rights were granted by another access provider, the access recipient may retain those access rights. The access rights may not be fully revoked until all access providers providing the same access right revoke the specified access right. One of ordinary skill in the art may recognize that in some implementations, it may be beneficial to revoke rights provided by multiple access providers if any one, a specified number, or a specified percentage of the access providers revokes the right. Other implementations may rely on an access provider hierarchy to determine when revocation of access rights supersedes other grants of access rights.

In an exemplary environment for implementing principles of the disclosure, when a persona is created to reflect membership in a Group, the access recipient of the persona may, through a series of functions, be granted access to all of the resources that the Group persona has as part of its Access Collection.

Fine-Grained Access Control

Systems configured according to the principles of the invention may also be used to assign fine-grained access controls. The controls may be applied to any object in the system, as well as any property of any object, including but not limited to the information set, personas, properties of information and personas, and the like For example, suppose a user through persona with CRN of: user1.GroupA in a system creates a document Document1 and wants to share it with another user who has a persona with a CRN: user2.GroupA. The process flow used to specify access to the document in a system configured according to the principles of the invention is shown in FIG. 23, generally denoted as 2300. The may include the following:

Step 2301: Persona: user1.GroupA creates a document (Document1)

Step 2302: An ACL for the creator of document1 object for Persona: user1.GroupA may be automatically generated by the system and may include:
Access Provider: user1.GroupA
Access Recipient: user1.GroupA
Access Point: document1
Access rights: create, delete-extend, and access-extend rights Step 2303: As the creator, an ACL for document 1 name property is created for Persona: user1.GroupA.
Access Provider: user1.GroupA
Access Recipient: user1.GroupA
Access Point: document1 name
Access rights: read-extend, write-extend, and delete-extend Step 2304: As the creator, an ACL for document 1 description property is created for Persona: user1.GroupA.
Access Provider: user1.GroupA
Access Recipient: user1.GroupA
Access Point: document1 description
Access rights: read-extend, write-extend, and delete-extend Step 2305: Persona: user1.GroupA shares the document1 object with Persona: user2.GroupA, and gives Persona: user2.GroupA read-extend rights on the name property of the document1 object and read-extend, write-extend rights the description property of the document1 object.

Step 2306. System verifies that Persona: user1.GroupA has the access rights it is trying to share.

Step 2307: As an access recipient, an ACL for the document1 object for Persona: user2.GroupA is created.
Access Provider: user1.GroupA
Access Recipient: user2.GroupA
Access Point: document1
Access rights: read-extend Step 2308: As an access recipient, an ACL for the document1 name relation for Persona: user2.GroupA is created.
Access Provider: user1.GroupA
Access Recipient: user2.GroupA
Access Point: document1 name
Access rights: read-extend, Step 2309: As an access recipient, an ACL for the document1 description for Persona: user2.GroupA is created.
Access Provider: user1.GroupA
Access Recipient: user2.GroupA
Access Point: document1 description
Access rights: read-extend, write-extend Step 2310: The process completes and user2.GroupA has access to document1 and can share a subset of their access with another user.

FIG. 24 shows a logical representation of the examples access created and interaction with objects result from steps 2301 through 2310 and is generally denoted as 2400. FIG. 24 (2400) includes a creator user persona (2405), a document (2410), a document name (2415), and a description (2420). The User1.GroupA persona (2405) creates document1 (2410) and is assigned ACLs for the document (2425), ACLs for the document name (2430) and ACLs for the document description (2440). The User1.GroupA persona (2405) shares the document (2425) with User2.GroupA persona (2435) and specifies the type of access User2.GroupA (2435) may have for the document name (2445) and ACLs for the document description (2440).

In another exemplary environment for implementing principles of the disclosure, separate ACLs may be created for each access right, or ACLs may be grouped for certain sets of access rights. In addition, programming logic for verifying whether access already exists may be provided.

Extension and Access Derivation

When an Access Recipient is granted rights to access an object in a system configured according to the principles of the invention, the ACL may designate whether the Access Recipient may share access with other Access Recipients by extending all or part of its access rights to other Access Recipients. For example, suppose Persona X is given Read and Write access to a file. If Persona X has an extension access right for the file, it may then grant Read access to the same file to Persona Y. This ability for a user to give some or all of their permissions to another persona may be referred to as Extension.

Access derivation in a system configured according to the principles of the invention may be accomplished using extension. When a persona extends a subset of its access rights, the access rights of the Access Recipient Persona derive from the access rights of the Access Provider Persona. In one implementation of a system configured according to the principles of the invention, the access granted to a recipient may be derived from (i.e., be a subset of) the access rights of the Access Provider. For example, a persona with read only permissions to a document may typically not be able to grant another persona write access to that document. FIG. 25, generally denoted as 2500 is a logical functional block diagram of an exemplary implementation of derived access rights. This example follows these steps:

Step 1: User2.Group1 persona (2505) creates Document1 (2510). As the creator of cause Document1 (2510), User2.Group1 (2505). is given all access rights to the document. In this example, the Access Collection) (2515) entries may include
Access Provider: User2.Group1
Access Recipient: User2.Group1
Access Point: Document1
Access Rights: Create, Read, Read-Extend, Read-Evolve, Write, Write-Extend, Write-Evolve, Delete, Delete-Extend, Delete-Evolve Step 2: User2.Group1 (2505) shares Document1 (2510) with User3.Group1 (2520), and assigns User3.Group1 (2520) a subset of their access rights to Document1

(2510). In FIG. 25 (2500), the subset of access rights shared is: Read, Read-Extend, and Write access to Document1. In this example, the Access Collection2 (2525) entries may include.
Access Provider: User2.Group1
Access Recipient: User3.Group1
Access Point: Document1
Access Rights: Read, Read-Extend, Write Step 3: User3.Group1(2520) shares Document1 (2510) with User4.Group1 (2530), and assigns User4.Group1 (2530) a subset of their access rights to Document1 (2510). In FIG. 25 (2500), the subset of access rights shared is: Read access to Document1 (2510). In this example, the Access Collection2 (2525) entries would include.
Access Provider: User3.Group1
Access Recipient: User4.Group1
Access Point: Document1
Access Rights: Read Access Graph The process of granting access rights that are a subset of the access rights of the access provider may result in the creation of a graph of derived access. In some implementations, this graph may be referred to as a tree or hierarchy of derived access. This access control graph may be distributed within a single system or across a plurality of systems, including but not limited to those shown in FIG. 1 (100), FIG. 2 (200), and FIG. 3 (300). One of ordinary skill in the art may recognize that the distribution of access control across multiple systems configured according to the principles of the invention may take on many different architectures.

In one implementation of the architecture shown in FIG. 2 (200), the system may include a series of virtual networks distributed across a collection of virtual machines owned or used by different companies and organizations, all connected through a central hub. In this example, access control graph is layered along with the identity graph. As identity is derived and distributed across systems and nodes, the distributed identity can then share its access with other identities on the distributed system.

For example, suppose persona1 on network1 was invited to join a group on network2, and child persona2 derived from persona1 as a result of membership. Child persona2 may then share access granted to it by other personas on network2 with zero or a plurality of access recipients on network2.

This access control graph may then continue to be derived in the distributed systems configured according to the principles of the invention. The invention may also be used to preclude further derivation of access control at any node in the access graph.

These intersection of the access graph and identity graph may meet auditability requirements not possible with today's system. Because access to one or more access points is provided by deriving a subset of the access of the access provider persona, determining which persona provided access to another persona, when the access right was created, and the specific access granted it possible for every object in a system configured according to the principles of the invention. For example, suppose persona Sam.Acme.BizDev and Ted.Acme.BizDev were granted read and share access to sensitive documents containing a summary of partner negotiations on a $1 billion contract by persona Susan.Acme.BizDev. Suppose further that the document was leaked to a competitor. The company can easily review the graphs of derived identity and graph of derived access to see if one of the three personas with access to the documents granted access to any other users. The company can determine the listing of users with access to the documents and more efficiently conduct activities to identify which user may have inadvertently or purposely leaked the document.

Access Evolution and Versions

The Access Collection may also contain information on whether the Access Recipient may have access to a partial set or full set of the current, historical, future, or some combination versions of an access point. For ease of reference this is referred to as Access Evolution. For example, in an exemplary environment for implementing principles of the disclosure, a persona may have been granted read rights to a document. The next time the document is updated (e.g., a new version created), if the persona has full evolve access, the persona may automatically be granted read permissions on the new version. In another example, if the user evolve access if limited to a certain time period, access to new versions may be automatic only within a certain time frame.

Using the principles of the invention, it may be possible to specify access to multiple current versions, historical versions, and future versions of an object resource, as a property or characteristic of the access right, at the time access is granted or at any later time, and whether the Access Recipient may automatically be granted access to any future versions of a resource for a specified time period or indefinitely.

In addition, Access Providers may specify which of the multiple current versions of a resource, historical versions, and future versions an Access Recipient may have access, including access to any future versions of a resource for a specified time period or indefinitely.

In systems of today, users are typically granted access to a location which contains content or a snapshot of an object. In systems configured according to the principles of the invention, updates to objects may be automatically made available to a specific set of users.

Revoking Access Rights

In a system configured according to the principles of the invention, any access right, including membership, may be revoked. An Access Provider may revoke any access rights granted to an Access Recipient. If that Access Recipient granted a subset of its access rights to another Access Recipient (i.e., derived access), the invention provides for the ability to cascade the removal of the derived access rights if desired. For example,

- Persona X has permission on Document 1 with the ability to extend the permissions (grant permissions to other users).
- Persona X grants permissions on Document 1 to Persona Y. The system may support the ability to track that Persona Y's permissions derived from Persona X's permissions.
- At a later time or date, the permissions that Persona X has on Document 1 are revoked.
- Since Persona Y's permission derived from Persona X's permissions, the system may allow for the automatic revocation of Persona Y's permissions when Persona X's permissions are revoked, or may allow the user to specify whether all or a subset of the derived permissions should be revoked.

Note that a persona, user, or group may be granted the same access rights to the same access point (system resource) but from different access providers. Continuing the above example, Persona Y may have read privileges on Document 1 granted by Persona A, read privileges on Document 1 granted by Persona B, and read privileges on Document 1 granted by Persona C. As long as any one of the read privileges is still active (not revoked) then Persona Y may still read Document 1. If the privileges granted from Persona B are revoked, Persona Y may still be able to read Document 1 due to the privileges granted by Persona A and Persona C.

If a persona derives from another persona and access to the parent persona is revoked, then the user's access to the derived persona may also be revoked. This may be useful in systems where a user leaves a company. The user may no longer access the parent persona and any child personas derived from the parent persona.

Identity Graph

The Identity graph created in a system configured according to the principles of the invention may be discovered by following the Access Recipients in a derived persona to determine the parent persona. This process may be repeated until either the access recipient is something other than a persona or the top level persona. This discovery may be accomplished through a variety of algorithms or computer functions.

In FIG. 26 (2600) provides an illustration of discovering the identity graph for Persona 10 (2625) and may be expressed as follows:

Persona 10(2625) ← Persona 9(2620) ←

Persona 8(2615) ← Persona 4(2610) ← Persona 1(2605)

The identity graph can be traversed in either direction (top to bottom or bottom to top) and starting from any location. Each persona is aware of the memberships that it has been granted and through each membership can reach each derived persona.

Access Graph

Similar to the identity graph, the access graph created in a system configured according to the principles of the invention may be discovered by following the graph of Access Providers for specific access rights. Because an access recipient may only be granted access rights that are a subset of the access the rights held by the access provider, following the access providers in the access collection is the method to discover the access graph. This process may be repeated until the access recipient and access provider are the same. This discovery can be accomplished through a variety of algorithms or computer functions. FIG. 27, generally denoted as 2700, provides an example Access Graph, where the access graph may be expressed as:

Persona User4.GroupA(2725) ←

Persona User3.GroupA(2715) ← Persona User2.GroupA(2705)

The access tree is tree can be traversed in either direction and starting at any point in the tree.

Application of the ACIM to Classification and Role-Based Access Control

A system configured according to the principles of the invention may also support access control based on "classifications." The classification approach may begin with a pre-defined grouping of access rights that reflect the desired management and handling and/or allowable interactions with of a specific set of access points. In a classification-oriented implementation of the invention, the Access Recipients and the Access Points may be classified on the same scale, or the Access Recipient scale may be mapped to the Access Point scale. For example, a group of files classified as '2' could only be accessed by Access Recipients with a classification of '2' or higher, or a group of files classified as 'G' can only be accessed by Access Recipients with a classification of 6 or higher.

An implementation of a system configured according to the principles of the invention that supports role-based access control may include groupings of access rights based on specifications for a group of personas expected to operate in a similar manner or perform similar functions. For example, an Administrator role may be assigned to a group of personas who can assign read and write access to objects for other personas. In this example, a group of Access Rights may be automatically assigned to personas who become members of the Administrator Group. The access extension and derivation functionality may also support role-based security in that personas with an Administrator Role may grant a subset of their access rights to other personas.

Access Control, Identity Management, and Membership

Access control and identity management, configured according to the principles of the disclosure, may create and maintain an identity graph through the use of personas; through the use of personas, may create and maintain an identity graph that may be distributed across a single system, multi-node system, or distributed graph-based system on one or a plurality of machines.

Access control and identity management, configured according to the principles of the disclosure, may use personas and membership as a mechanism for providing access to system objects; may create and maintain an access graph by creating a persistent access collections that may specify the access provider, access recipient, access target, and access rights; may provide for an access provider persona to specify how an access recipient persona may interact with an access target by assigning access rights in an access collection; and may provide for any access recipient to become an access provider through the use of the extend access.

Access control and identity management, configured according to the principles of the disclosure, through the use of extend access, may provide for an access recipient to become an access provider to a second access recipient by sharing a subset of the access providers access rights; may further provide for the second access recipient to become an access provider to a third access recipient by sharing a subset of the second access providers access rights; may further provide the third access recipient to become an access provider to a fourth access recipient by sharing a subset of the access providers access rights; may repeat this process indefinitely, with any access recipient having extend access becoming an access provider to another access recipient by sharing a subset of access rights, may create an access graph that may be expanded indefinitely through the use of personas and access collections.

In addition, access control and identity management, configured according to the principles of the disclosure, may create and maintains an access graph that can be distributed as a graph across a single system, multi-node system, or distributed graph-based system on one or a plurality of machines; and may provide for an access recipient to receive automated access to updated versions of an access target through the use of evolve access.

Additional Detail on Access Control and Identity Management

One example of the packages, interfaces and classes developed to implement Access Control and Identity Management is described in this section. In this example implementation, a distributed system interacting with an object-relational data store is used. This implementation is exemplary and many alternate implementations are possible as a skilled artisan would recognize.

Overview

This exemplary implementation uses the following baseline system architecture, building blocks, and interfaces:

Architecture

A distributed system interacting with an object-relational data store, similar to that shown in FIG. 2 (200).

Building Blocks
- Entities: Objects stored in the data collection are modeled as entities
- Relationships: Entities are linked to their attributes and properties through relationships. Entities are linked to one another through relationships
- Identity objects: actors in the system are associated with identity objects
- Membership: may typically be created following association of an identity object with, or entry into, a group. Membership may result in the creation of an identity object
- Persona: the identity object that is either created or licensed as a result of a membership
- ACLEntry: The mechanism used to store the access rights an access recipient is granted on an access point, such as an object/entity or relation/relationship, by an access provider
- Access Provider: The provider of the access rights granted to the access recipient
- Access Recipient: The persona that is granted the access rights to the access point
- Access Point: The entity on which the access recipient is being given access rights Interfaces, Classes, and Methods
- Security Manager Implementation Interface (CoralSecurityManager): triggers the creation of membership, personas, and licenses
- ACL Manager Implementation Interface (ACLManager): methods to grant permissions, query permissions, enforce permissions
- Membership Class: Methods to create membership
- Persona Class: Methods to create personas
- RootACLEntry: interface for defining access rights to be stored
  - SecurablePermission( )
  - RelationPermission( )

Securing Entities and Relationships

Each entity (i.e., object) in the data collection is associated with two types of security:
- entity security (securablePermissions( ) class)
  - Provides base permissions for an access recipient to create, access, or delete/negate the entity.
  - Provide additional permission for an access recipient to extend the create, access, and delete/negate permissions on the entity to another access recipient.
  - Provide additional permission for an access recipient to have evolving access, and delete/negate permissions for new versions of the entity.
- relation security (relationpermissions( ) class)
  - Provides base permissions to read, write, delete the entity relationships.
  - Provide additional permission for an access recipient to extend the read, write, and delete/negate permissions on the entity relationships.
  - Provide additional permission for an access recipient to have evolving read, write, and delete/negate permissions for new versions of the entity relationships.

Granting Access

Actors in the system are granted access to entities through their personas. For example, when a user creates an account on the system, a membership and persona are created on the Central Hub network. This persona can then be invited to join one or more networks in the system, join one or more Groups on one or more networks in the system, join one or more tasks on one or more networks in the system, etc. Membership and persona creation may be controlled by the CoralSecurityManagerImpl( ) interface.

Security Manager Implementation Interface—(CoralSecurityManagerImpl( ))

The Security Manager Implementation Interface (CoralSecurityManagerImpl) may trigger the creation of membership, licenses, and personas. When a user joins the central hub network, a root persona may be created for the user. After the root persona exists, the user may be granted membership to other networks, groups, tasks, etc.

When a persona is invited to join a group, the CoralSecurityManagerImpl( ) interface may complete the following checks (steps):

Does the Membership Provider have permission to invite another persona to join the Group? An excerpt of the programming code that completes this task is provided below:

```
//verify provider can grant membership to the target
if (!personaCanGrantMembershipOnTarget(provider, target)) {
    throw new AccessDeniedException("'Persona '" + provider + "' does not have permission to grant membership on " + target);
}
```

Does the Membership Recipient persona already have a Membership to the Group that was granted by the inviter? If so, return the existing membership; if not, check to see if the recipient already has a persona associated with the Group. If so, create a new Membership; if not, create a new persona and new membership. An excerpt of the programming code that completes this task is provided below:

Check whether the membership already exists

```
Membership membership = getMembership(provider, member, target);
if (membership != null) {
    log.info("Membership already exists. Returning existing membership.");
    return membership;
}
```

Determine if a persona already exists with this member/target combination.

Persona persona=getPersona(member, target);

If a persona does not exist, create one

```
if (persona == null) {
    //a persona for this recipient/target does not already
    exist, so create one.
    persona = Persona.New(member, target);
```

Grant persona some access to itself

```
aclManager.grantCreatorPermissions(persona, persona,
Persona.PERSONA_CREATOR_SECURABLE_ACLS,
Persona.PERSONA_CREATOR_RELATION_ACLS);
```

Save the new persona
persona.Save( )

Grant the membership creator the ability to 'access' the persona

```
aclManager.grantCreatorPermissions(persona, provider,
PERSONA_MEMBERSHIP_CREATOR_SECURABLE_ACLS,
RELATION_ACL_ENTRY_EMPTY_ARRAY);
```

Create the membership
　　membership=Membership.New(member, target, provider, persona);
Create and Retrieve Memberships
　　The Membership( ) class may include methods to:
　　Create membership

```
public static Membership New(Function member, Function
membershipTarget, Persona membershipProvider, Persona
persona) {
```

Populate membership properties/relationships, including triggering creation of a persona:

```
// assign a value to relations
   Guid guid = Guid.NewGuid( );
   Form.RelationMap Elements = new Form.RelationMap( );
   Elements.Add(idGuid, guid);
   Elements.Add(idTime, new java.util.Date( ));
   Elements.Add(idMember, member, Function.idMembershipsAsMember);
   Elements.Add(idMembershipTarget, membershipTarget,
      Function.idMembershipsAsMembershipTarget);
   Elements.Add(idMembershipProvider, membershipProvider,
      Function.idMembershipsAsMembershipProvider);
   Elements.Add(idPersona, persona, Persona.idMembershipsAsPersona);
```

Retrieve each membership relationship/property

```
   public Function getMember( ) {
       return (Function) this.getRelative(idMember);
   }
   public Function getMembershipTarget( ) {
       return (Function) this.getRelative(idMembershipTarget);
   }
   public Function getMembershipProvider( ) {
       return (Function) this.getRelative(idMembershipProvider);
   }
   public Persona getPersona( ) {
       return (Persona) this.getRelative(idPersona);
   }
```

Create and Retrieve Personas
　　The Persona( ) class includes methods to:
　　Create a new persona

```
public static Persona New(Function recipient, Function membershipTarget)
   }
   Guid guid = Guid.NewGuid( );
```

Assign the Persona Routing Name

```
   String partialCRN = subtractCRNs(recipient.getCRN( ),
        membershipTarget.getCRN( ));
   // we now want it to look like CRN_PREFIX_PERSONA + partialCRN +
   // membershipTarget
    if(
!partialCRN.toLowerCase( ).trim( ).startsWith(CRN_PREFIX_PERSONA.toLowerCase( ).trim( ))
){
        partialCRN = CRN_PREFIX_PERSONA +partialCRN;
    }
    if(!partialCRN.endsWith(".")) {
       partialCRN = partialCRN +".";
    }
    partialCRN = partialCRN + membershipTarget.getCRN( );
```

Create a Content folder for the new persona

```
   Folder personaFolder = Folder.New( );
   personaFolder.setName("Content for "+partialCRN);
   personaFolder.setDescription("Content for "+partialCRN);
   personaFolder. Save( );
```

Create an Inbox folder for the new persona

```
   Folder inboxFolder = Folder.New( );
   inboxFolder.setName("Inbox for "+partialCRN);
   inboxFolder. setDescription("Inbox for "+partialCRN);
   inboxFolder. Save( );
```

Create an Outbox folder for the new persona

```
   Folder outboxFolder = Folder.New( );
   outboxFolder.setName("Outbox for "+partialCRN);
   outboxFolder.setDescription("Outbox for "+partialCRN);
   outboxFolder.Save( );
```

Assign Values to the new persona relations

```
   Elements.Add(idGuid, guid);
   Elements.Add(idTime, new java.util.Date( ));
   Element.New(newPersona, idRecipient, recipient,
       Function.idPersonasAsRecipient);
   Element.New(newPersona, idAccessPoint, membershipTarget,
       Function.idPersonasAsAccessPoint);
```

Populate the CRN of the new persona

```
   // populate the CRN of this persona
   newPersona.setCRN(partialCRN );
   newPersona.setInboxFolder(inboxFolder);
   newPersona.setOutboxFolder(outboxFolder);
   newPersona.setContentFolder(personaFolder);
```

Return the new persona
　　return newPersona;
Specify and Store Access Controls
　　The ACL Manager Implementation Class (ACLManagerImpl( ) may provide "methods" to grant, deny, and store access controls.
RootACLEntryImpl( )
　　The RootACLEntryImpl( ) class may create the framework for storing the object/entity permissions and the permissions for the object relations/entity relationships. The framework may be a map of the item being secured and a bitmask of the possible access controls.

Objects have the following 'securable permissions' to the object itself:

```
public RootAclEntry grantPermissionsByProvider(Entity securedEntity, Persona
recipient, Function provider, SecurableAclEntry[ ] securableAclEntries, RelationAclEntry[ ]
relationAclEntries) {
```

Access
Create
Delete

The object permissions may be delegated and/or may be set to evolve for future versions of the object. These permissions may be managed in an object permission bitmask. For example, the bitmask for a persona granted read access with delegate and evolve rights for an object may be conceptually represented as shown in the following table.

|  | Access | Create | Delete |
| --- | --- | --- | --- |
| Object Permission | 1 | 0 | 0 |
| Delegate | 1 | 0 | 0 |
| Evolve | 1 | 0 | 0 |

All properties and characteristics of an object are stored as relations. Access to these relations is secured separately. Each relation has the following 'relation permissions':
Read
Write
Delete The relation permissions may be delegated or may be set to evolve for future versions of the relation. These permissions may be managed in a relation permission bitmask. For example, the bitmask for a persona granted read access with delegate and evolve rights for a relation on an object, and write access without delegate and evolve rights for the same relation on the same object, can be conceptually represented as shown in the following table.

|  | Read | Write | Delete |
| --- | --- | --- | --- |
| Relation Permission | 1 | 1 | 0 |
| Delegate | 1 | 0 | 0 |
| Evolve | 1 | 0 | 0 |

Grant Permissions( )

The Grant Permissions( )method is used to specify the entries in the object bitmask and relation bitmask.

```
public RootAclEntry grantPermissions(Entity securedEntity, Persona
recipient,SecurableAclEntry[ ] securableAclEntries, RelationAclEntry[ ]
relationAclEntries) {
    if (getCurrentPrincipal( ) == null) {
        throw new AccessDeniedException("Coral Security context must
contain a persona under which this request is made.");
    }
    return grantPermissionsByProvider(securedEntity, recipient,
getCurrentPrincipal( ),securableAclEntries, relationAclEntries);
}
```

Verify that Access Provider has Permissions Trying to Grant

In the ACIM, an access provider may only grant a subset of their permissions to an access recipient. Prior to granting any permission the system verifies that for each permission the provider is attempting to grant that the provider not only has that permission, but is also able to delegate it. The grant PermissionsByProvider( ) method verifies that the access provider has the permissions they are attempting to grant to an access recipient.

Step 1: loop over the list of permissions that the provider is trying to give to the recipient, and make sure that the provider has them. If not, throw an error.
Step 2: For each permission the access provider has and is trying to grant to another access recipient, verify that is delegatable. If not, throw an error.
Step 3: For each permission that the access provider has and is trying to grant to another access recipient that is delegatable, create a new ACLEntry.
RootAclEntry newAclEntry=mergeOrCreateAclEntry(securedEntity, recipient, provider, securableAclEntries, relationAclEntries);
return newAclEntry;
Verify Access Controls The ACL Manager Implementation Class (ACLManagerImpl( )) also provides methods to check/verify whether a persona has access to an entity/object and whether a persona has access to the relations of an object.
Does the persona have permission to access the object?
boolean personaHasSecurablePermission(Entity securedEntity, Persona persona, SecurablePermission securablePermission);
Does the persona have permissions on the objects relations?
boolean personaHasRelationPermission(Entity securedEntity, Persona recipient, String relationName, RelationPermission relationPermission);
Illustrative Examples of Using Certain Principles of the Disclosure Several examples of systems configured according to the principles of the invention are described in this section. One of ordinary skill in the art may recognize that these implementations are exemplary and many alternate implementations are possible.

In one aspect, the invention may permit the decomposition of functions into sub-functions using access control, wherein the sub-function (the access recipient) becomes a member of the containing function (which the access point).

One benefit of this approach is that the entire of body of users within a company (or other common entity) can participate collaboratively in functional decomposition. Whereas, typically, only programmers or systems administrators govern the decomposition of organizational units into sub-organizational units, this new mechanism permits the crowdsourcing of users to cooperatively and collaboratively participate in functional decomposition.

A second benefit is that because a system configured according to principles of the invention does not distinguish between users and groups and machine interpreted algorithms, which are all viewed by the invention as functions which can be therefore decomposed into sub-functions, the system is able to provide a single, uniform mechanism of managing functional decomposition. The benefit of a single uniform representation is the mitigation of complexity, which results from functional decomposition occurring in many different ways using the current art. For example, in the current art, breaking a group into a subgroup in a directory service is a separate system from decomposing programmatic functions into sub-functions. In other words, they are not handled in a common uniform representation. By providing such a uniform representation, in one aspect, the invention eliminates significant complexity that results from having multiple systems that effectively perform the same or equivalent operation. Secondly, by providing a uniform representation, the invention may enable the combination of many previously incompatible function types, such as users, groups, and machine-interpreted algorithms, all of which are represented uniformly as functions, according to principles of the invention.

For example, prior to the invention, programming languages only combine machine-interpreted functions with other machine interpreted functions. But with the uniform representation provided by the invention, a person function can be made a member function (e.g., assigned to interpret) a machine-interpreted function. This mixing of function types within a uniform functional decomposition hierarchy is made possible by the invention.

For example, a user A can be assigned to interpret a machine-interpreted process function called Shipping. The user A is invited to be a member in the Shipping function and therefore receives membership access control, wherein user A is the access recipient, Shipping function is the access point, and the delegator (Boss B) is the access provider for user A. The user A is therefore a member function within the parent Shipping function, after access is granted (so that the user A has access to the Shipping function in order to interpret the function). The user A interpreting the function can include the user A further decomposing the Shipping function into sub-functions, such as Boxing, Weighing, and Handling. Each of these functions are similarly assigned to be member functions of the Shipping function, where the Boxing function is the access recipient, the Shipping function is the access point, and the user A is the access provider. The example Boxing function may be interpreted by an algorithm, wherein the algorithm is contained by a function MachineFunction1 which is assigned as a member function (e.g. interpreter) of the Boxing function. User A can then invite Transport Company C to be an interpreter (e.g., member function) of the Handling function. When Transport Company C receives its invitation that grants it membership access to the Handling function, C only has access to that Handling function, but not to the other functions, such as Weighing and Boxing. Transport Company C then uses the access control system to pass messages to another function Weighing. When this flow of access occurs, the message sent is the access point, the Weighing function is the access recipient, and the Transport Company C is the access provider.

Continuing the example, when Transport Company C is granted access to the Handling function, a persona P1 is created representing the identity of Transport Company C within the context of its work in the Handling function. P1 is a function, and therefore may be the access recipient of rights granted to the Transport Company C in its role within the Handling function. Access rights received by the Transport Company C acting in persona P1 are assigned so that those rights are limited to Transport Company C's role in this specific Handling function. Outside of the handling function, those rights do not exist for Transport Company C. Those rights may be granted by any other function acting as an access provider (such as user A) providing access rights to Persona p1, wherein p1 is the access recipient. Access Rights R1 may be granted to persona p1, but at a later time, when persona p1 is removed for any reason, Transport Company C no longer has access to those rights (R1) because it no longer has the persona. Transport Company C may have many personas because C may be granted membership access into many functions, wherein each granting generates a persona to which a unique set of access permissions may be applied.

The personas belonging to Transport Company C may be published and used in order to grant access rights to Transport Company C in the various functions C engages in according to those personas. Each persona may be provided a unique textual address or routing name (such as transportcompanyC@handling.userAcompany.com). This uniquely identifiable string may be used to send messages or grant additional rights or remove rights for transportC acting in its capacity as a member of the Handling function.

In this example, the message passing architecture as provided as one aspect of the invention enables a persona, such as transportCompanyC@handling.userAcompany.com, to send messages with attachments to other personas in the same functional domain or in a different functional domain. For example, if Transport Company C is given access to a separate company's Handling function, Handling2, then a second persona P2 is created for the Transport Company C, to which rights can be assigned that are restricted to the role played by Transport Company C in the Handling2 function. The rights assigned to Transport Company C under persona P2 are wholly separate from the rights assigned to Transport company C under persona P1. The benefit of this approach is a separation of concerns, in which rights can be granted to Transport Company in the various transactions with other companies in which it outsources the Handling function. It would undesirable for rights assigned to Transport Company C under first handling engagement (resulting P1) to be connected in any way with the access rights granted to Transport Company C under the second handling engagement (resulting in P2). Therefore, rights granted pertaining to the first engagement are assigned to P1, and rights granted pertaining to the second handling engagement are assigned to P2. Typically, Transport Company C would authenticate against a certain identity (either P1 or P2), to gain access to information using those rights. The credentials (e.g. password) for P1 and P2 typically would be different, since they are separate security contexts. As such, P1 may be managed in one security domain and P2 within a separate security domain. Transport Company C enters into one or the other of the two security domains by authenticating against the appropriate persona.

Continuing the example, if user A decides to use a new transport company, user A can terminate the persona P1 assigned to Transport Company C and create a new persona P3 granting membership to the Handling function to an alternative Transport Company D. At this point, the same Handling function would have, at different times, alternative interpreters in Transport Company C and Transport Company D.

In its role as Handling function interpreter under P3, Transport Company D is invited to participate in a separate function F3 (the TradeConvention function) in its role as handler, then a new persona P4 will be created for Transport Company D granting the company access to F3 (the Trade Convention), where P4 is derived from P3 (e.g. identity derivation). Transport Company D will participate in the Trade Convention as a handler representing User A's company. If P3 is later terminated, then all derived personas, including P4 (access to the Trade Convention), may automatically be terminated, since they derive their rights from the parent persona P3 (the Handler function).

The advantage of the identity management graph is that a single user, group, or other function (f) may have many personas (like "wearing many hats"), where each persona grants a unique set of access rights. The benefit of having multiple identities relevant to participation (e.g. membership) in different functions (such as groups, companies, trade conferences, conference calls, tasks, or any other entity which can be expressed as a function in the invention's function graph) means that a single function, such a user, may participate as a member within a multitude of different functions, and within those functions, receive access rights unique to the participation/membership within those functions.

For example, if a user B is assigned to be a member of three tasks, user obtains a new persona in order to become a member of each task. For task 1, a new persona P1 is created. For task 2, a new persona P2 is created. And for task 3, a new persona P3 is created. If, as part of user B's work on task 2, she is invited to participate in task 4, then a new persona P4 is created granting user B access to task 4, but only as a derivative of her identity in task 2, such that persona p4 is derived from persona p2.

So that according to the principles of the invention, identity management may be achieved through the derivation of personas. The derivation of personas may be conveniently represented as a graph based structure, in which a derived persona may be linked by a connection to the persona from which it derives.

The invention breaks new ground in combining access derivation with identity derivation. Furthermore, in one aspect, the principles of the invention introduces the notion that both identity derivation and access derivation may be expressed within a common graph of objects linked by edges.

Derivation may be expressed as edges in the graph. Derivation may include access relationships (such as the access relationship) or identity relationships (such as the membership relationship). These relationships may be expressed as edges in the graph. Functions (such as users, groups, tasks, meetings, or computations) may be as nodes in the graph. Personas may be represented as nodes in the graph. Typically, nodes are connected with other nodes via edges (or relationships).

In a computer environment, a mechanism for the flow of access by means of derivation is provided. Typically, access rights granted with respect to an access point flow (or derive from) an access provider to an access recipient. Typically, the access provider is a function and the access recipient is a function. The access point may be any object, such as files or functions, to which the access recipient is granted access rights by the access provider. Access is typically represented by a relationship object referencing the access provider function, the access recipient function, and the access point object, and a set of access rights. There are typically different types of access, including read access, right access, and membership access. Therefore, the membership access relationship is typically represented as a subtype of the general/abstract access relationship. Membership is the idea that a first function can gain access to a second function, so that the first function becomes the member of the second function. The membership access relationship (MAR1) maps the access provider role to a function A, maps the access recipient to function B, and maps the access point to function C, wherein, function A is a function doing the membership inviting and therefore providing access (as the access provider), function B is the function being invited and therefore receiving access (as the access recipient), and function C (the access point) is the function into which function B is obtaining membership. When a membership access relationship (MAR1) is created, typically a new associated persona function is generated, representing the new identity created for the access recipient function (function B) while serving as a member of the access point function (function C). Because the persona (persona1) is typically a function, additional rights may be granted to or granted by persona1, such as rights granted by persona1 (as the access provider in a new access relationship) or rights granted to persona1 (as the access recipient in a new access relationship). After a persona (persona1) is created, it may itself be invited by a function 3 to become a member in another function (function 4), thereby creating another membership access relationship (MAR2) in which MAR2's access recipient is persona 1, MAR2's access provider is function 3, and MAR's access point is function 4. A second persona (persona2) is then typically automatically created representing the new membership access (MAR2). Personal is then said to derive from persona1, since persona 2 is based on persona1. In this way, identity derivation is provided so that persona1 has a derived persona2 (and persona 2 derives from persona 1). Personal may have a plurality of derived personas, including persona2, persona3, and persona4. Since these derived personas are based on the persona1, if persona1 is deleted, persona2, persona3, and persona4 (the derived personas) may also be deleted. So, a new technique is provided by which a function may be invited to participate in a plurality of other functions, wherein each membership "invite" is expressed by a new membership access relationship and each such membership access relationship results in the creation of a new and associated persona. When a persona function is invited to be a member in another function, that in turn generates a membership and a second persona that is derived from the first persona, resulting in identity derivation.

WORKING EXAMPLES/REDUCTION TO PRACTICE

The principles of Access Control and Identity Management described in this disclosure may be implemented in a variety of software applications and may be delivered with or without a graphical user interface, using tools such as Java, Flash, HTML, and the like. Exemplary implementations of a software application delivered through a web interface using internet communications protocols are described in this section. This exemplary software application creates, stores, manages, and retrieves forms, entities, relations, and relationships as information streams and in databases configured according to the principles of the disclosure.

One of ordinary skill in the art may recognize that the Figures illustrating the interface features, organization of elements on an interface screen or page, inclusion of specific elements, use of a specific language, and naming of elements are exemplary; many variations of the provided examples are possible. These figures are designed to demonstrate how a system configured according to the principles of the invention may enable the functionality required for the interface to function. Any number of additions, substitutions, deletions, reordering, and renaming may be possible and the interface may still be enabled by the invention.

FIG. 28 through FIG. 39 are exemplary illustrations of graphical user interfaces (GUI) configured according to the principles of the disclosure. The GUIs may represent functionality (i.e., software components executed by appropriate hardware) that requests user input, translates the input into a format consistent with a system configured according to the principles of the invention. One of ordinary skill in the art may recognize that many other implementations of an account creation interface are possible. The Figures showing graphical user interfaces (including FIGS. 28-39) and all Figures showing flow diagrams may also represent block diagrams of software components embodied in a storage medium that when executed by an appropriate computing device produce the respective graphical user interface and may display updates thereto and receive inputs from a user. The Figures showing graphical user interfaces (including FIGS. 28-39) may also represent steps for constructing the various constructs described by the respective Figures and associate description, including but not limited to: entities including relationship entities, Forms, streams, and other constructs described herein.

A working system employing the system and method for access control and identity management principles described herein has been developed and used to secure an application accessed through a web-based front end through the Internet. Screen captures of the working web interface are provided in this section. One of ordinary skill in the art may recognize that the system and method for access control and identity management may be used to implement many other types of functionality, in either an internet or non-internet-based environment. The web-based front end includes the functionality listed below. The components of the system and method for access control and identity management that support that functionality may include:

| | |
|---|---|
| Identity | Access Recipient |
| Membership | Access Point |
| Licensing | Access Collection |
| Persona/Identity Objects | Access Rights |
| Routing Name | Access Graph |
| Inbox | Derived Identities/Derived Personas |
| Outbox | Derived Access |
| Derived Personas | Access Evolution |
| Identity Graph | Access Extension |

This example implementation of a system configured according to the principles of the disclosure includes the following:
- Create a new user account and creating membership in a distributed architecture
- Triggering creation of a root or top level Persona
- Triggering creation of persona inbox, outbox, content
- Joining another network in a distributed architecture and creating derived identity objects or derived personas
- Automatically setting persona context by choosing from My Networks list
- Joining a Group on a network and creating derived identity objects
- Sharing a file with another user, specifying fine-grained access, and creating derived access
- Function Decomposition Create an Account In an example web interface configured according to the principles of the invention, a user may create an account to access the application configured according the principles of the disclosure as follows:

FIG. 28 is an illustrative graphical user interface showing an exemplary Login page for a web application built on a system configured according the principles of the disclosure, generally denoted by reference numeral 2800. A user may access the login page similar to the one shown in FIG. 28 (2800) using an internet browser such as Microsoft Internet Explorer, Mozilla Firefox, and the like. The Login page (2800), and additional pages (2900, 3000, 3100, 3200, 3400) may be accessed on a web site that are associated with creating a user account, may include:

A header section (2805): a header section typically exist across all pages in a web site, may display a logo or other identifier, list the Company or Organization Name and a Tag Line, provide links to general pages such as about, contacts, help, for more information, and the like.

A body section (2815): a body section of a web page typically includes the content, controls, elements, and other features that provide the primary functionality for a page.

A footer section (2825): a footer section on a web typically includes other general content and link that are less important, such as copyright information, link to a privacy statement, user information, and the like.

After accessing the login page (2805), the body section (2815) of this page may include another section (2820) with controls that may allow entry of user name and password to login to the system. If a user does not have an account, the user may click the "Create an Account" link (2825).

FIG. 29 is an illustrative graphical user interface showing an exemplary Create Account—Enter Account Information page for a web application built on a system configured according the principles of the disclosure, generally denoted by reference numeral 2900. After clicking the "Create an Account" link (2825), the page such as the one shown in FIG. 29 (2900) may be displayed and may include a header section (2905), a body section (2915) and a footer section (2925). The header (2905) and footer (2925) sections may be similar to those described previously for FIG. 28 (2800). The body section (2915) may include information that may be required to create an account for the user to access the system, including interface controls to enter a username and password that may be used to populate a User entity instantiated from a User Form. The username and password may then be used by the user and the system for login and for authentication purposes.

After entering account information and clicking the "Next" button ion the Enter Account Information page (2900), the page shown in FIG. 30 (3000) may be displayed. This body section (3015) of this page may list terms and conditions for use of a web site for which a user is creating an account.

After agreeing to the terms and conditions on of use and license restrictions that may be displayed the page shown in FIG. 30 (3000), clicking to agree to the terms, and clicking the "Next" button, the page shown in FIG. 31 (3100) may be displayed. The body section (3115) may display the information the user entered in creating an account.

After clicking Confirm on the page shown in FIG. 31 (3100), the page shown in FIG. 32 (3200) may be displayed. The body section (3215) on this page may provide additional information to the user about next steps required to complete the account creation process.

As is typical with many web-based software applications, a confirmation email may be sent to the user that created an account to confirm that they requested the creation of an account, and requesting that the user confirm their account information. FIG. 33 (3300) shows an example of email content that might be sent from the web site on which the user tried to create an account, and viewed with any traditional email client software. The message may contain a verification code that can be used to verify their account and a link that the user may navigate to with an internet browser.

After accessing the web page at the link provided in the confirmation email shown in FIG. 33 (3300), the Verify Account Creation Page shown in FIG. 34 (3400) may be displayed. The body section (3415) of this page may include controls for the user to enter the verification code that was emailed, their username, and password. After the user clicks Verify in the body section (3415) of the page, the system may then compare the information the user entered with the entities stored in the information stream and complete the account verification process.

In an example, a user "Ned Wilson" may enter information on a page similar to that shown in FIG. 29 (2900) to the create a new user account in a distributed system configured according to the principles of the invention. After verifying the entered information, the system may use the information provided by the "Ned Wilson" user to create a root persona and membership for the user on the central hub network. For ease of reference, this persona is referenced by an example routing name of nwilson.coral.com Login to a System After creating an account, the user nwilson.coral.com may wish to log in to a system configured according to the principles of the disclosure. A user may access the login page perhaps similar to the one shown in FIG. 28 (2800) using an internet browser such as Microsoft Internet Explorer, Mozilla Firefox, and the like. In the body section (2815) of the page, the user may enter a username and password and click login to access the application. The system may attempt to authenticate the user and if successful, a My Networks page may be displayed. FIG. 35 is an illustrative graphical user interface showing an exemplary My Networks page for a web application built on a system configured according the principles of the disclosure, generally denoted by reference numeral 3500. This My Networks 3500, and any pages accessed after logging in to the web application, may include the following sections:

- A header section (3505): a header section typically consistent across all pages in a web site, may display a logo or other identifier, list the Company or Organization Name and a Tag Line, provide links to general pages such as about, contacts, help, for more information, the name of the network or node with which the page the user is viewing is associated, link or button to logout of the application, and the like.
- A menu/navigation bar (3510): a menu or navigation bar may include additional links that when clicked, may display to the user other pages of the application.
- A body section (3515): a body section of a web page typically includes the content, controls, elements, and other features that provide the primary functionality for a page.
- A footer section (3525): a footer section on a web typically includes other general content and link that are less important, such as the copyright information, link to a privacy statement, the name of the user logged in and accessing the page, and the like.
- The body section (3515) of a My Networks Page may include a listing of the names of the networks a user may access and the status of the networks. The page may also provide links or buttons the user may click to access functionality to create a new network or edit his/her global profile.

Joining Another Network in a Distributed System and Creating Derived Identity

After the user nwilson.coral.com has a root persona, he may be invited to join other systems through the central hub. A user that is already a member of the network may click and Invite Member function on a network page to begin the process of inviting a new member. This may result in the display of the Invite Network Members popup shown in FIG. 36 (3600). FIG. 36 is an illustrative graphical user interface showing an exemplary Invite Member popup for a web application built on a system configured according the principles of the disclosure, generally denoted by 3600. This Invite Network Members popup 3600 may include the following:

- Title (3605): May display the title of the popup
- Action Buttons (3610): Buttons a user may click to either Send Invitations to invitees or Cancel the invitation process
- Hand Enter (3615): An area for the user to hand enter an email address for an invitee so that an invitation may be sent to those email addresses.
- Available Existing Contacts (3620): A file explorer-like view of contacts on nodes of a web application built on a platform configured according to the principles of the disclosure and nodes of the application. The user may click on the name of a node to show the list of available contacts. The user may then select a contact by double-clicking the name or clicking the name and clicking the arrow to move names between available and selected.
- Selected Existing Contacts (3625): Displays the list of selected existing contacts.

In this example, a user that is a member of the Network may select the user Ned Wilson from the list of users with accounts on the Central Hub. After selecting Ned Wilson, the user may click the Send Invitations action button (3610) and the system may generate and send invitations to the selected users to join a network. A message may then be sent asking user Ned Wilson to accept the invitation to join the network. In this example, user Ned Wilson persona nwilson.coral.com will be joined to the network in a membership where the user that invited Ned Wilson to the network is the membership provider, the network is the membership target, and the nwilson.coral.com persona is the membership recipient. As a result of membership, a derived persona is created for user Ned Wilson, with a CRN of nwilson.newnetwork.coral.com.

Automatically Setting Persona Context by Choosing from My Networks List

After the derived persona is created for Ned Wilson, the system may then retrieve that derived persona user Ned Wilson and at login, display the name of all networks of which Ned Wilson is a member. The user Ned Wilson may then access the network through his derived persona.

Automatically Granting Access to Membership Target Content for a Derived Persona The persona nwilson.newnetwork.coral.com may immediately be granted access to all or a portion of the network information set, including the list of network members, files and folders associated with the network, and the like, The accessible information may be displayed on a page similar to that shown in FIG. 37 (3700).

A Network Home page similar to that shown in FIG. 37 (3700) may be displayed. The Network Home page (3700) on the web site may include the following sections:

- A header section (3705): a header section typically consistent across all pages in a web site, may display a logo or other identifier, list the Company or Organization Name and a Tag Line, provide links to general pages such as about, contacts, help, for more information, the name of the network or node with which the page the user is viewing is associated, link or button to logout of the application, and the like.
- A menu/navigation bar (3710): a menu or navigation bar may include additional links that when clicked, may display to the user other pages of the application.
- A shortcut/secondary navigation bar (3725):
- A body section (3715): a body section of a web page typically includes the content, controls, elements, and other features that provide the primary functionality for a page.

A Personal Folders section (3730): A section of the page that may display a file explorer view of the user's documents organized into folders and subfolders, inbox containing messages sent to the user, and outbox containing message sent by the user are displayed. The user may click on the triangle to the left of any of the elements in the Personal Folders section (3730) to show an expanded view of the contents.

Clicking on a triangle or other icon to the left of My Inbox or clicking on My Inbox directly in the Personal Folders Section (3730) may:

- Show an indented list of Inboxes available to the user, one for each derived persona the user has on the network in the Personal Folders section (3730).
- Show in the List Pane (3740) a list of message that are contained in the information set for each derived persona for the selected Inbox.

Show a set of action buttons that may be used to perform activities specific to messages in the Action and Details Pane (3745). This pane may also show information related to a message, such as sender, recipient, text of the message, and the like.

A Group Folders section (3735): A section of the page that may display a file explorer view of the content related to Group entities available the user.

- A user may click on a triangle or other icon to the left of any Group name or click on any Group name directly in the Group Folders Section (3735) to expand the file explorer display to include Documents, Inbox, and Outbox for a selected Group.
- Clicking on a triangle or other icon to the left of Documents element for a Group, or clicking on Documents directly for a Group in the Group Folders Section (3735) may:
- Show an indented list of subfolders related to the Document Folder in the Group Folders section (3735).
- Show a list of documents related to the Documents Folder for the selected Group in the List Pane (3740).
- Clicking on a triangle or other icon to the left of Inbox for a Group or clicking on Inbox directly for a Group in the Group Folders Section (3735) may operate similarly to the inboxes in the personal folders section; however the display would show messages for the group.

A List Pane (3740): The List Pane (3740) may typically display a listing of the collection of entities associated with the entity clicked in the Personal Folder section (3730) or Group Folder section (3735). A few examples of selections in the Personal Folders section (3730) or Group Folders section (3735) and resulting display in the List Pane (3740) may include:

- Clicking a Group Name in the Group Folder section (3735) may result in the list of users related to the group as members being displayed in the List Pane (3740).
- Clicking a Folder name in the Personal Folders Section may result in the list of documents related to the folder being displayed in the List Pane (3740).
- Clicking an Inbox for a specific Group in the Group Folder section (3735) may result in the list of messages related to the inbox being displayed in the List Pane (3740).

An Action and Detail Pane (3745): The Action and Detail Pane (3745) may typically provide a list of buttons or link that can be clicked to perform an action on the entity selected in the Personal Folder section (3730), Group Folder section (3735), or List Pane (3740).

Functional Decomposition of a Network

In the example system, a number of users may access a network, but only those users that have a membership on the network and a derived persona on the network. These members are actually interpreters of the network, and perform activities such as add new member functions to the network in the form of groups or tasks, add content to the network, invite additional users to the network, and the like. The example Network interface shown in FIG. 37 displays examples of many of the member functions of a network that may further decompose the network.

Persona Inboxes and Outboxes

The inboxes and outboxes created for each persona the user Ned Wilson joins on the new network are shown in the "Personal Folders" section in FIG. 37 (3700).

Fine-grained Access Control

In an example of specifying fine-grained access control, the user Ned Wilson may share a file with another user or group by sending it as an attachment to a message or by directly copying the file to a group folder. This sharing creates derived access as the user persona doing the sharing (the access provider) may only share a subset of their access rights with the other user persona (the access recipient). FIG. 38 (3800) shows an exemplary interface a user may use to specify fine-grained access controls for a file (3805). The use specifies access controls and whether the user may extend those permissions in the lower portion of the interface (3815). The user saves their selections by clicking one of the action buttons (3810). In this example, the persona nwilson.newnetwork.coral.com is the access provider, the shared file is the access point with an access recipient specified as the persona of the user that is the recipient of the message, and the selected fine-grained access controls as the specific ACLs.

Decompose a Network in Groups

To create a Group on a network and decompose the network into a group member function, the user may click on the Create Group button in the in the Shortcut/Secondary Navigation bar (3725) on the Network Home page (3700). This may result in the display of the Create Group popup shown in FIG. 39 (3900). FIG. 39 is an illustrative graphical user interface showing an exemplary Create Group popup for a web application built on a system configured according the principles of the disclosure, generally denoted by 3900.

This Create Group popup 3900 may include:

- Title (3905): May display the title of the popup as Create Group.
- Action Buttons (3910): Button to
- Save the information entered on the popup and create the group
- Cancel to Create Group process.
- Group Information (3915): Interface controls that allow a user to enter a name for the group, a domain for the group, and a description for the group.

After entering the Group information, the user may click the Save action button (3910), The system creates the group as a member function of the network function, creates a persona for the group with an associated identifier, CRN, and separately evolving information set. The user may view the groups decomposing the network function that he/she has access to through the Group Folder section (3735) of the Network Home page shown in FIG. 37 (700)

All flow diagrams herein (including FIGS. 5, 10A, 10B, 11, 15, 18, 20, 23) and any drawing showing relational type constructs (including FIGS. 1, 2, 3, 4-10, 12, 13, 14, 16, 17, 19, 21, 22, 24, 25, 25, 26, 27) may equally represent a high-level block diagram of computer based components of the invention implementing any steps thereof. The Figures showing relational type constructs (such as FIGS. 1, 2, 3, 4-10, 12, 13, 14, 16, 17, 19, 21, 22, 24, 25, 25, 26, 27) may also represent steps for creating the respective relational type constructs. The steps and/or components may be implemented as computer logic or computer code in combination with the appropriate computing hardware. This computer program code or computer logic may be stored on storage media such as a diskette, hard disk, CD-ROM, DVD-ROM or tape, as well as a memory storage device or collection of memory storage devices such as read-only memory (ROM) or random access memory (RAM), for example. Additionally, the computer program code can be transferred to a workstation over the Internet or some other type of network. The computer code may be a computer program product that is stored on a non-transitory computer readable medium.

While the invention has been described in this disclosure by way of illustrative examples, those skilled in the art will recognize that the invention can be practiced with modifications and in the spirit and scope of the appended claims. If there are any conflicts between this disclosure and any priority application or document incorporated by reference, then this disclosure governs.

I claim:

1. A computer program product for decomposing functions having computer code stored in a non-transitory tangible storage medium that when read and executed by a computer causes the following steps to be performed in a computer system:
   creating a first function, a second function, and a third function;
   creating a first identity object with a first associated identifier for the first function, a second identity object with a second associated identifier for the second function, and a third identity object with a third associated identifier for the third function, wherein each of the first, second and third identity objects has a separately evolving information set in the computer system;
   joining in a membership object the first identity object, the second identity object, and the third function, wherein the first identity object is a membership provider, the second identity object is a membership recipient, and the third function is a membership target, so that the second identity object is a member of the third function,
   creating a fourth identity object with an associated fourth identifier that derives from the second identity object, so that the third function is decomposable into a collection of member functions through the creation of new membership objects, accomplishing decomposition of the membership target through the creation of new membership objects, wherein the fourth identity object is a member function of the membership target, whereby the creation of any member functions generates new membership objects, creating an expanding program structure and a collaborative means for interpreting the functional structure of a computer program wherein all of the member functions participate in the interpretation, performing interpretation dynamically at system runtime;
   creating separately evolving information sets for the identity objects associated with any of the member functions;
   providing immediate access for the member functions to the information set of the membership target so that the member functions can immediately access and operate on the information set of the membership target;
   wherein the member functions are distributable within a single system, throughout a multi-node system, or throughout a distributed graph database system on one or a plurality of machines so that work of any of the member functions is also distributable; and
   applying specific access rights controlling how each of the member functions accesses or operates on the information set of the membership target so that the information set-or a subset of the information set of the membership target is made accessible to any one of the member functions of the membership target, whereby different subsets of information are accessible to each member function;
   wherein membership recipients and derived identity objects that license the membership recipients are functions that interpret the membership target, the interpreters configured to further decompose the work of the membership target into at least one additional member function so that membership in a membership object propagates a self-generating and dynamically expanding functional system through the creation of additional member functions by the interpreters of the membership target function.

2. The computer program product of claim 1, wherein any one of the functions is any agent internal or external to a system that is capable of any one of the following: providing one or more inputs, consuming one or more inputs, generating one or more outputs, submitting one or more requests, or operating in a system.

3. The computer program product of claim 2, wherein any one of the functions is a user, a project, a task, a group, a computation, or a network.

4. The computer program product of claim 1, wherein any identity object is a persona that specifies at least one of an access provider, access recipient, and access point, and access rights.

5. The computer program product of claim 1, wherein in the providing immediate access step, the member functions immediately access and operate on the information set of the membership target includes accessing, reading, writing, modifying, evolving, extending, and deleting.

6. The computer program product of claim 1, wherein the member functions are ordered so that the member functions are executable in a particular order.

7. The computer program product of claim 1, wherein any one of the member functions may itself be decomposed into a second collection of member functions so that the work of the member functions can be further subdivided.

8. The computer program product of claim 1, wherein information added to the information set for the membership target immediately flows to member functions of the membership target.

9. The computer program product of claim 1, wherein the membership of any of the multiple member functions is modified or deleted independently of all other member functions so that the collection of member functions can be expanded or contracted as needed.

10. The computer program product of claim 1, wherein the structure of a program as expressed by member functions dynamically changes at runtime and adapts to changing requirements through membership of the membership functions.

11. The computer program product of claim 1, wherein the membership target is an outer function and the function that licenses the membership recipient is a first inner function so that the first inner function interprets the outer function and invites at least one new interpreter as second inner functions that through a membership object further interprets the first inner function or the outer function, wherein the inner function is a child function and the outer function is a parent function of the child function.

* * * * *